US007080786B2

(12) United States Patent　　(10) Patent No.: US 7,080,786 B2
Longacre, Jr. et al.　　(45) Date of Patent: Jul. 25, 2006

(54) OPTICAL READER COMPRISING ILLUMINATION ASSEMBLY AND SOLID STATE IMAGE SENSOR

(75) Inventors: Andrew Longacre, Jr., Skaneateles, NY (US); Michael A. Ehrhart, Liverpool, NY (US); Thomas J. Koziol, Camillus, NY (US); Robert M. Hussey, Liverpool, NY (US); James A. Parker, Manlius, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 10/802,539

(22) Filed: Mar. 16, 2004

(65) Prior Publication Data

US 2004/0262399 A1　　Dec. 30, 2004

Related U.S. Application Data

(63) Continuation of application No. 10/227,889, filed on Aug. 26, 2002, which is a continuation of application No. 09/651,162, filed on Aug. 30, 2000, now Pat. No. 6,491,223, which is a continuation of application No. 09/385,597, filed on Aug. 30, 1999, which is a continuation-in-part of application No. 08/839,020, filed on Apr. 23, 1997, now Pat. No. 5,965,863, which is a continuation-in-part of application No. 08/697,913, filed on Sep. 3, 1996, now Pat. No. 5,900,613, which is a continuation-in-part of application No. 08/516,185, filed on Aug. 18, 1995, now abandoned, which is a continuation-in-part of application No. 08/205,539, filed on Mar. 4, 1994, now Pat. No. 5,463,214, said application No. 08/697,913 is a continuation-in-part of application No. 08/504,643, filed on Jul. 20, 1995, now Pat. No. 5,773,806.

(51) Int. Cl.
　　*G06K 7/10*　　(2006.01)

(52) U.S. Cl. .................... 235/462.01; 235/472.01; 235/375

(58) Field of Classification Search .............. 235/462.01–462.47, 472.01, 472.02, 472.03, 235/375, 380
See application file for complete search history.

(56) References Cited

U.S. PATENT DOCUMENTS 3,582,884 A　　6/1971　Shepard (Continued)

FOREIGN PATENT DOCUMENTS

EP　　0 385 478 A2　　9/1990

(Continued)

OTHER PUBLICATIONS

U.S. Appl. No. 10/801,937, filed Mar. 16, 2004. Amendment filed Aug. 15, 2005, Andrew Longacre, Jr. et al.

(Continued)

*Primary Examiner*—Thien M. Le
(74) *Attorney, Agent, or Firm*—Wall Marjama & Bilinski LLP

(57) ABSTRACT

There is provided a system and method for programming bar code reading devices. A method in one embodiment includes encoding a bar code symbol, displaying a bar code symbol, and reading the displayed bar code symbol. A system and method in another embodiment includes a first bar code reading device configured to initiate a command to print a bar code symbol which when read by a second bar code reading device can cause the second bar code reading device to operate in the manner of the first bar code reading device. A bar code reading device in another embodiment includes reprogramming circuitry enabling the bar code reading device to be reprogrammed either by way of receipt of programming data over a radio frequency communication line or by way of processing memory stored image data.

21 Claims, 54 Drawing Sheets

U.S. PATENT DOCUMENTS

| | | |
|---|---|---|
| 3,663,762 A | 5/1972 | Joel, Jr. |
| 3,684,868 A | 8/1972 | Christie et al. |
| 3,723,970 A | 3/1973 | Stoller |
| 3,906,166 A | 9/1975 | Cooper et al. |
| 4,004,237 A | 1/1977 | Kratzer |
| 4,041,391 A | 8/1977 | Deerkoski |
| 4,075,461 A | 2/1978 | Wu et al. |
| 4,097,847 A | 6/1978 | Forsen et al. |
| 4,114,155 A | 9/1978 | Raab |
| 4,164,628 A | 8/1979 | Ward et al. |
| 4,210,802 A | 7/1980 | Sakai |
| 4,251,798 A | 2/1981 | Swartz et al. |
| 4,289,957 A | 9/1981 | Neyroud et al. |
| 4,291,410 A | 9/1981 | Caples et al. |
| 4,315,245 A | 2/1982 | Nakahara et al. |
| 4,435,822 A | 3/1984 | Spencer et al. |
| 4,445,118 A | 4/1984 | Taylor et al. |
| 4,488,678 A | 12/1984 | Hara et al. |
| 4,488,679 A | 12/1984 | Bockholt et al. |
| 4,500,776 A | 2/1985 | Laser |
| 4,538,060 A | 8/1985 | Sakai et al. |
| 4,542,528 A | 9/1985 | Sanner et al. |
| 4,561,089 A | 12/1985 | Rouse et al. |
| 4,570,057 A | 2/1986 | Chadima, Jr. et al. |
| 4,610,359 A | 9/1986 | Muller |
| 4,628,532 A | 12/1986 | Stone et al. |
| 4,636,624 A | 1/1987 | Ishida et al. |
| 4,639,932 A | 1/1987 | Schiff |
| 4,644,523 A | 2/1987 | Horwitz |
| 4,646,353 A | 2/1987 | Tenge et al. |
| 4,653,076 A | 3/1987 | Jerrim et al. |
| 4,654,514 A * | 3/1987 | Watson et al. .............. 235/385 |
| 4,686,363 A | 8/1987 | Schoon |
| 4,690,530 A | 9/1987 | Fujino et al. |
| 4,710,817 A | 12/1987 | Ando |
| 4,721,849 A | 1/1988 | Davis et al. |
| 4,731,525 A | 3/1988 | Hice |
| 4,761,544 A | 8/1988 | Poland |
| 4,782,220 A | 11/1988 | Shuren |
| 4,785,463 A | 11/1988 | Janc et al. |
| 4,791,446 A | 12/1988 | Ishida et al. |
| 4,794,239 A | 12/1988 | Allias |
| 4,807,256 A | 2/1989 | Holmes et al. |
| 4,818,856 A | 4/1989 | Matsushima et al. |
| 4,825,057 A | 4/1989 | Swartz et al. |
| 4,825,058 A | 4/1989 | Poland |
| 4,835,713 A | 5/1989 | Pastor |
| 4,841,544 A | 6/1989 | Nuytkens |
| 4,864,302 A | 9/1989 | Bowers |
| 4,868,375 A | 9/1989 | Blanford |
| 4,874,936 A | 10/1989 | Chandler et al. |
| 4,877,949 A | 10/1989 | Danielson et al. |
| 4,893,333 A | 1/1990 | Baran et al. |
| 4,896,029 A | 1/1990 | Chandler et al. |
| 4,901,073 A | 2/1990 | Kibrick |
| 4,908,500 A | 3/1990 | Baumberger |
| 4,942,474 A | 7/1990 | Akimoto et al. |
| 4,973,829 A | 11/1990 | Ishida et al. |
| 4,998,010 A | 3/1991 | Chandler et al. |
| 5,019,699 A | 5/1991 | Koenck |
| 5,113,445 A | 5/1992 | Wang |
| 5,120,943 A | 6/1992 | Benz |
| 5,138,140 A | 8/1992 | Siemiatkowski et al. |
| 5,153,418 A | 10/1992 | Batterman et al. |
| 5,153,421 A | 10/1992 | Tandon et al. |
| 5,159,635 A | 10/1992 | Wang |
| 5,180,904 A | 1/1993 | Shepard et al. |
| 5,185,514 A | 2/1993 | Wike et al. |
| 5,189,292 A | 2/1993 | Batterman et al. |
| 5,196,686 A | 3/1993 | Leister |
| 5,208,449 A | 5/1993 | Eastman et al. |
| 5,212,777 A | 5/1993 | Gove et al. |
| 5,223,701 A | 6/1993 | Batterman et al. |
| 5,235,167 A | 8/1993 | Dvorkis et al. |
| 5,241,164 A | 8/1993 | Pavlidis et al. |
| 5,243,655 A | 9/1993 | Wang |
| 5,245,695 A | 9/1993 | Basehore |
| 5,247,166 A | 9/1993 | Gannon et al. |
| 5,250,792 A | 10/1993 | Swartz et al. |
| 5,262,626 A | 11/1993 | Goren et al. |
| 5,262,871 A | 11/1993 | Wilder et al. |
| 5,266,787 A | 11/1993 | Mazz et al. |
| 5,272,323 A | 12/1993 | Martino |
| 5,274,567 A * | 12/1993 | Kallin et al. ................ 700/213 |
| 5,276,400 A | 1/1994 | Denyer et al. |
| 5,278,398 A | 1/1994 | Pavlidis et al. |
| 5,286,960 A | 2/1994 | Longacre, Jr. et al. |
| 5,291,564 A | 3/1994 | Shah et al. |
| 5,294,783 A | 3/1994 | Hammond, Jr. et al. |
| 5,304,786 A | 4/1994 | Pavlidis et al. |
| 5,304,787 A | 4/1994 | Wang |
| 5,308,966 A | 5/1994 | Danielson et al. |
| 5,311,001 A | 5/1994 | Joseph et al. |
| 5,319,185 A | 6/1994 | Obata |
| 5,324,924 A | 6/1994 | Cai et al. |
| 5,331,176 A | 7/1994 | Sant' Anselmo et al. |
| 5,343,028 A | 8/1994 | Figarella et al. |
| 5,345,266 A | 9/1994 | Denyer |
| 5,347,114 A | 9/1994 | Tanaka |
| 5,354,977 A | 10/1994 | Roustaei |
| 5,365,048 A | 11/1994 | Komiya et al. |
| 5,378,881 A | 1/1995 | Adachi |
| 5,378,883 A | 1/1995 | Batterman et al. |
| 5,392,447 A | 2/1995 | Schlack et al. |
| 5,396,054 A | 3/1995 | Krichever et al. |
| 5,401,949 A | 3/1995 | Ziemack et al. |
| 5,412,197 A | 5/1995 | Smith |
| 5,414,251 A | 5/1995 | Durbin |
| 5,418,862 A | 5/1995 | Zheng et al. |
| 5,420,409 A | 5/1995 | Longacre, Jr. et al. |
| 5,422,470 A | 6/1995 | Kubo |
| 5,422,744 A | 6/1995 | Katz et al. |
| 5,428,211 A | 6/1995 | Zheng et al. |
| 5,428,212 A | 6/1995 | Tani et al. |
| 5,430,283 A | 7/1995 | Tanaka |
| 5,430,286 A | 7/1995 | Hammond, Jr. et al. |
| 5,438,636 A | 8/1995 | Surka |
| 5,442,164 A | 8/1995 | Adachi |
| 5,461,425 A | 10/1995 | Fowler et al. |
| 5,463,214 A | 10/1995 | Longacre et al. |
| 5,466,921 A | 11/1995 | Lapinski et al. |
| 5,471,515 A | 11/1995 | Fossum et al. |
| 5,471,592 A | 11/1995 | Gove et al. |
| 5,473,148 A | 12/1995 | Tanaka et al. |
| 5,477,042 A | 12/1995 | Wang |
| 5,478,997 A | 12/1995 | Bridgelall et al. |
| 5,478,999 A | 12/1995 | Figarella et al. |
| 5,481,103 A | 1/1996 | Wang |
| 5,485,369 A * | 1/1996 | Nicholls et al. ................ 705/9 |
| 5,487,115 A | 1/1996 | Surka |
| 5,488,223 A | 1/1996 | Austin et al. |
| 5,489,769 A | 2/1996 | Kubo |
| 5,491,471 A | 2/1996 | Stobbe |
| 5,493,108 A | 2/1996 | Cherry et al. |
| 5,495,097 A | 2/1996 | Katz et al. |
| 5,504,524 A | 4/1996 | Lu et al. |
| 5,510,604 A | 4/1996 | England |
| 5,510,606 A | 4/1996 | Worthington et al. |
| 5,521,366 A | 5/1996 | Wang et al. |
| 5,524,068 A | 6/1996 | Kacandes et al. |
| 5,525,787 A | 6/1996 | Kubo |
| 5,537,431 A | 7/1996 | Chen et al. |
| 5,539,193 A | 7/1996 | Gibbs et al. |
| 5,545,886 A | 8/1996 | Metlitsky et al. |

| | | | | | | |
|---|---|---|---|---|---|---|
| 5,548,107 | A | 8/1996 | Lapinski et al. | 5,949,056 | A | 9/1999 | White |
| 5,548,108 | A | 8/1996 | Moldskred et al. | 5,965,863 | A | 10/1999 | Parker et al. |
| 5,550,366 | A | 8/1996 | Roustaei | 5,979,757 | A | 11/1999 | Tracy et al. |
| 5,565,669 | A | 10/1996 | Liu | 5,979,763 | A | 11/1999 | Wang et al. |
| 5,572,006 | A | 11/1996 | Wang et al. | 5,979,768 | A | 11/1999 | Koenck |
| 5,585,616 | A | 12/1996 | Roxby et al. | 5,984,186 | A | 11/1999 | Tafoya |
| 5,591,955 | A | 1/1997 | Laser | 5,986,297 | A | 11/1999 | Guidash et al. |
| 5,591,956 | A | 1/1997 | Longacre, Jr. et al. | 6,003,008 | A | 12/1999 | Postrel et al. |
| 5,594,230 | A | 1/1997 | Waite et al. | 6,011,880 | A | 1/2000 | Tani et al. |
| 5,598,007 | A | 1/1997 | Bunce et al. | 6,014,501 | A | 1/2000 | Fukuda et al. |
| 5,600,119 | A | 2/1997 | Dvorkis et al. | 6,015,088 | A | 1/2000 | Parker et al. |
| 5,610,387 | A | 3/1997 | Bard et al. | 6,017,496 | A | 1/2000 | Nova et al. |
| 5,612,524 | A | 3/1997 | Sant'Anselmo et al. | 6,019,286 | A | 2/2000 | Li et al. |
| 5,619,192 | A | 4/1997 | Ayala | 6,053,407 | A | 4/2000 | Wang et al. |
| 5,621,203 | A | 4/1997 | Swartz et al. | 6,064,763 | A | 5/2000 | Maltsev |
| 5,635,697 | A | 6/1997 | Shellhammer et al. | 6,067,113 | A | 5/2000 | Hurwitz et al. |
| 5,637,849 | A | 6/1997 | Wang et al. | 6,070,800 | A | 6/2000 | Fujita et al. |
| 5,640,193 | A | 6/1997 | Wellner | 6,082,619 | A | 7/2000 | Ma et al. |
| 5,659,431 | A | 8/1997 | Ackley | 6,112,992 | A | 9/2000 | Agabra et al. |
| 5,663,549 | A | 9/1997 | Katz et al. | 6,119,179 | A | 9/2000 | Whitridge et al. |
| 5,665,959 | A | 9/1997 | Fossum et al. | 6,123,264 | A | 9/2000 | Li et al. |
| 5,668,803 | A | 9/1997 | Tymes et al. | 6,129,276 | A | 10/2000 | Jelen et al. |
| 5,672,858 | A | 9/1997 | Li et al. | 6,129,278 | A | 10/2000 | Wang et al. |
| 5,686,715 | A | 11/1997 | Watanabe et al. | 6,144,848 | A * | 11/2000 | Walsh et al. .............. 455/419 |
| 5,691,773 | A | 11/1997 | Wang et al. | 6,155,488 | A | 12/2000 | Olmstead et al. |
| 5,698,833 | A | 12/1997 | Skinger | 6,155,491 | A | 12/2000 | Dueker et al. |
| 5,702,059 | A | 12/1997 | Chu et al. | 6,161,760 | A | 12/2000 | Marrs et al. |
| 5,703,349 | A | 12/1997 | Meyerson et al. | 6,170,749 | B1 | 1/2001 | Goren et al. |
| 5,710,417 | A | 1/1998 | Joseph et al. | 6,176,428 | B1 | 1/2001 | Joseph et al. |
| 5,714,745 | A | 2/1998 | Ju et al. | 6,176,429 | B1 | 1/2001 | Reddersen et al. |
| 5,717,195 | A | 2/1998 | Feng et al. | 6,179,208 | B1 | 1/2001 | Feng |
| 5,723,823 | A | 3/1998 | Bell | 6,186,404 | B1 | 2/2001 | Ehrhart et al. |
| 5,723,853 | A | 3/1998 | Longacre, Jr. et al. | 6,215,992 | B1 | 4/2001 | Howel et al. |
| 5,723,868 | A | 3/1998 | Hammond, Jr. et al. | 6,264,105 | B1 | 7/2001 | Longacre, Jr. et al. |
| 5,726,435 | A | 3/1998 | Hara et al. | 6,276,605 | B1 | 8/2001 | Olmstead et al. |
| 5,739,518 | A | 4/1998 | Wang | 6,286,760 | B1 | 9/2001 | Schmidt et al. |
| 5,756,981 | A | 5/1998 | Roustaei et al. | 6,293,466 | B1 | 9/2001 | Fujita et al. |
| 5,773,806 | A | 6/1998 | Longacre, Jr. | 6,325,283 | B1 | 12/2001 | Chu et al. |
| 5,773,810 | A | 6/1998 | Hussey et al. | 6,329,139 | B1 | 12/2001 | Nova et al. |
| 5,774,357 | A | 6/1998 | Hoffberg et al. | 6,331,901 | B1 | 12/2001 | Fukuda et al. |
| 5,780,834 | A | 7/1998 | Havens et al. | 6,347,163 | B1 | 2/2002 | Roustaei |
| 5,783,811 | A | 7/1998 | Feng et al. | 6,360,948 | B1 | 3/2002 | Yang et al. |
| 5,784,102 | A | 7/1998 | Hussey et al. | 6,377,249 | B1 | 4/2002 | Mumford |
| 5,805,779 | A | 9/1998 | Christopher et al. | 6,398,112 | B1 | 6/2002 | Li et al. |
| 5,814,801 | A | 9/1998 | Wang et al. | 6,411,199 | B1 | 6/2002 | Geiszler et al. |
| 5,814,803 | A | 9/1998 | Olmstead et al. | 6,412,699 | B1 | 7/2002 | Russell et al. |
| 5,818,023 | A | 10/1998 | Meyerson et al. | 6,424,407 | B1 | 7/2002 | Kinrot et al. |
| 5,818,528 | A | 10/1998 | Roth et al. | 6,431,452 | B1 | 8/2002 | Feng |
| 5,821,519 | A | 10/1998 | Lee et al. | 6,452,179 | B1 | 9/2002 | Coates et al. |
| 5,821,523 | A | 10/1998 | Bunte et al. | 6,462,842 | B1 | 10/2002 | Hamilton |
| 5,825,006 | A | 10/1998 | Longacre et al. | 6,486,911 | B1 | 11/2002 | Denyer et al. |
| 5,831,254 | A | 11/1998 | Karpen et al. | 6,491,223 | B1 | 12/2002 | Longacre et al. |
| 5,831,674 | A | 11/1998 | Ju et al. | 6,493,029 | B1 | 12/2002 | Denyer et al. |
| 5,834,749 | A | 11/1998 | Durbin | 6,505,778 | B1 | 1/2003 | Reddersen et al. |
| 5,837,986 | A | 11/1998 | Barile et al. | 6,508,404 | B1 | 1/2003 | Hecht |
| 5,837,987 | A | 11/1998 | Koenck et al. | 6,512,218 | B1 | 1/2003 | Canini et al. |
| 5,841,121 | A | 11/1998 | Koenck | 6,527,179 | B1 | 3/2003 | Itoh et al. |
| 5,841,126 | A | 11/1998 | Fossum et al. | 6,547,139 | B1 | 4/2003 | Havens et al. |
| 5,867,594 | A | 2/1999 | Cymbalski | 6,547,142 | B1 | 4/2003 | Goren et al. |
| 5,867,595 | A | 2/1999 | Cymbalski | 6,552,323 | B1 | 4/2003 | Guidash et al. |
| 5,874,722 | A | 2/1999 | Rando et al. | 6,552,746 | B1 | 4/2003 | Yang et al. |
| 5,875,108 | A | 2/1999 | Hoffberg et al. | 6,565,003 | B1 | 5/2003 | Ma |
| 5,877,487 | A | 3/1999 | Tani et al. | 6,565,005 | B1* | 5/2003 | Wilz et al. ............ 235/462.25 |
| 5,900,613 | A | 5/1999 | Koziol et al. | 6,575,367 | B1 | 6/2003 | Longacre, Jr. |
| 5,917,171 | A | 6/1999 | Sasai | 6,585,159 | B1 | 7/2003 | Meier et al. |
| 5,917,945 | A | 6/1999 | Cymbalski | 6,606,171 | B1 | 8/2003 | Renk et al. |
| 5,920,477 | A | 7/1999 | Hoffberg et al. | 6,634,558 | B1 | 10/2003 | Patel et al. |
| 5,926,214 | A | 7/1999 | Denyer et al. | 6,637,658 | B1 | 10/2003 | Barber et al. |
| 5,929,418 | A | 7/1999 | Ehrhart et al. | 6,655,595 | B1 | 12/2003 | Longacre, Jr. et al. |
| 5,932,862 | A | 8/1999 | Hussey et al. | 6,665,012 | B1 | 12/2003 | Yang et al. |
| 5,942,741 | A | 8/1999 | Longacre, Jr. et al. | 6,672,511 | B1 | 1/2004 | Shellhammer |
| 5,949,052 | A | 9/1999 | Longacre, Jr. et al. | 6,678,412 | B1 | 1/2004 | Shigekusa et al. |
| 5,949,054 | A | 9/1999 | Karpen et al. | 6,685,095 | B1 | 2/2004 | Roustaei et al. |

| | | |
|---|---|---|
| 6,698,656 B1 | 3/2004 | Parker et al. |
| 6,708,883 B1 | 3/2004 | Krichever |
| 6,714,239 B1 | 3/2004 | Guidash |
| 6,714,665 B1 | 3/2004 | Hanna et al. |
| 6,722,569 B1 | 4/2004 | Ehrhart et al. |
| 6,732,929 B1 | 5/2004 | Good et al. |
| 6,732,930 B1 | 5/2004 | Massieu et al. |
| 6,736,321 B1 | 5/2004 | Tsikos et al. |
| 6,739,511 B1 | 5/2004 | Tsikos et al. |
| 6,741,335 B1 | 5/2004 | Kinrot et al. |
| 6,742,707 B1 | 6/2004 | Tsikos et al. |
| 6,751,352 B1 | 6/2004 | Baharav et al. |
| 6,761,317 B1 | 7/2004 | Knowles et al. |
| 6,766,954 B1 | 7/2004 | Barkan et al. |
| 6,814,290 B1 | 11/2004 | Longacre |
| 6,827,273 B1 | 12/2004 | Wilz et al. |
| 6,832,729 B1 | 12/2004 | Perry et al. |
| 6,837,432 B1 | 1/2005 | Tsikos et al. |
| 6,854,649 B1 | 2/2005 | Worner et al. |
| 6,857,570 B1 | 2/2005 | Tsikos et al. |
| 6,858,159 B1 | 2/2005 | Lyons |
| 6,863,216 B1 | 3/2005 | Tsikos et al. |
| 2002/0158127 A1 | 10/2002 | Hori et al. |
| 2003/0042311 A1 | 3/2003 | Longacre et al. |
| 2003/0062418 A1 | 4/2003 | Barber et al. |
| 2003/0085282 A1 | 5/2003 | Parker et al. |
| 2003/0146283 A1 | 8/2003 | Longacre et al. |
| 2003/0218067 A1 | 11/2003 | Parker et al. |
| 2004/0004128 A1 | 1/2004 | Pettinelli et al. |
| 2004/0256465 A1 | 12/2004 | Longacre, Jr. |
| 2004/0262393 A1 | 12/2004 | Hara et al. |
| 2004/0262395 A1 | 12/2004 | Longacre, Jr. |
| 2004/0262396 A1 | 12/2004 | Longacre, Jr. |
| 2004/0262399 A1 | 12/2004 | Longacre, Jr. |
| 2005/0011956 A1 | 1/2005 | Carlson |
| 2005/0103851 A1 | 5/2005 | Zhu et al. |

FOREIGN PATENT DOCUMENTS

| | | |
|---|---|---|
| EP | 0 385 478 A3 | 9/1990 |
| EP | 0 449 634 A2 | 10/1991 |
| EP | 0 561 334 A2 | 9/1993 |
| EP | 0 571 892 A2 | 12/1993 |
| EP | 0 584 559 A2 | 3/1994 |
| JP | 07-049922 | 2/1995 |
| JP | 07-065104 | 3/1995 |
| JP | 2000-092317 A | 3/2000 |
| WO | WO 93/14458 | 7/1993 |
| WO | WO 93/17397 | 9/1993 |
| WO | WO 93/18478 | 9/1993 |
| WO | WO 95/32580 | 11/1995 |
| WO | WO 97/08647 | 3/1997 |

OTHER PUBLICATIONS

U.S. Appl. No. 11/073,531, filed Mar. 7, 2005, Longacre et al.
U.S. Appl. No. 10/227,889, filed Aug. 26, 2002, Longacre et al.
U.S. Appl. No. 10/328,939, filed Dec. 23, 2002. (Attached is Office Action dated Feb. 9, 2005), Longacre et al.
U.S. Appl. No. 10/778,466, filed Feb. 13, 2004, Longacre et al.
U.S. Appl. No. 10/786,808, filed Feb. 25, 2004, Longacre et al.
U.S. Appl. No. 10/786,984, filed Feb. 25, 2004, Longacre et al.
U.S. Appl. No. 10/793,423, filed Mar. 4, 2004, Longacre et al.
U.S. Appl. No. 10/800,136, filed Mar. 12, 2004, Longacre et al.
U.S. Appl. No. 10/801,937, filed Mar. 16, 2004. (Attached is Office Action dated Apr. 15, 2005), Longacre et al.
U.S. Appl. No. 10/802,539, filed Mar. 16, 2004. (Attached is Office Action dated Apr. 21, 2005), Longacre et al.
U.S. Appl. No. 10/887,207, filed Jul. 8, 2004, Longacre.
U.S. Appl. No. 10/895,536, filed Jul. 23, 2004, Longacre et al.
Jakl, Edward A., "Why CMOS Image Sensors are Poised to Surpass CCDs," International IC '99, Conference Proceedings, 1999, pp. 64-71.
Tian, Hui et al., "Analysis of 1/f Noise in Switched MOSFET Circuits," Information Systems Laboratory, Electrical Engineering Department, Stanford University, Stanford, California 94305, Apr. 24, 2001, 21 pp.
El Gamal, Professor A., Lecture Notes 1, 2, 4, 5, 6, 7, 10 and Handout #3 and #28, "Image Sensors and Digital Cameras" for EE 392B, Spring 2001.
Fossum, Eric R., CMOS Active Pixel Image Sensors, Nuclear Instruments and Methods in Physics Research A 395 (1997) 291-297.
JP Patent Application 8-159625 Translated Japanese Office Action in the English language, Apr. 18, 2005.
Roger C. Palmer, The Bar Code Book, Second Addition, Jun., 1991,Helmers Publishing, Inc., Peterborough, New Hampshire, pp. 11-108.
VLSI Vison Ltd., High Resolution EIA/CCIR Monochrome Monolithic Camera Specification, VVL-1060, Apr. 1994, pp. 1-23.
VLSI Vision Ltd., Serial Interface Specification, VVL-1060, Apr. 1994, pp. 1-9.
VLSI Vision Ltd., Engineering Evaluation Kit Specification, VVL-1070, Sep. 27, 1994, pp. 1-5.
Marshall Electronics, Monochrome Monolithic Image Sensor with Analogue and Digital Outputs Specification, VVL-1070, pp. 1-24, believed to be published prior to Apr. 1995.
Welch Allyn, Hand Held CCD Scanner/Decoder, SCANTEAM 3000 Instant Interface Series, Jul. 1994, 2pgs.
Symbol Express, 1995 Product Catalog, Jan. 1995, 4pgs.
Report by Applicants, Report summarizing references of record in applications of which priority is claimed (U.S. Appl. No. 09/385,597, U.S. Appl. No. 08/839,020 and U.S. Appl. No. 08/697,913), Jun. 2005.
Report by Applicants, Report categorizing references submitted by applicants, Jun. 2005.
U.S. Appl. No. 10/800,136, filed Mar. 4, 2004, Andrew Longacre, Jr. et al.

* cited by examiner

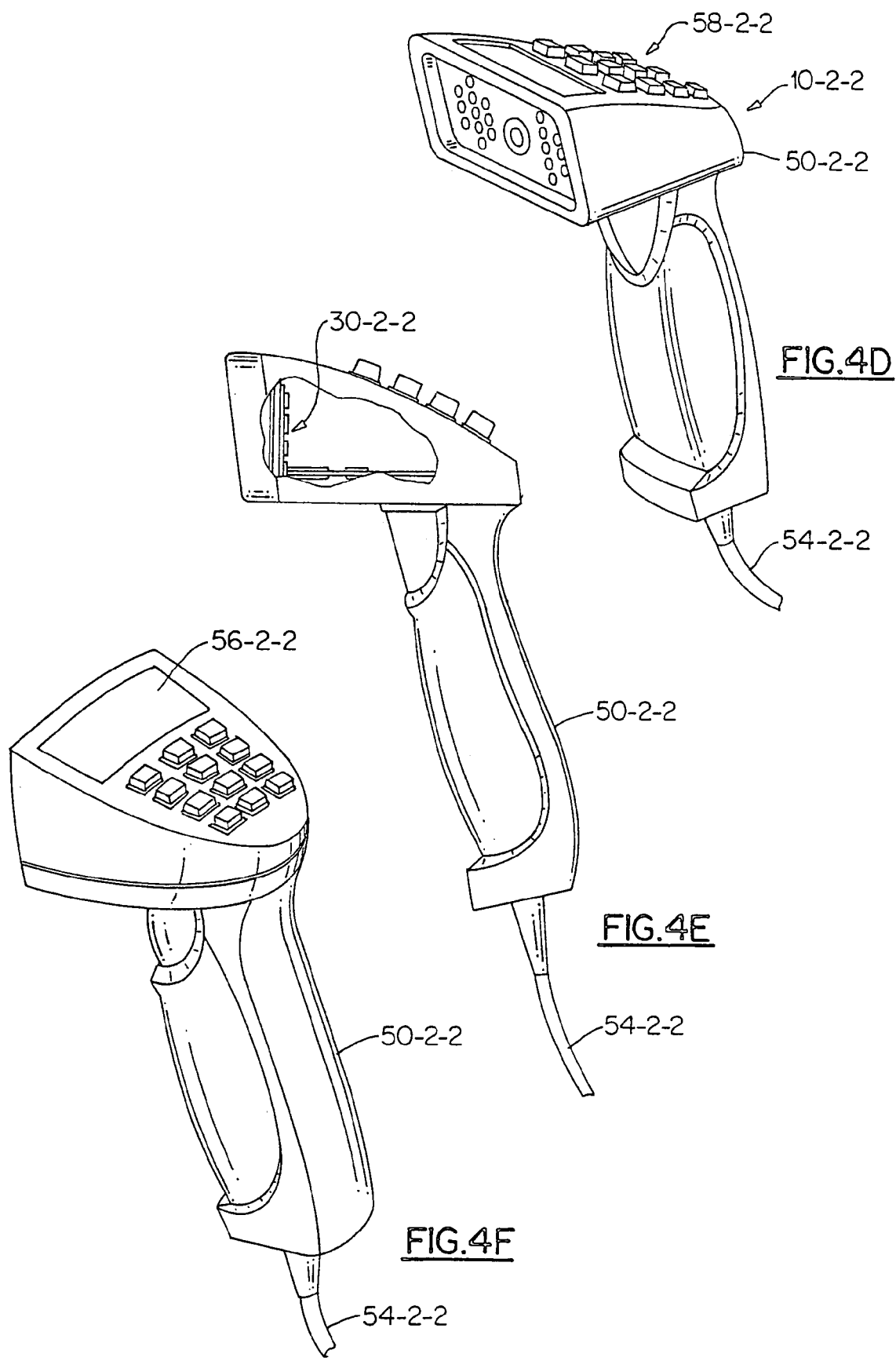

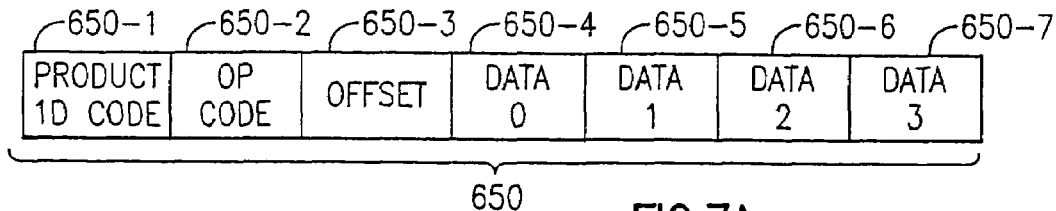

FIG.7A

OPTIONS (OFFSET) TABLE
A. COMMUNICATIONS OPTIONS
  1. RS-232
  2. BAUD RATE
  3. RF LINK
  4. ETHERNET
B. CODE OPTIONS
  1. DISABLE 1D
  2. DISABLE 2D
  3. DISABLE INDIV.
  4. MIN-MAX LENGTH
  5. MULTIPLE SYMBOLS ENABLED
C. SCANNING-DECODING OPTIONS
  1. ONE SHOT
  2. REPEAT UNTIL DONE
  3. REPEAT UNTIL STOPPED
  4. SCAN ON DEMAND
  5. SKIP SCAN
  6. DECODE ON DEMAND
D. OPERATING OPTIONS
  1. BEEPER VOLUME
  2. AIMING LED ON/OFF
  3. AURAL FEEDBACK
E. TRANSMIT OPTIONS
  1. SEND CHECK CHAR'S
  2. SEND CHECKSUM
  3. DATA EDIT OPTIONS

FIG.7B

OP CODE TABLE
A. OP CODE "0"-VECTOR PROC.
  1. OUTPUT VERSION OF SOFTWARE
  2. OUTPUT CONTENTS OF PARAMETER TABLE
  3. DISPLAY ENABLED CODES
  4. PRINT PARAMETER TABLE AS BAR CODE SYMBOL
B. OP CODE "1" - CLEAR
C. OP CODE "2" - SET
D. OP CODE "3" - TOGGLE
E. OP CODE "4" - ADD
F. OP CODE "5" - DEFAULT
G. OP CODE "6" - LOAD
H. OP CODE "7" - RESERVED

FIG.7C

*DEFAULT ALL CODE 11/CODE 128 SETTINGS*
822 — 
CODE 11 SELECTION
FIG.8C
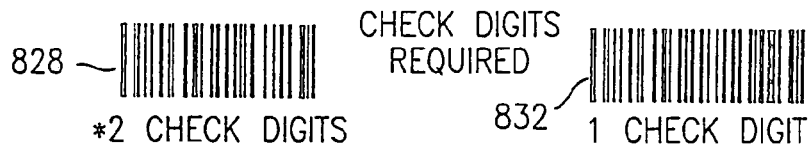
CODE 128 SELECTION
‡ A TWO-DIGIT NUMBER IS REQUIRED AFTER SCANNING THIS PROGRAMMING BAR CODE. PLEASE SCAN YOUR SELECTION ON THE PROGRAMMING CHART (INSIDE BACK COVER).

RS-232D PORT 2 (D OUTPUT)
*DEFAULT ALL RS-232 PORT 2 SETTINGS*
858 — 
CTS CHECK SELECTION
862 —      864 — 
ENABLE                              *DISABLE
BAUD RATE SELECTION
FIG.8D
866 —      868 — 
300                                 600
872 —      874 — 
1200                                2400
876 —      878 — 
4800                                *9600
882 —     884 — 
19200                               38400

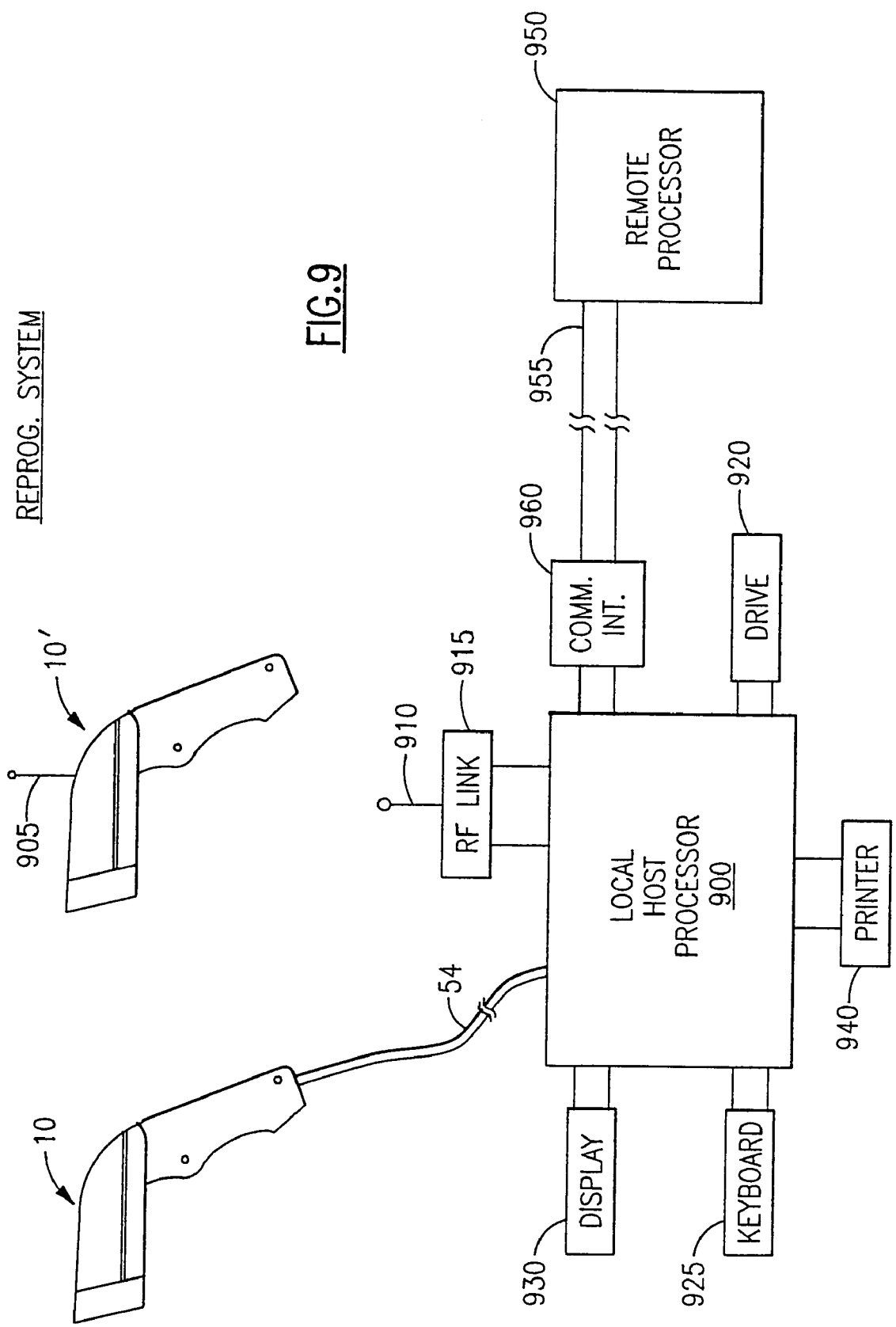

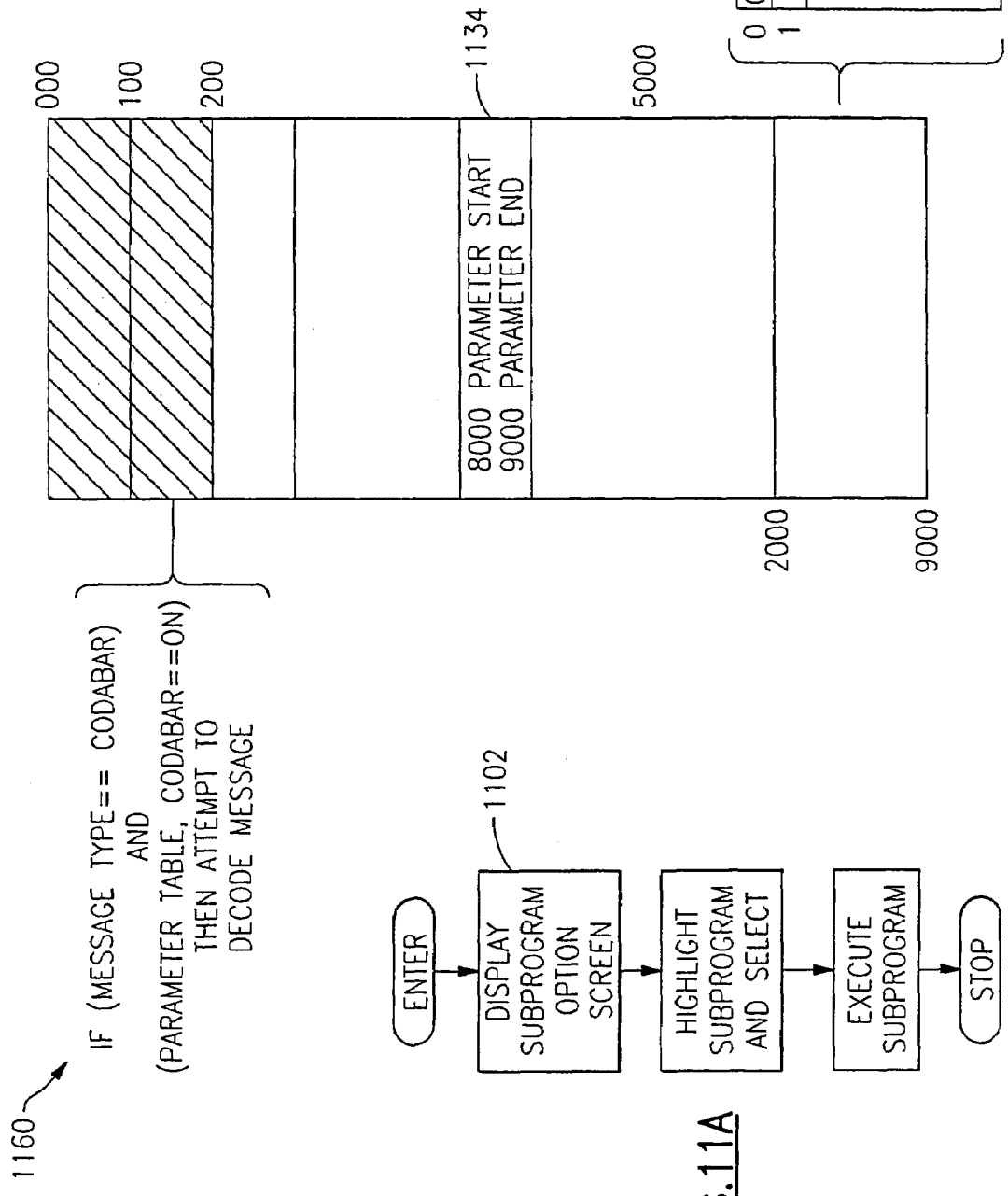

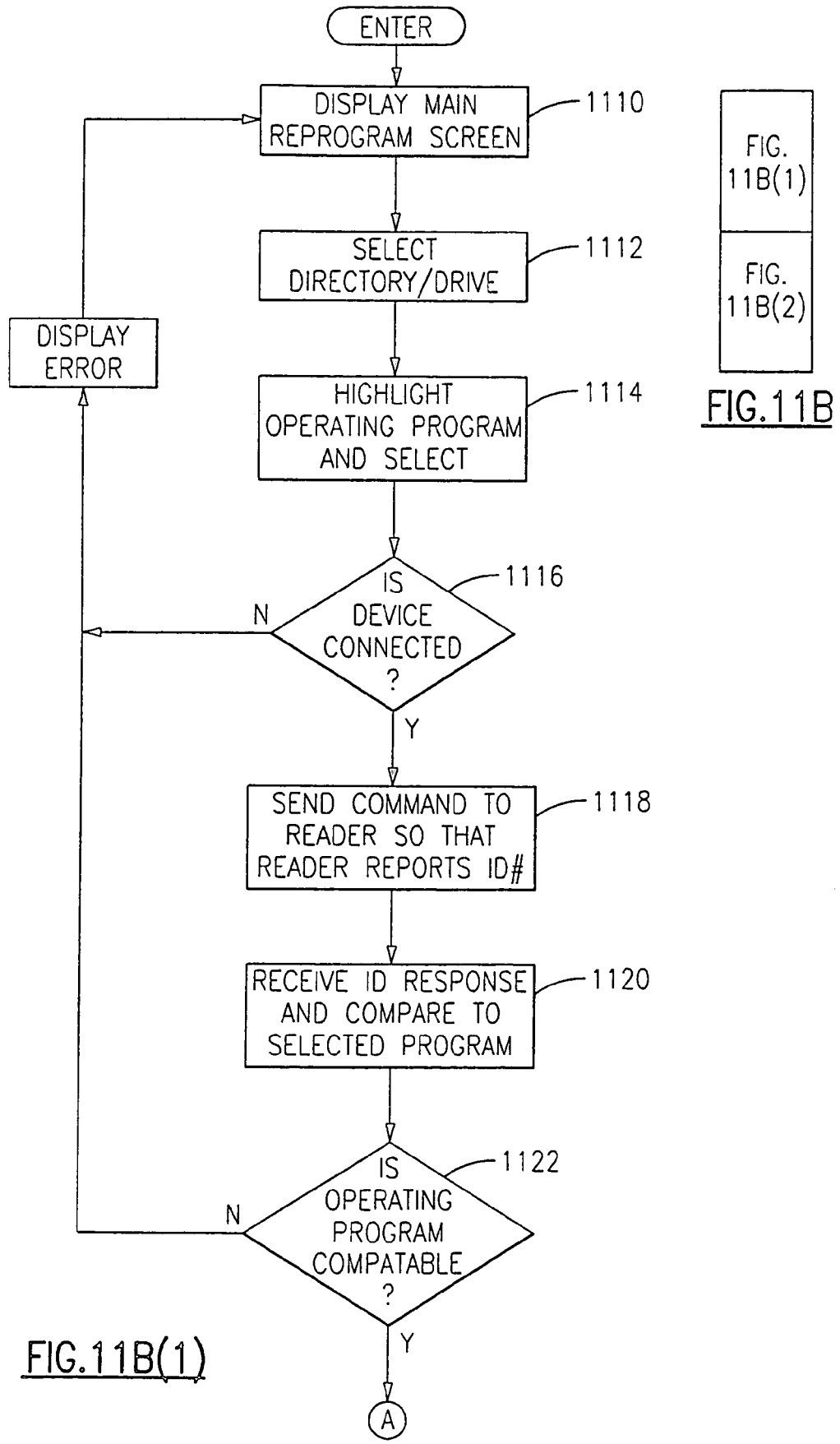

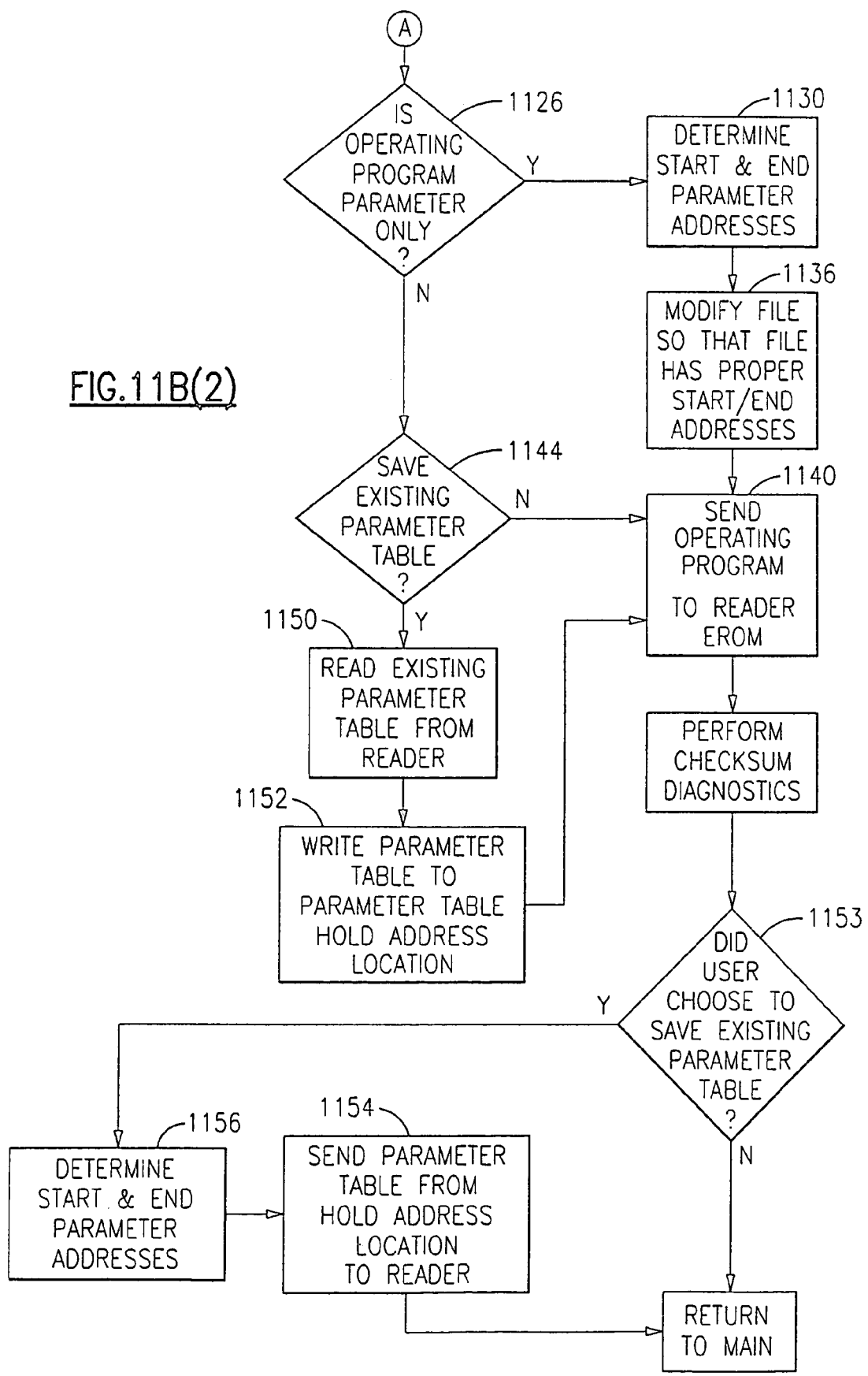
FIG.11B(2)

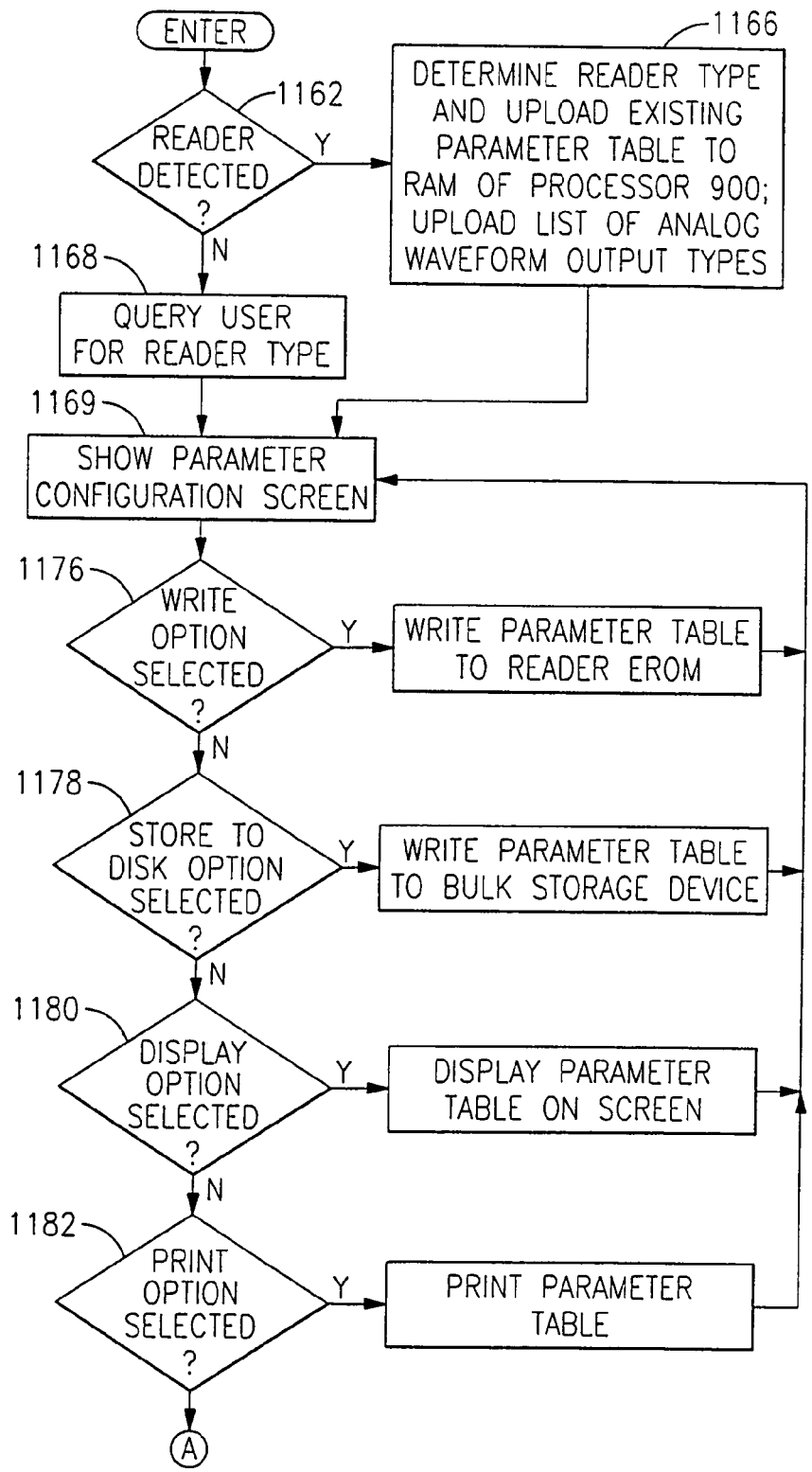
FIG.11D(1)

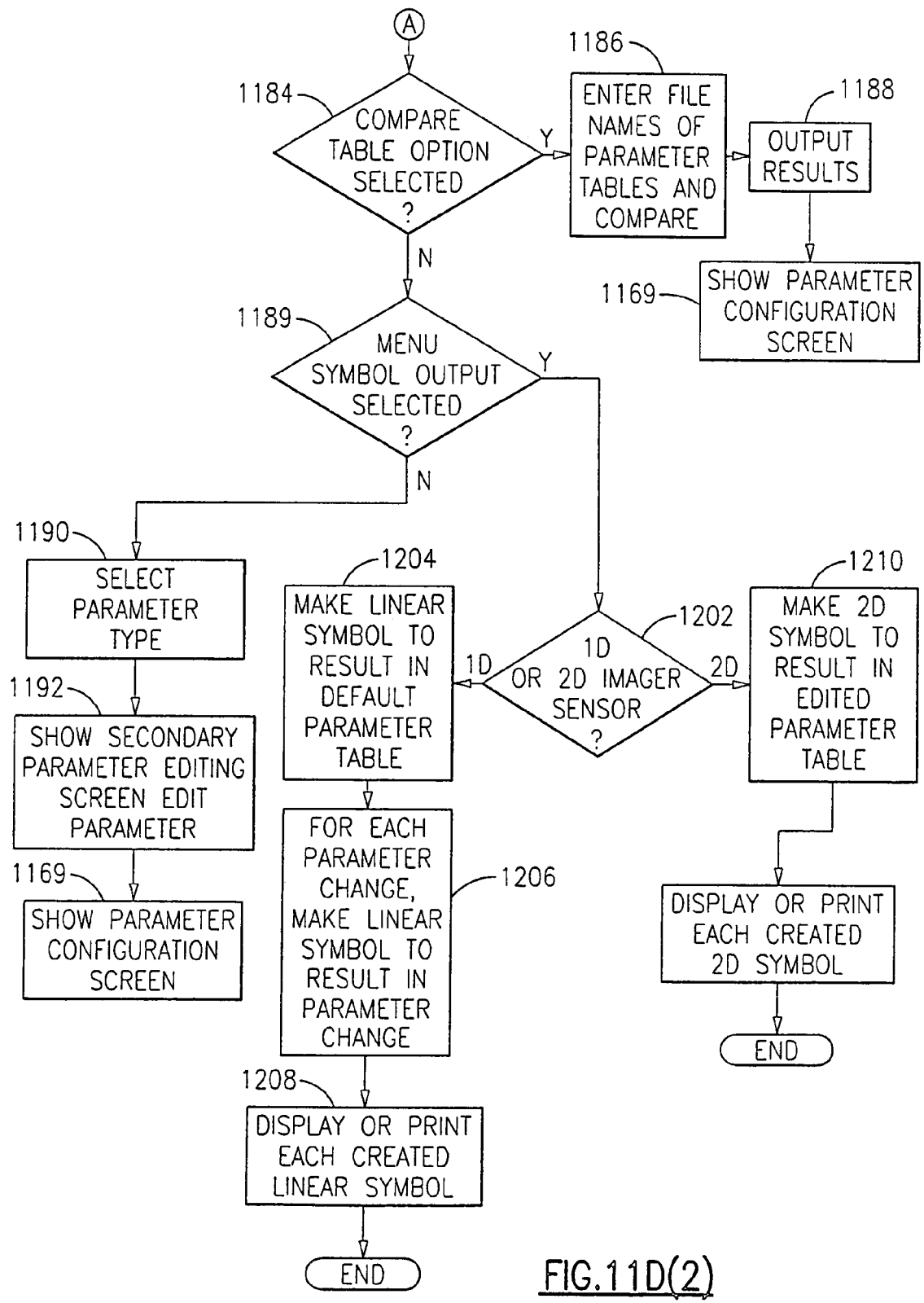
FIG.11D(2)

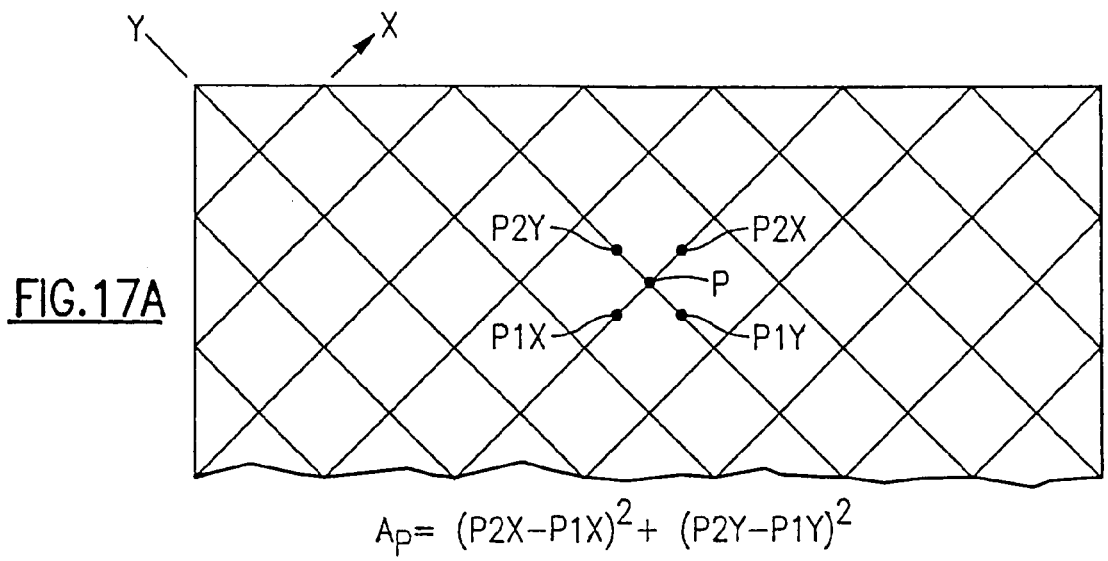
FIG.17A
$$A_P = (P2X-P1X)^2 + (P2Y-P1Y)^2$$
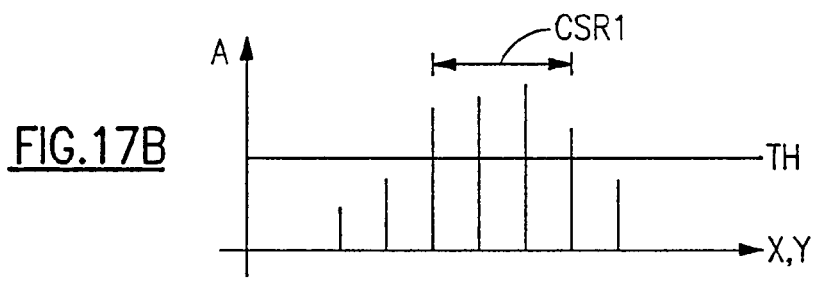
FIG.17B
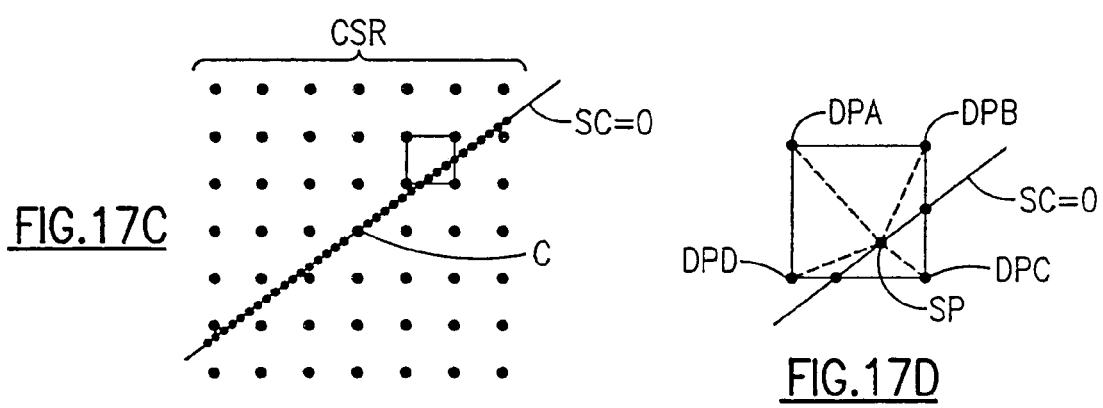
FIG.17C
FIG.17D
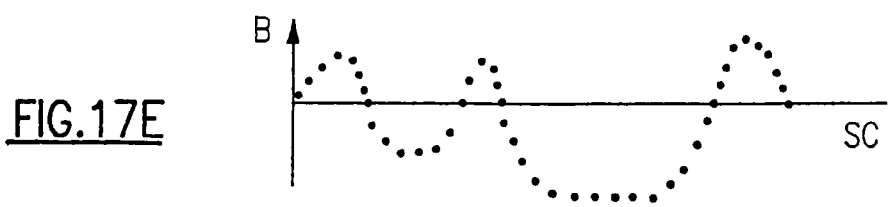
FIG.17E

| SCANNING | SCAN 1 | SCAN 2 | SCAN 3 | SCAN 4 | SCAN 5 | SCAN 6 | SCAN 7 | SCAN 8 |
|---|---|---|---|---|---|---|---|---|
| DECODING | | DECODE SCAN 1 | DECODE SCAN 2 | DECODE SCAN 3 | DECODE SCAN 4 | DECODE SCAN 5 | DECODE SCAN 6 | DECODE SCAN 7 |

FIG.24A

| SCANNING | SCAN 1 | SCAN 2 | SCAN 3 | SCAN 4 | SCAN 5 |
|---|---|---|---|---|---|
| DECODING | | DECODE SCAN 1 | DECODE SCAN 2 | DECODE SCAN 3 | DECODE SCAN 4 |

FIG.24B

| SCANNING | SCAN 1 | SCAN 2 | SCAN 3 | SCAN 4 | SCAN 5 | SCAN 6 | SCAN 7 | SCAN 8 |
|---|---|---|---|---|---|---|---|---|
| DECODING | | DECODE SCAN 1 | | DECODE SCAN 2 | | DECODE SCAN 5 | | DECODE SCAN 7 |

FIG.24C

| SCANNING | SCAN 1 (MEM A) | SCAN 2 (MEM B) | SCAN 3 (MEM A) | SCAN 4 (MEM B) | SCAN 5 (MEM A) | SCAN 6 (MEM B) | SCAN 7 (MEM C) | SCAN 8 (MEM A) |
|---|---|---|---|---|---|---|---|---|
| DECODING | | DECODE SCAN 1 (MEMORY A) | | DECODE SCAN 3 (MEMORY B) | | DECODE SCAN 5 (MEMORY A) | | DECODE SCAN 7 (MEMORY B) |

| SCANNING | SCAN 1 (MEM A) | SCAN 2 (MEM B) | SCAN 3 (MEM C) | SCAN 4 (MEM A) | SCAN 5 (MEM C) | SCAN 6 (MEM B) | SCAN 7 (MEM C) | SCAN 8 (MEM A) |
|---|---|---|---|---|---|---|---|---|
| DECODING | | DECODE SCAN 1 (MEMORY A) | | DECODE SCAN 2 (MEMORY B) | | DECODE SCAN 4 (MEMORY A) | | DECODE SCAN 6 (MEMORY B) |

FIG.24E

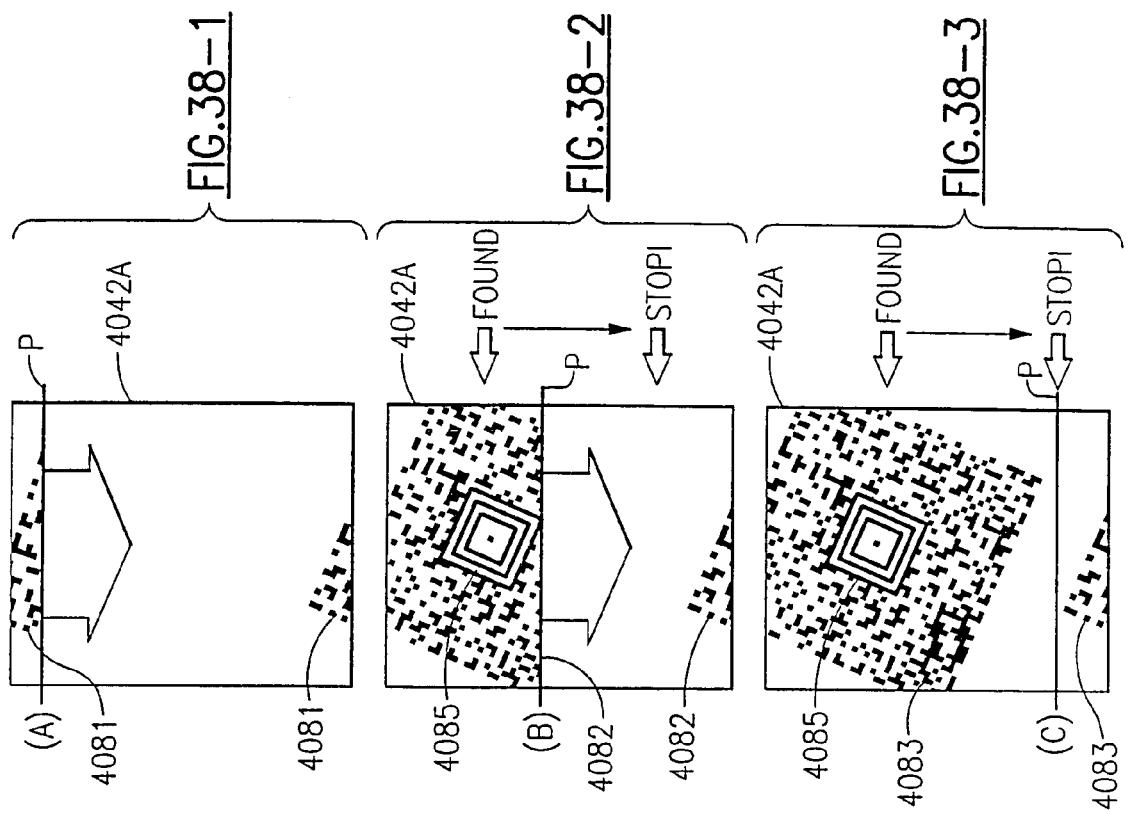
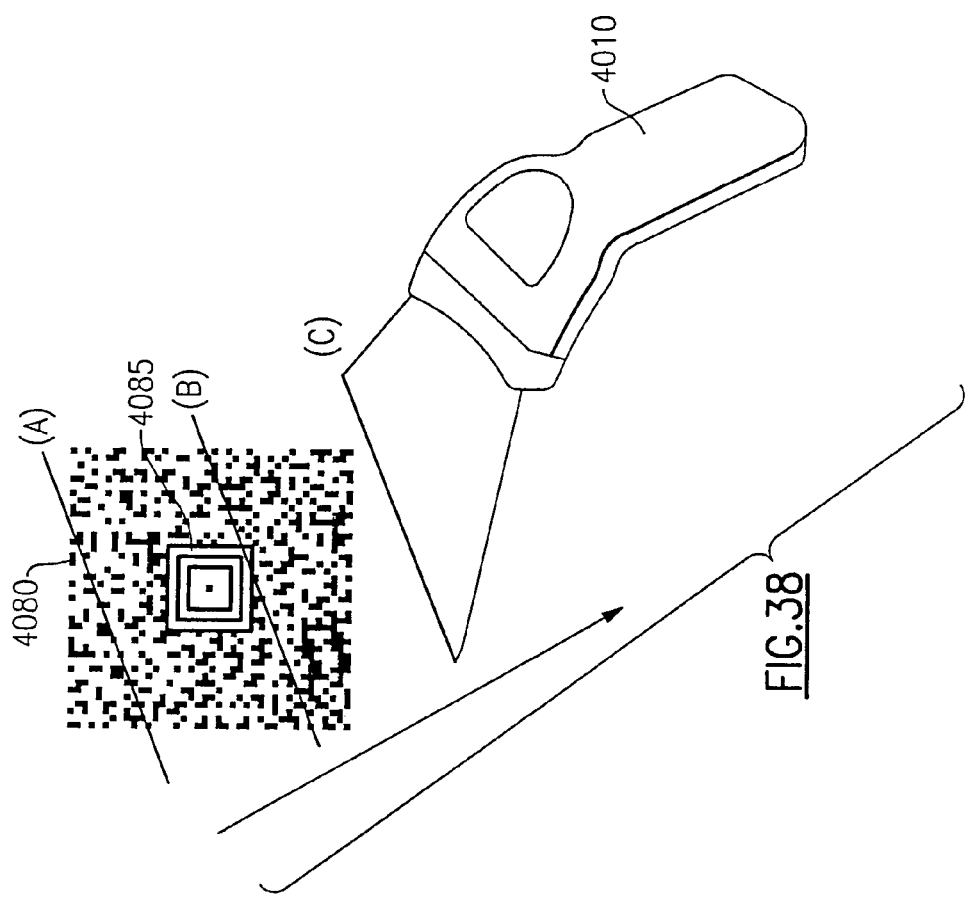
FIG. 38

OPTICAL READER COMPRISING ILLUMINATION ASSEMBLY AND SOLID STATE IMAGE SENSOR

CROSS REFERENCES TO RELATED APPLICATIONS

This application is a divisional of U.S. patent application Ser. No. 09/385,597 filed on Aug. 30, 1999, which is a continuation-in-part of U.S. patent application Ser. No. 08/839,020 filed Apr. 23, 1997, which issued as U.S. Pat. No. 5,965,863 on Oct. 12, 1999, which is a continuation-in-part of U.S. patent application Ser. No. 08/697,913 filed on Sep. 3, 1996, which issued as U.S. Pat. No. 5,900,613 on May 4, 1999, which is a continuation-in-part of U.S. patent application Ser. No. 08/516,185 filed Aug. 18, 1995, which is now abandoned, which is a continuation-in-part of U.S. patent application Ser. No. 08/205,539 filed on Mar. 4, 1994, which issued as U.S. Pat. No. 5,463,214, the aforementioned U.S. patent application Ser. No. 08/697,913 filed Sep. 3, 1996 also being a continuation-in-part of U.S. patent application Ser. No. 08/504,643 filed Jul. 20, 1995, which issued as U.S. Pat. No. 5,773,806 on Jun. 30, 1998. The priorities of all of the above applications are claimed, and the disclosure of each of the above applications is incorporated herein by reference in its entirety.

BACKGROUND OF THE INVENTION

The present invention relates to optical reading devices, and is directed more particularly to an optical reading device that can read bar code symbols.

DESCRIPTION OF THE PRIOR ART

One-dimensional optical bar code readers are well known in the art. Examples of such readers include readers of the SCANTEAM® 3000 Series manufactured by Welch Allyn, Inc. Such readers include processing circuits that are able to read one-dimensional (1D) linear bar code symbologies, such as the UPC/EAN code, Code 39, etc., that are widely used in supermarkets. Such 1D linear symbologies are characterized by data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed, including Code 49, as described in U.S. Pat. No. 4,794,239 (Allais), and PDF417, as described in U.S. Pat. No. 5,340,786 (Pavlidis, et al). Stacked symbols partition the encoded data into multiple rows, each including a respective 1D bar code pattern, all or most all of which must be scanned and decoded, then linked together to form a complete message. Scanning still requires relatively high resolution in one dimension only, but multiple linear scans are needed to read the whole symbol.

A third class of bar code symbologies, known as two-dimensional (2D) matrix symbologies, have been developed which offer orientation-free scanning and greater data densities and capacities than their 1D counterparts. Two-dimensional matrix codes encode data as dark or light data elements within a regular polygonal matrix, accompanied by graphical finder, orientation and reference structures. When scanning 2D matrix codes, the horizontal and vertical relationships of the data elements are recorded with about equal resolution.

In order to avoid having to use different types of optical readers to read these different types of bar code symbols, it is desirable to have an optical reader that is able to read symbols of any or these types, including their various subtypes, interchangeably and automatically. More particularly, it is desirable to have an optical reader that is able to read all three of the above-mentioned types of bar code symbols, without human intervention, i.e., automatically. This in turn, requires that the reader have the ability to automatically discriminate between and decode bar code symbols, based only on information read from the symbol itself. Readers that have this ability are referred to as "autodiscriminating" or having an "autodiscrimination" capability.

If an autodiscriminating reader is able to read only 1D bar code symbols (including their various subtypes), it may be said to have a 1D autodiscrimination capability. Similarly, if it is able to read only 2D bar code symbols, it may be said to have a 2D autodiscrimination capability. If it is able to read both 1D and 2D bar code symbols interchangeably, it may be said to have a 1D/2D autodiscrimination capability. Often, however, a reader is said to have a 1D/2D autodiscrimination capability even if it is unable to discriminate between and decode 1D stacked bar code symbols.

Optical readers that are capable of 1D autodiscrimination are well known in the art. An early example of such a reader is the Welch Allyn SCANTEAM® 3000, manufactured by Welch Allyn, Inc.

Optical readers, particularly hand held optical readers, that are capable of 1D/2D autodiscrimination are less well known in the art, since 2D matrix symbologies are relatively recent developments. One example of a hand-held reader of this type which is based on the use of an asynchronously moving 1D image sensor, is described in copending, commonly assigned U.S. Pat. No. 5,773,806, which application is hereby expressly incorporated herein by reference. Another example of a hand-held reader of this type which is based on the use of a stationary 2D image sensor, is described in copending, commonly assigned U.S. patent application Ser. No. 08/914,883, now U.S. Pat. No. 5,942,741, which is also hereby expressly incorporated herein by reference.

Optical readers, whether of the stationary or movable type, usually operate at a fixed scanning rate. This means that the readers are designed to complete some fixed number of scans during a given amount of time. This scanning rate generally has a value that is between 30 and 200 scans/sec for 1D readers. In such readers the results of successive scans are decoded in the order of their occurrence.

Prior art optical readers operate relatively satisfactorily under conditions in which the data throughput rate, or rate at which data is scanned and decoded, is relatively low. If, for example, the scanning rate is relatively low and/or the data content of the bar code or other symbol is relatively small, i.e., the scanner is operating under a relatively light decoding load, the decoding phase of the reading process can be completed between successive scans. Under these conditions scan data can be accurately decoded without difficulty.

Readers of the above-described type have the disadvantage that, if they are operated under relatively heavy decoding loads, i.e., are required to rapidly scan symbols that have a relatively high data content, the tracking relationship or synchronism between the scanning and decoding phases of the reading process will break down. This is because under heavy decoding loads the decoding phase of a read operation takes longer than the scanning phase thereof, causing the decoding operation to lag behind the scanning operation. While this time lag can be dealt with for brief periods by storing the results of successive scans in a scan memory and decoding the results of those scans in the order of their occurrence when the decoder becomes available, it cannot be dealt with in this way for long. This is because, however large the scan memory, it will eventually overflow and result in a loss of scan data.

One set of solutions to the problem of maintaining the desired tracking relationship between the scanning and decoding phases of the reading process is described in previously mentioned copending U.S. patent application Ser. No. 08/914,883. Another set of solutions to the problem of maintaining the desired tracking relationship between the scanning and decoding phases of the reading process is described in U.S. Pat. No. 5,463,214, which issued on the parent application of the last mentioned copending patent application.

Generally speaking the latter of these two sets of solutions to the above-discussed tracking problem involves the suspension of scanning for brief periods in order to assure that the scanning process does not pull too far ahead of the decoding process. The former of these two sets of solutions to the above-discussed tracking problem, on the other hand, involves the skipping over of one or more sets of scan data, in favor of more current scan data, if and to the extent necessary for tracking purposes, in combination with the use of two or more scan data memories to minimize the quantity of scan data that is skipped.

Prior to the present invention, no consideration has been given to accomplishing scan-decode tracking in conjunction with 1D/2D autodiscrimination, i.e., as cooperating parts of a single coordinated process. This is in spite of the fact that the 1D/2D autodiscrimination is known to involve heavy decoding loads of the type that give rise to tracking problems. Thus, a need has existed for an optical reader that combines a powerful tracking capability with a powerful 1D/2D autodiscrimination capability.

As new and/or improved 1D and 2D bar code symbologies, and as additional 1D and 2D decoding programs come into widespread use, previously built optical readers may or may not be able to operate therewith. To the extent that they cannot operate therewith, such previously built optical readers will become increasingly obsolete and unusable.

In the past, the problem of updating optical readers to accommodate new bar code symbologies and/or new decoding programs has been dealt with by manually reprogramming the same. One approach to accomplishing this reprogramming is to reprogram a reader locally, i.e., on-site, by, for example, replacing a ROM chip. Another approach to accomplishing this reprogramming is to return it to the manufacturer or his service representative for off-site reprogramming. Because of the expense of the former and the time delays of the latter, neither of these approaches may be practical or economical.

The above-described problem is compounded by the fact that, if an optical reader is not equipped to operate as a tracking reader, it may not be possible to reprogram it to use an autodiscrimination program that is designed to be executed in conjunction with tracking. This is because the autodiscrimination program may include steps that require the tracking feature to prevent data from overflowing the scan memory and being lost. Alternatively, the scan rate may be decreased, although this reduction will adversely affect performance when low data content symbols are read. Thus, a need has existed for an optical reader that can be reprogrammed economically in a way that allows it to realize the full benefit of the 1D/2D autodiscrimination and tracking features, among others.

SUMMARY OF THE INVENTION

There is provided a system and method for programming bar code reading devices. A method in one embodiment includes encoding a bar code symbol, displaying a bar code symbol, and reading the displayed bar code symbol. A system and method in another embodiment includes a first bar code reading device configured to initiate a command to print a bar code symbol which when read by a second bar code reading device can cause the second bar code reading device to operate in the manner of the first bar code reading device. A bar code reading device in another embodiment includes reprogramming circuitry enabling the bar code reading device to be reprogrammed either by way of receipt of programming data over a radio frequency communication line or by way of processing memory stored image data.

BRIEF DESCRIPTION OF THE DRAWINGS

Other objects and advantages will be apparent from the following description and drawings, in which:

FIGS. 4D, 4E, and 4F are oblique or partially cutaway views of an alternative embodiment of the reader apparatus of FIG. 2;

FIG. 7A shows the structure of one embodiment of a menu word or message suitable for use with the program of FIG. 6A;

FIGS. 7B and 7C are tables showing examples of the usages to which various parts of the menu word of FIG. 7A may be put;

FIGS. 8A–8D are examples of option symbol selection charts which may be used with the menuing feature;

FIG. 9 is a block diagram of a typical system with which the reading apparatus may be used;

FIG. 11A is a flow diagram illustrating a primary program for a host processor configured for reprogramming of, and for other interactions with an optical reader;

FIG. 11B is a flow diagram illustrating a subprogram for reprogramming an optical reader in communication with a host processor;

FIG. 11C is a memory map for a memory space having stored thereon an operating program comprising a main program and a parameter table;

FIG. 11D is a flow diagram for a subprogram executed by a host processor for editing a parameter table;

FIGS. 17A through 17E are drawings which facilitate an understanding of the flow chart of FIG. 16;

FIG. 24A shows timing diagrams illustrating the scanning and decoding operations of all embodiments under light decoding loads;

FIG. 24B illustrates the scanning and decoding operations of the embodiment described in prior U.S. Pat. No. 5,463,214 when operating under heavy decoding loads;

FIGS. 24C, 24D and 24E illustrate the scanning and decoding operations of various embodiments described herein when operating under heavy decoding loads;

FIG. 38 shows the bar code reader being moved across a 2D bar code symbol;

FIGS. 38-1, 38-2 and 38-3 show the contents of the image memory at various stages in the scanning of the symbol of FIG. 38;

DETAILED DESCRIPTION OF THE INVENTION

Figure 1:
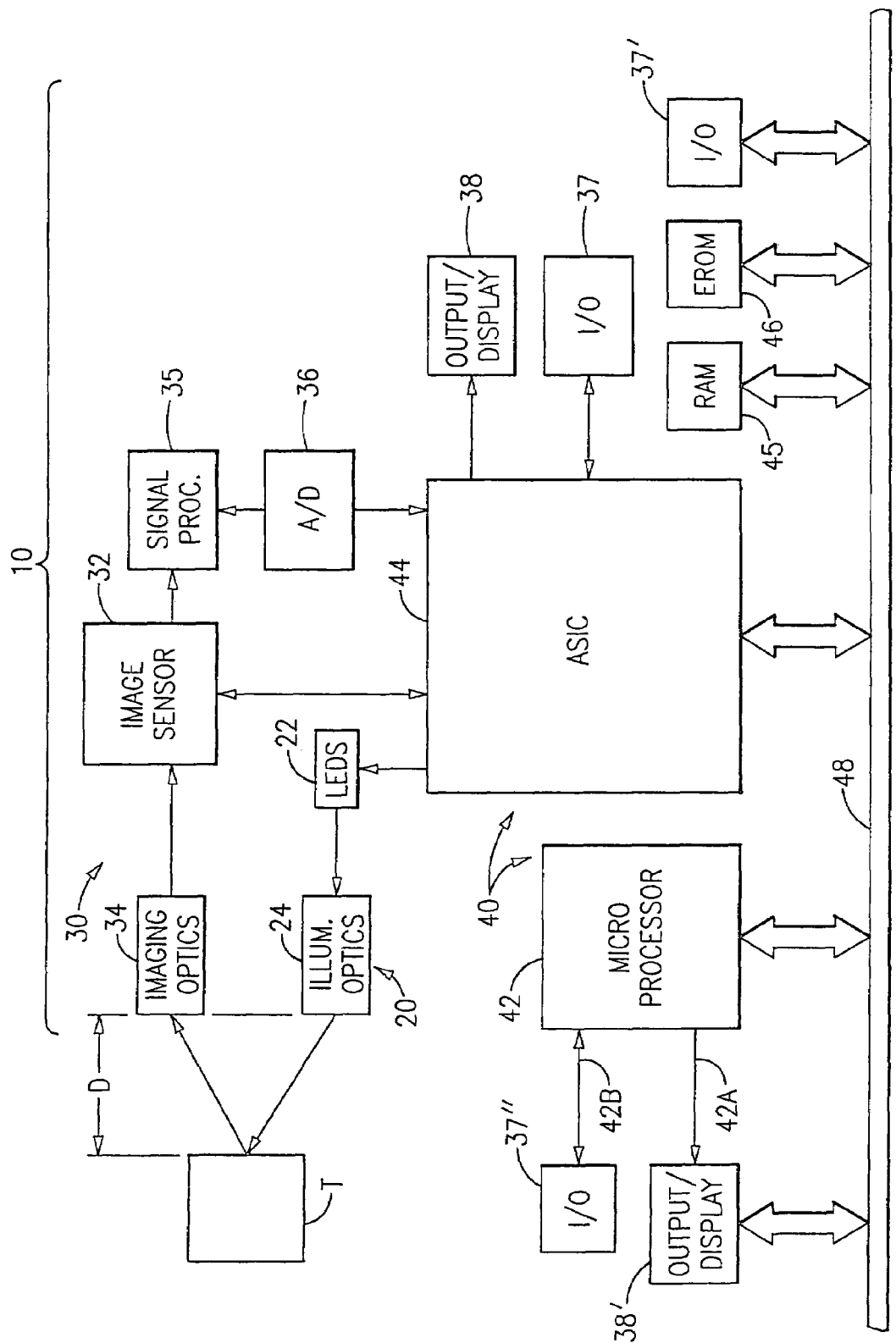
FIG. 1 is a block diagram of an embodiment of the reading apparatus which is generic to reading apparatuses which utilize 1D and 2D image sensors.
Figure 2:
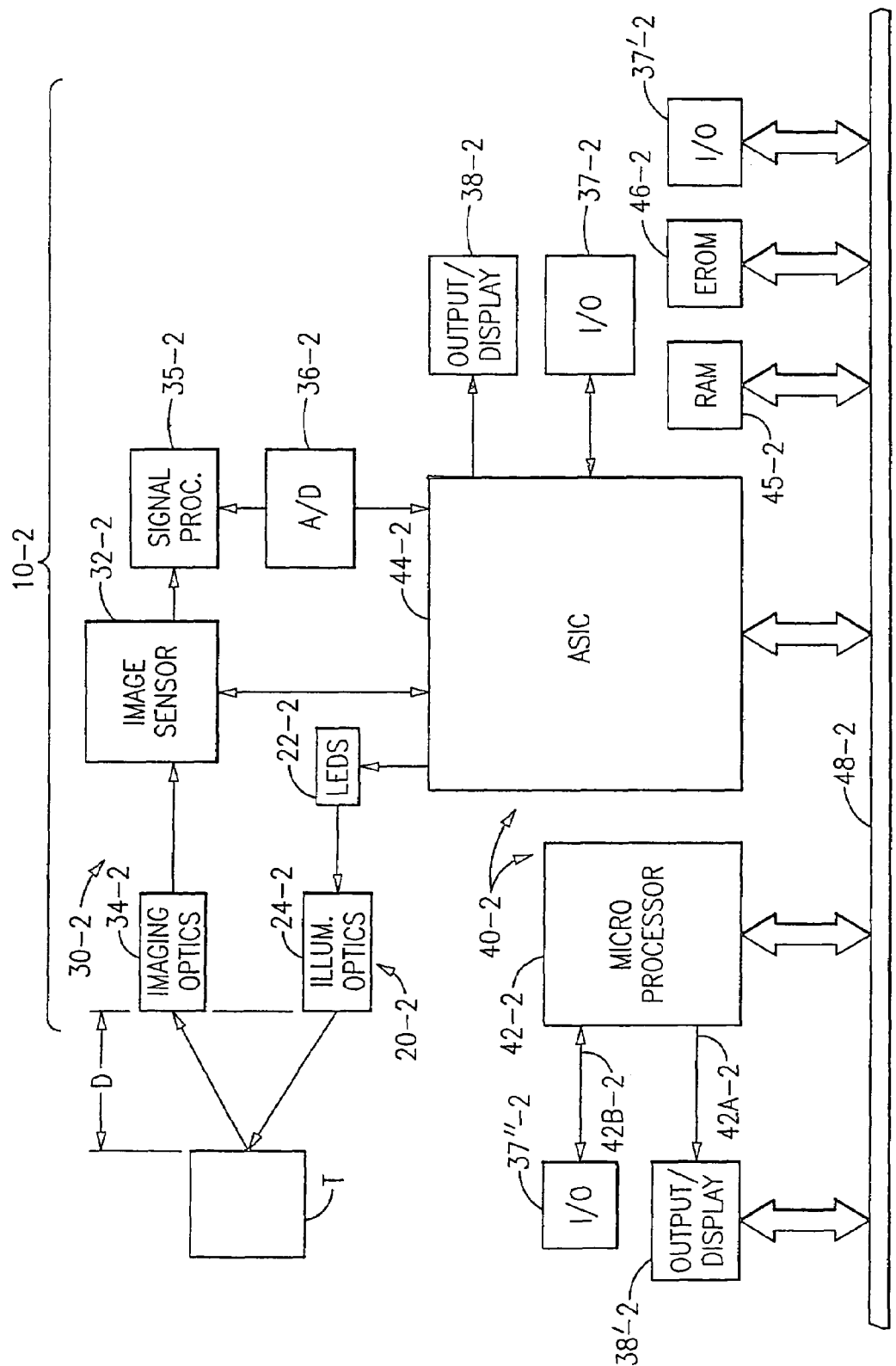
FIGS. 2 and 3 are block diagrams of embodiments of the reading apparatus which utilize 2D and 1D image sensors, respectively.
Figure 3:
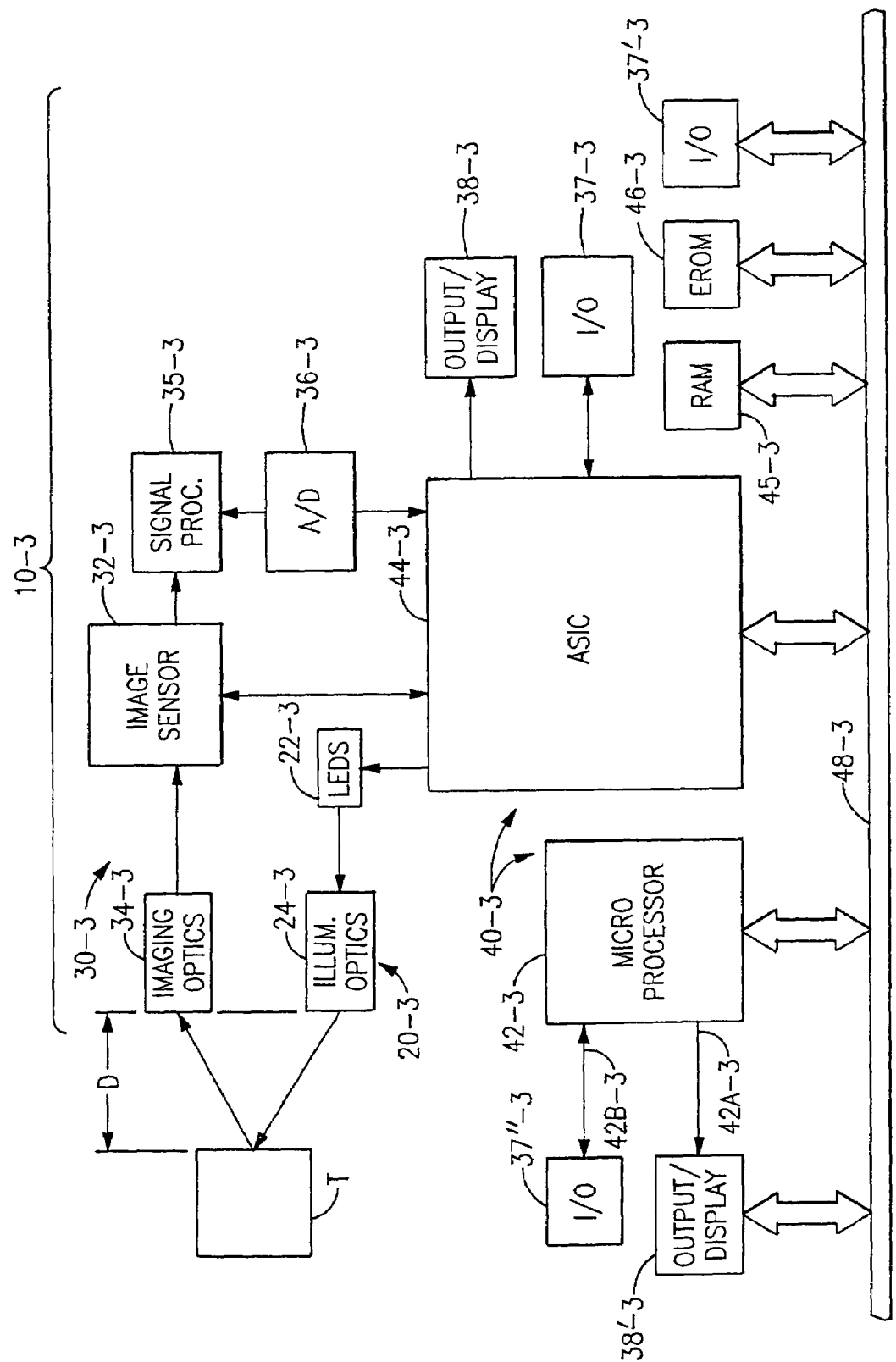

Referring to FIG. 1 there is shown a block diagram of an optical reader 10. As will be explained more fully later, FIG. 1 shows the basic structures that together comprise the general form of an optical reader that is suitable for use, and is generic to optical readers that use 1D image sensors and to optical readers that use 2D image sensors. Similarly, FIG. 2 shows the basic structures that together comprise the general form of optical readers that use 2D image sensors. Finally, FIG. 3 shows the basic structures that together comprise the general form of optical readers that use 1D image sensors. Features described herein are equally applicable to readers that use 1D or 2D image sensors, and to readers that use sensors of either type to read both 1D and 2D symbols. It will be understood that, except where specifically limited to readers having 2D or 1D image sensors, the present description refers generically to readers of any of the types shown in FIGS. 1, 2 and 3.

Referring first to FIG. 1, the optical reader includes an illumination assembly 20 for illuminating a target object T, such as a 1D or 2D bar code symbol, and an imaging assembly 30 for receiving an image of object T and generating an electrical output signal indicative of the data optically encoded therein. Illumination assembly 20 may, for example, include an illumination source assembly 22, such as one or more LEDs, together with an illuminating optics assembly 24, such as one or more reflectors, for directing light from light source 22 in the direction of target object T. Illumination assembly 20 may be eliminated, if ambient light levels are certain to be high enough to allow high quality images of object T to be taken. Imaging assembly 30 may include an image sensor 32, such as a 1D or 2D CCD, CMOS, NMOS, PMOS, CID or CMD solid state image sensor, together with an imaging optics assembly 34 for receiving and focusing an image of object T onto image sensor 32. The array-based imaging assembly shown in FIG. 2 may be replaced by a laser array or laser scanning based imaging assembly comprising a laser source, a scanning mechanism, emit and receive optics, a photodetector and accompanying signal processing circuitry.

Optical reader 10 of FIG. 1 also includes programmable control means 40 which preferably comprises an integrated circuit microprocessor 42 and an application specific integrated circuit or ASIC 44. Processor 42 and ASIC 44 are both programmable control devices which are able to receive, output and process data in accordance with a stored program stored in either or both of a read/write random access memory or RAM 45 and an erasable read only memory or EROM 46. Processor 42 and ASIC 44 are also both connected to a common bus 48 through which program data and working data, including address data, may be received and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor which has overall control of the circuitry of FIG. 1, but which devotes most of its time to decoding image data stored in RAM 45 in accordance with program data stored in EROM 46. Processor 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processors 42 and 44 will naturally depend on the type of off-the-shelf microprocessors that are available, the type of image sensor which is used, the rate at which image data is output by imaging assembly 30, etc. There is nothing in principle, however, that requires that any particular division of labor be made between processors 42 and 44, or even that such a division be made at all. This is because special purpose processor 44 may be eliminated entirely if general purpose processor 42 is fast enough and powerful enough to perform all of the functions contemplated. It will, therefore, be understood that neither the number of processors used, nor the division of labor there between, is of any fundamental significance.

With processor architectures of the type shown in FIG. 1, a typical division of labor between processors 42 and 44 will be as follows. Processor 42 is preferably devoted primarily to the tasks of decoding image data, once such data has been stored in RAM 45, handling the menuing options and reprogramming functions, and providing overall system level coordination. Processor 44 is preferably devoted primarily to controlling the image acquisition process, the A/D conversion process and the storage of image data, including the ability to access memories 45 and 46 via a DMA channel. Processor 44 may also perform many timing and communication operations. Processor 44 may, for example, control the illumination of LEDs 22, the timing of image sensor 32 and an analog-to-digital (A/D) converter 36, the transmission and reception of data to and from a processor external to reader 10, through an RS-232 (or other) compatible I/O device 37 and the outputting of user perceptible data via an output device 38, such as a beeper, a good read LED and/or a display 39 which may be, for example, a liquid crystal display. Control of output, display and I/O functions may also be shared between processors 42 and 44, as suggested by bus driver I/O and output/display devices 37' and 38' or may be duplicated, as suggested by microprocessor serial I/O ports 42A and 42B and I/O and display devices 37" and 38". As explained earlier, the specifics of this division of labor is not of significance.

Referring to FIG. 2, there is shown a block diagram of an optical reader which is similar to that of FIG. 1, except that it includes optical and/or electrical assemblies and circuits that are specifically designed for use with a 2D image sensor. Accordingly, the optical and electrical assemblies and components of FIG. 2 are labeled with the same numbers used in FIG. 1, except for the addition of the suffix "-2". For example, image sensor 32-2 of FIG. 2 is a 2D image sensor which corresponds to generic image sensor 32 of FIG. 1, imaging optics assembly 34-2 of FIG. 2 is a 2D imaging optics assembly which corresponds to generic imaging optics assembly 34 of FIG. 1, and so on. In other words, corresponding elements of FIGS. 1 and 2 have corresponding functions, although they may have different shapes and part numbers. Provided that these differences are taken into account, however, the description of the reader of FIG. 1 is equally applicable to the reader of FIG. 2, and will not be repeated herein.

One specific practical example of an optical reader of the type shown in FIG. 2 may be constructed using the particular commercially available solid-state integrated circuits listed in the following component table:

| COMPONENT TABLE - FIG. 2 | |
|---|---|
| Block Diagram Item | Manufacturer/Part Number |
| Image Sensor 32-2 | VVL 1060B+ |
| Prog. Gate Array 44-2 | Actel 814V40A |
| Microprocessor 42-2 | IDT 3081 |
| EROM 46-2 | Intel 28F400VB-B60 |
| RAM 45-2 | Toshiba TC51V4265DFT-60 |

Referring to FIG. 3, there is shown a block diagram of an optical reader which is also similar to that of FIG. 1, except that it includes optical and/or electrical assemblies and circuits that are specifically designed for use with a 1D image sensor. Accordingly, the optical and electrical assemblies and components of FIG. 3 are labeled with the same numbers used in FIG. 1, except for the addition of the suffix "-3". For example, image sensor 32-3 of FIG. 3 is a 1D image sensor which corresponds to generic image sensor 32 of FIG. 1, imaging Optics assembly 34-3 of FIG. 3 is a 1D imaging optics assembly which corresponds to generic imaging optics assembly 34 of FIG. 1, and so on. Provided that these differences are taken into account, however, the description of the reader of FIG. 1 is equally applicable to the reader of FIG. 3, and will not be repeated herein.

One specific practical example of an optical reader of the type shown in FIG. 3 may be constructed using the particular solid-state circuits listed in the following component table:

| COMPONENT TABLE - FIG. 3 | |
|---|---|
| Block Diagram Item | Manufacturer/Part Number |
| Image Sensor 32-3 | Toshiba 1201 |
| Prog. Gate Array 44-3 | Welch Allyn 21203276-01 |
| Microprocessor 42-3 | Motorola HCII |
| EROM 46-3 | Atmel AT 29C257 |
| RAM 45-3 | Sony CXK 5864-BM-10LL |

Significantly, the above-mentioned structural correspondences between FIGS. 1, 2 and 3 should not be confused with the types of symbols that may be read thereby. More particularly, the 2D embodiment of FIG. 2 may be used to scan and decode both 1D and 2D bar code symbols. This is because both types of symbols can be imaged by a 2D image sensor. Similarly, the 1D embodiment of FIG. 3 may also be used to scan and decode both 1D and 2D bar code symbols. This is because a 1D image sensor may be used to image a 2D bar code symbol, provided that it is physically moved there across during the course of a scan. Because imaging of the latter type is described in detail in copending U.S. patent application Ser. No. 08/504,643, which has been incorporated by reference herein, that type of imaging assembly will not be discussed again in full herein.

The reader structures shown in FIG. 2 are preferably supported on one or more printed circuit boards (not shown) that are, in turn, supported within a housing.

Figure 4A:
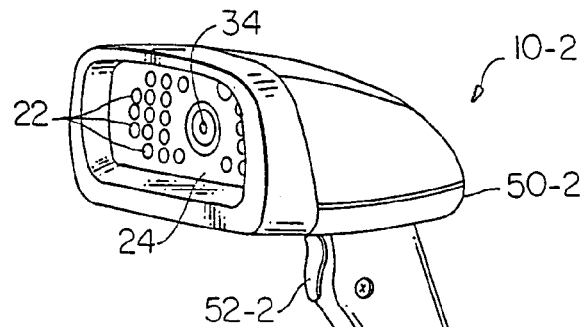
FIGS. 4A, 4B, and 4C are oblique or partially cutaway views of the 2D reading apparatus of FIG. 2.
Figure 4B:
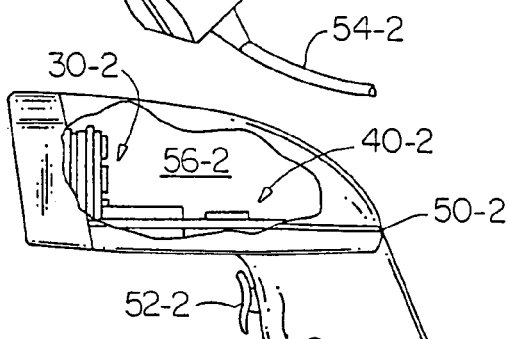
Figure 4C:
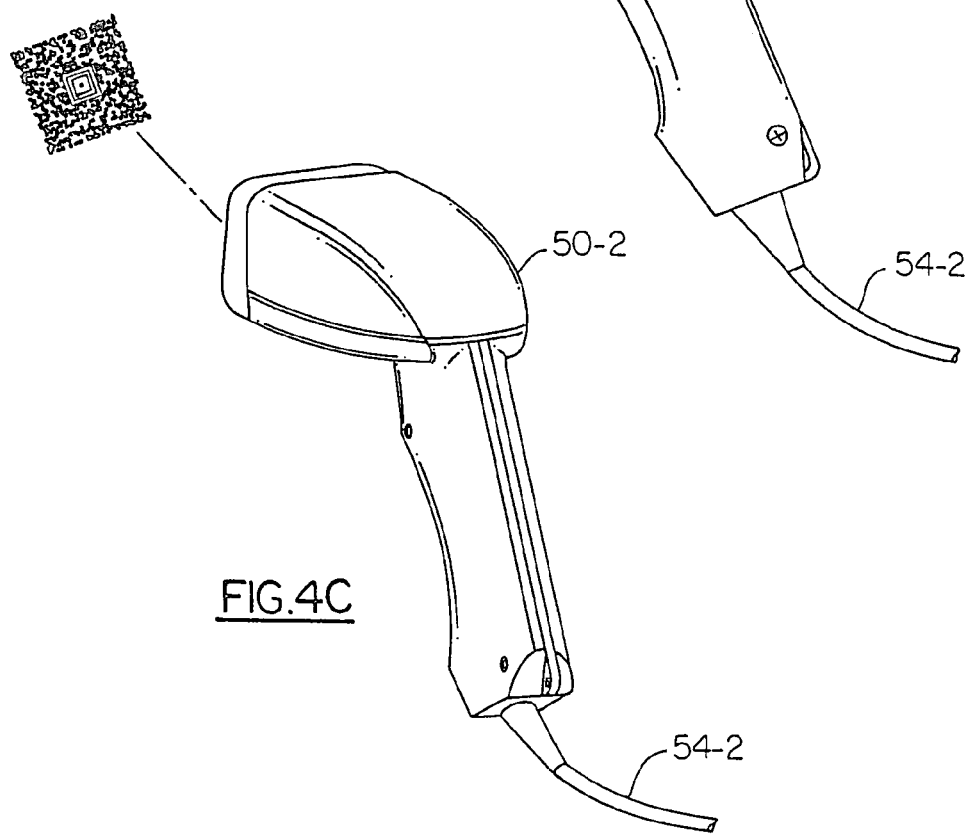
Figure 4G:
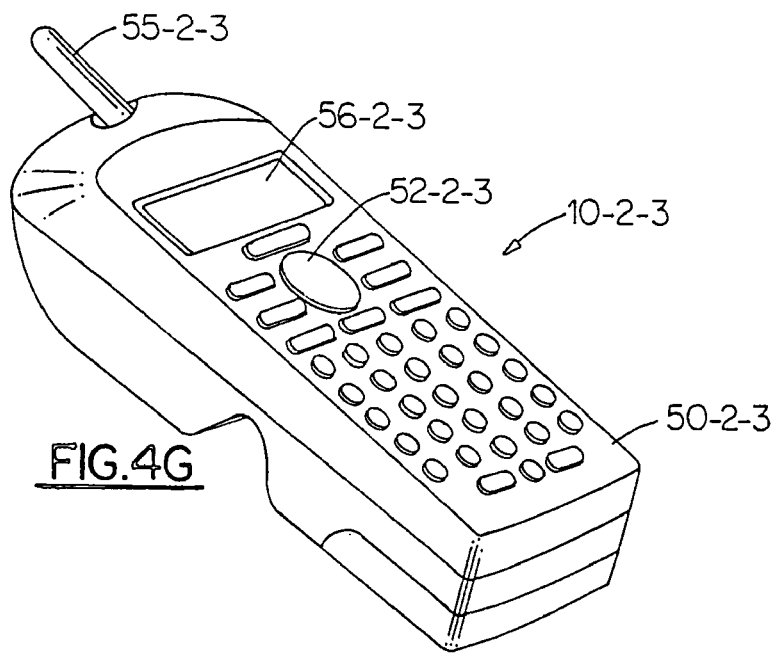
FIGS. 4G, 4H, and 4I are oblique or partially cutaway views of another alternative embodiment of the reader apparatus of FIG. 2.
Figure 4H:
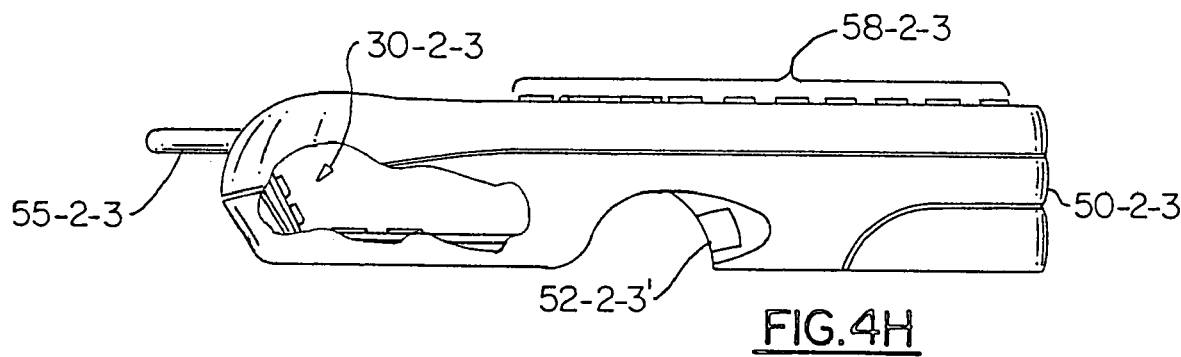
Figure 4I:
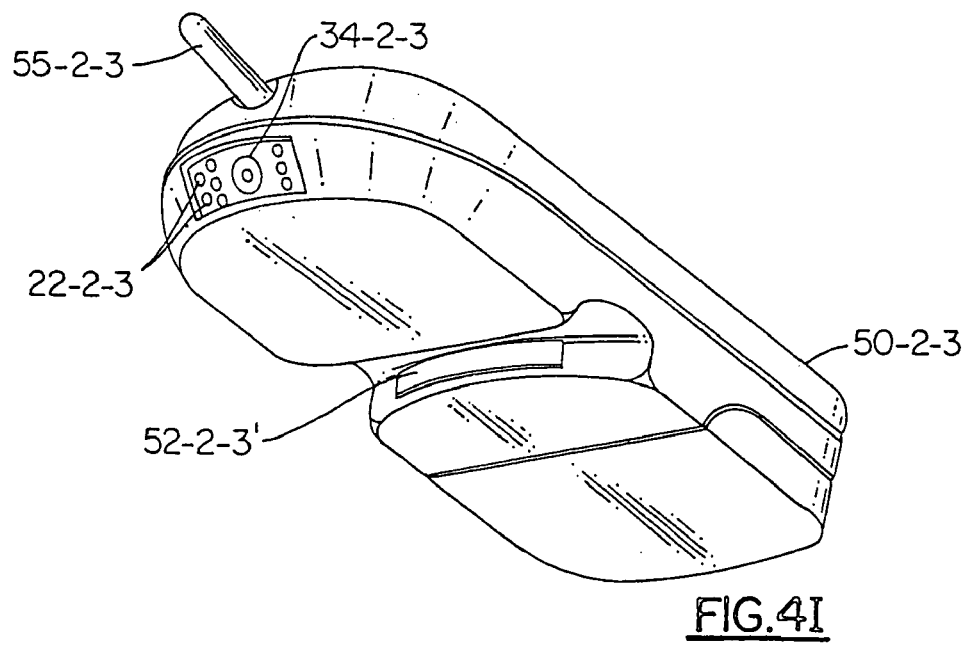

Examples of types of housings which may be employed to house elements of the reader apparatus shown in FIG. 2 are shown in FIGS. 4A–4I. FIGS. 4A–4C show a first exemplary housing 50-2-1, FIGS. 4D–4F show a second exemplary housing 50-2-2, while FIGS. 4G–4I show a third exemplary housing 50-2-3. Housings 50-2-1, 50-2-2, and 50-2-3 are preferably shaped so as to fit comfortably into a human hand, and to include a finger actuatable trigger, 52-2-1, 52-2-2, and 52-2-3. Housing 50-2-3 is shown as having an auxiliary trigger 52-2-3' which may supplement or replace trigger 52-2-3. Housings 50-2-1 and 50-2-2 have extending there from multiconductor cable or tether 54-2-1 and 54-2-2, for providing communication with a local host processor, whereas 50-2-3 housing has extending there from an antenna 55-2-3 for providing a communication with a local host processor. It is seen further that housings 50-2-2 and 50-2-3 have incorporated therein displays 56-2-2, 56-2-3, for displaying information to a user, and a keyboard 58-2-2 and 58-2-3, for inputting data and commands to processor 40.

Figure 5A:
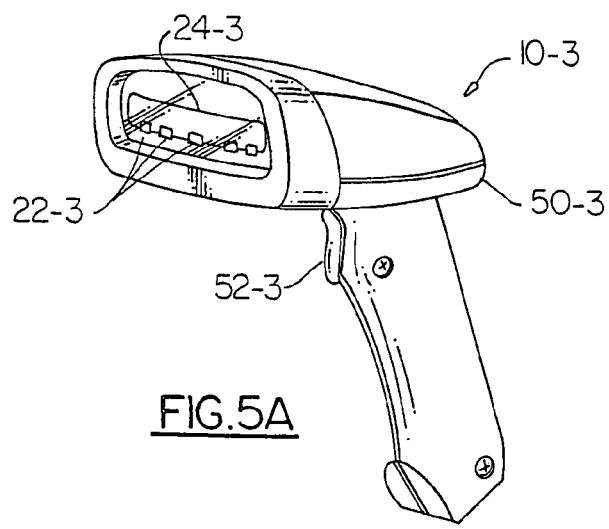
FIGS. 5A, 5B, and 5C are oblique or partially cutaway views of the 1D reading apparatus of FIG. 3.
Figure 5B:
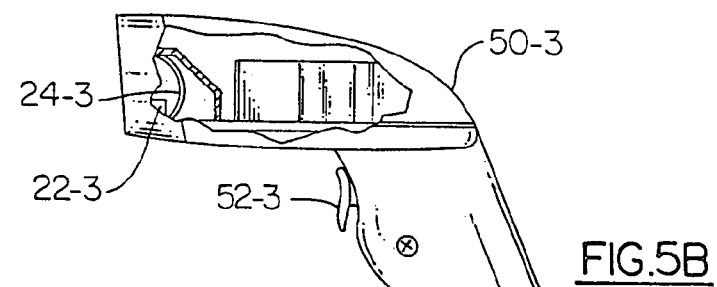
Figure 5C:
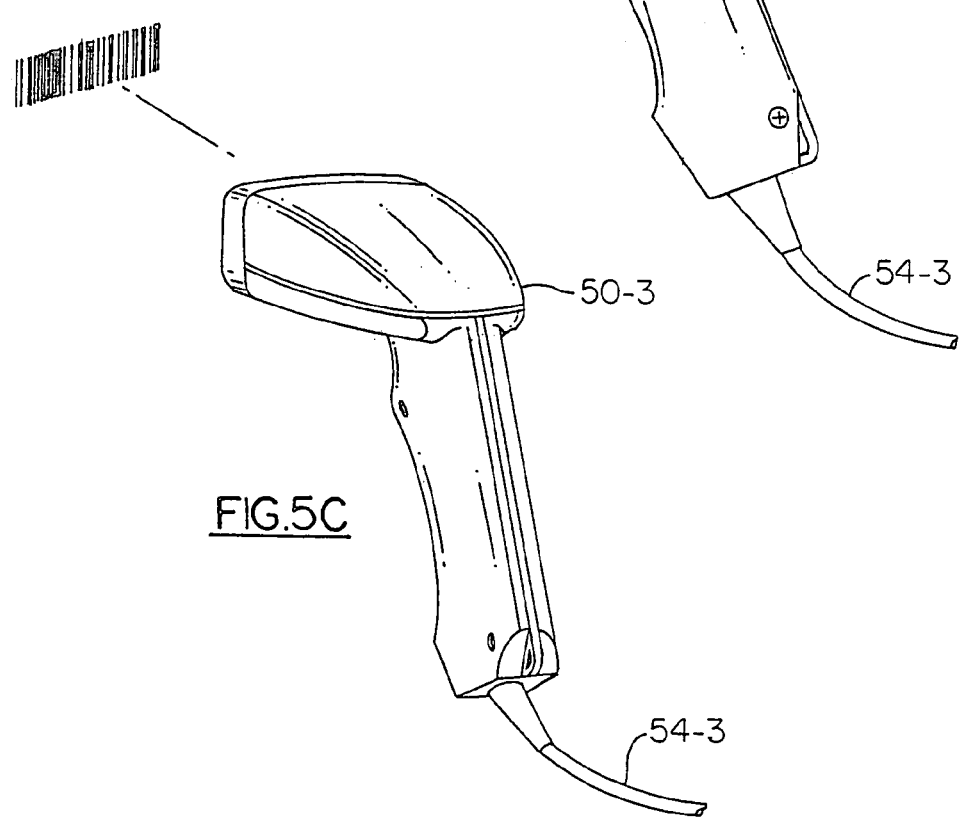

FIGS. 5A–5C show a housing 50-3 suitable for housing a 1D reader apparatus of the type described with reference to FIG. 3. Housing 50-3 includes a finger-actuatable trigger 52-3 and has extending there from a cable 54-3 for providing communication with a local host processor. Although not shown as containing such features, it is understood that housing 50-3 could readily be modified to include a display and a keyboard similar to those of 2D reader housings 50-2-2 and 50-2-3.

Main Program

Figure 6A:
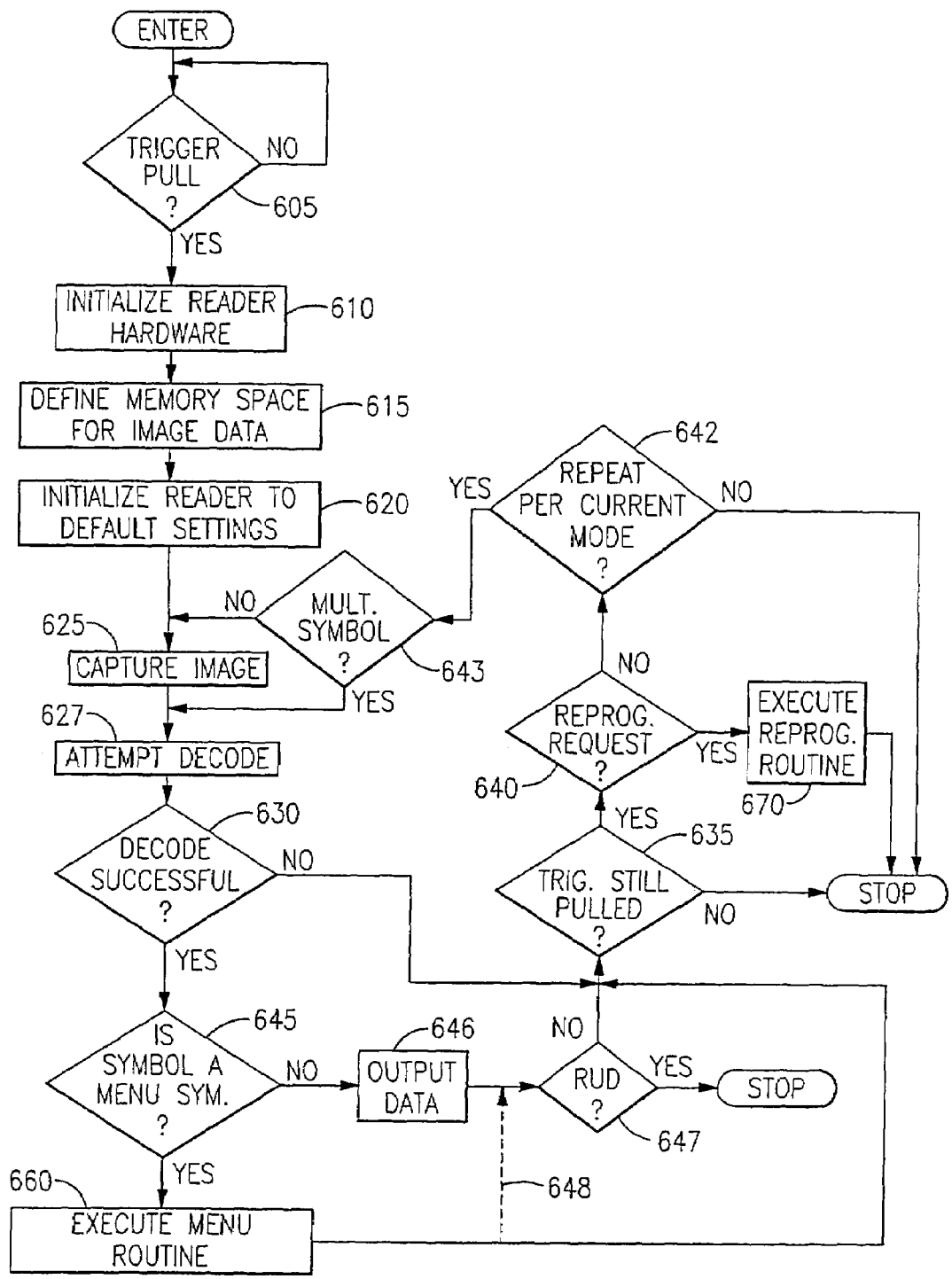
FIG. 6A is a flow chart of the main program of the reading apparatus.

The overall operation of the reader of FIG. 1 will now be described with reference to the flow chart of FIG. 6A. As will be explained more fully presently, FIG. 6A comprises a high level flow chart which illustrates the preferred embodiment of the main program of a reader which uses the apparatus and method. By "main program" is meant the program that illustrates the relationships between the major subdivisions or subroutines that together implement the above-described features. It also means the program that illustrates the overall flow and sequence of operations that are responsible for the advantages produced. Because FIG. 6A depicts the operation of two processors 42 and 44, however, operations that appear to be occurring sequentially may actually be occurring "simultaneously." Processor 44 may, for example, be imaging and storing newly scanned blocks of image data in RAM 45 while processor 42 is decoding blocks of image data that were stored in RAM 45 during earlier scans. This is possible because the two processors are operating in different memory spaces, in different time slots, or under the common control of a bus arbitration device. As a result, while the processors can never use the same memory or address space at the same time for conflicting purposes, they can be made to execute their respective programs sufficiently cooperatively and contemporaneously that they are effectively operating simultaneously. It is in this sense that the word "simultaneous" will be used herein.

Referring to FIG. 6A, the main program begins with block 605 which causes the reader to wait in a low power state until trigger 52 is pulled. When the trigger is pulled, the processor is directed to block 610, which causes it to power up and initialize the reader hardware, including the ASIC, the DMA channel and the I/O devices, among others. The processor is then directed to blocks 615 and 620 which cause it to define the image data memory space that will be used (block 615) and to initialize the reader with the default values of the operating parameters stored in the parameter table thereof (block 620).

The parameter table, which is preferably stored in EROM 46, specifies the values of the parameters that define the mode in which the reader will operate. Examples of these parameters include the size and the frame rate of the image sensor, the codes that will be enabled during autodiscrimination, the I/O communication protocols, beeper pitch or volume, among others. The default values of these parameters are those which will be used if the user or an externally generated reprogramming command does not specify other values, and correspond to a combination of parameters which are suitable for use under most operating conditions. The different parameters that may be used, and the effect that they have on the operation of the reader will be discussed in detail later.

After the reader has been initialized, the processor proceeds to blocks 625 and 627, which call for it to capture and attempt to decode an image of the target symbol. This involves the performance of a number of related steps, the particulars of which are determined by the parameters of the parameter table. Included among these steps are a scanning subroutine which specifies the address space or spaces in which scan data will be stored and whether scanning is to be continuous (e.g., at a full video rate, such as 30 frames per second), or discontinuous (e.g., with pauses related to the current state of the trigger). The operation of the decoding routine, which is executed in a user or factory selectable relationship to the scanning routine, is governed by parameters which control the codes which are enabled for processing as a part of the autodiscrimination process, whether decoding is to be continuous or discontinuous, etc. As will be explained more fully later, permitted combinations of scanning and decoding parameters together define the scanning-decoding relationships or modes which the reader will use.

After exiting block 627, the processor is directed to block 630 which, if the decoding attempt was not successful, is directed back to block 625 unless the trigger has been released (block 635) or unless reprogramming request has been received (block 640), or unless a stop or no-repeat request is called for by the current operating mode of the reader (block 642). The loop defined by blocks 625–642 will be the path repeatedly followed by the processor when autodiscrimination sequences are performed unsuccessfully, and no menuing or programming changes are called for, and no stop request is in effect. If this loop is interrupted by the user's release of the trigger, or by a successful decode, or by a reprogram request, or by a stop request, the reader will be directed by block 635 to stop and wait in a low power state until further processing is called for.

In the above-described loop, block 642 serves the function of stopping the repetitive scanning and decoding of the target symbol in those scanning-decoding modes or under those conditions in which a repetition of scanning and/or decoding is not called for. In the One Shot mode, for example, scanning and decoding are discontinued after one decoding attempt, whether or not that attempt is successful, without regard to the state of the trigger. Similarly, in the Repeat Until Stopped mode, scanning and decoding may be discontinued either by command, via block 642, or by the release of the trigger via block 635. Thus, block 642 comprises at least a part of the means by which the reader gives effect to the scanning-decoding parameters of the parameter table.

If block 630 indicates that the last decoding attempt was successful, the processor is directed to a block 645 which calls for a determination of whether the result of the decoding indicates that the decoded symbol was or was not a menu symbol. This determination may be made on the basis of results of the decoding, because all menu symbols are encoded with data that identifies them as such during decoding. If the decoded symbol is not a menu symbol, it is known that the symbol contained data that is to be output by the reader. In the latter event, the processor is directed to block 646, which causes it to output the data and, proceed to block 647.

Block 647, like block 642, comprises part of the means by which the reader gives effect to the scanning-decoding modes called for by the parameter table. In particular, if decoding is successful (block 630) and has been output (block 646), block 647 discontinues scanning and decoding if the Repeat Until Done mode is in effect. If any other mode is in effect, scanning and decoding will continue unless blocks 635, 640 or 642 call for a different result.

If the decoded symbol is a menu symbol, block 645 directs the processor to perform the menuing routine called for by block 660 before returning to block 635. As will be explained more fully later in connection with FIG. 8, the latter routine enables the user to command the reader to perform any of a variety of different tasks, several of which include making user specified changes to the parameter table, thereby changing the operating mode of the reader, and the performance of any of a variety of user specified vector processing routines that do not change the parameter table. Once either of the latter tasks have been performed, the reader is directed to block 635, which causes it to capture and attempt to decode another image, in accordance with the parameters indicated by the parameter table, unless instructed to the contrary by blocks 635, 640 or 642. Optionally, the execution of menu routine 660 may be followed by a direction back to block 647, as indicated by dotted line 648, and the resultant discontinuation of scanning and decoding, if the reader is in its Repeat Until Done mode.

While reprogramming request block 640 has been described as being located between blocks 635 and 625, it actually preferably represents an externally generated interrupt request that may occur at any time that the reader is operating. Such a request may, for example, be initiated by a local host processor via one of I/O devices 37, 37' or 37." It may also be initiated by a remotely located processor, via one of the latter I/O devices, through a suitable transmission line or computer network, as shown in FIG. 9. However the reprogramming request is initiated, it directs the reader to execute the reprogramming routine called for by block 670. As will be explained more fully in connection with FIG. 10A, this routine causes the reader to be reprogrammed, either in whole or in part, thereby changing or updating the manner in which it operates and/or the symbols which it attempts to decode.

Menuing

Figure 8:
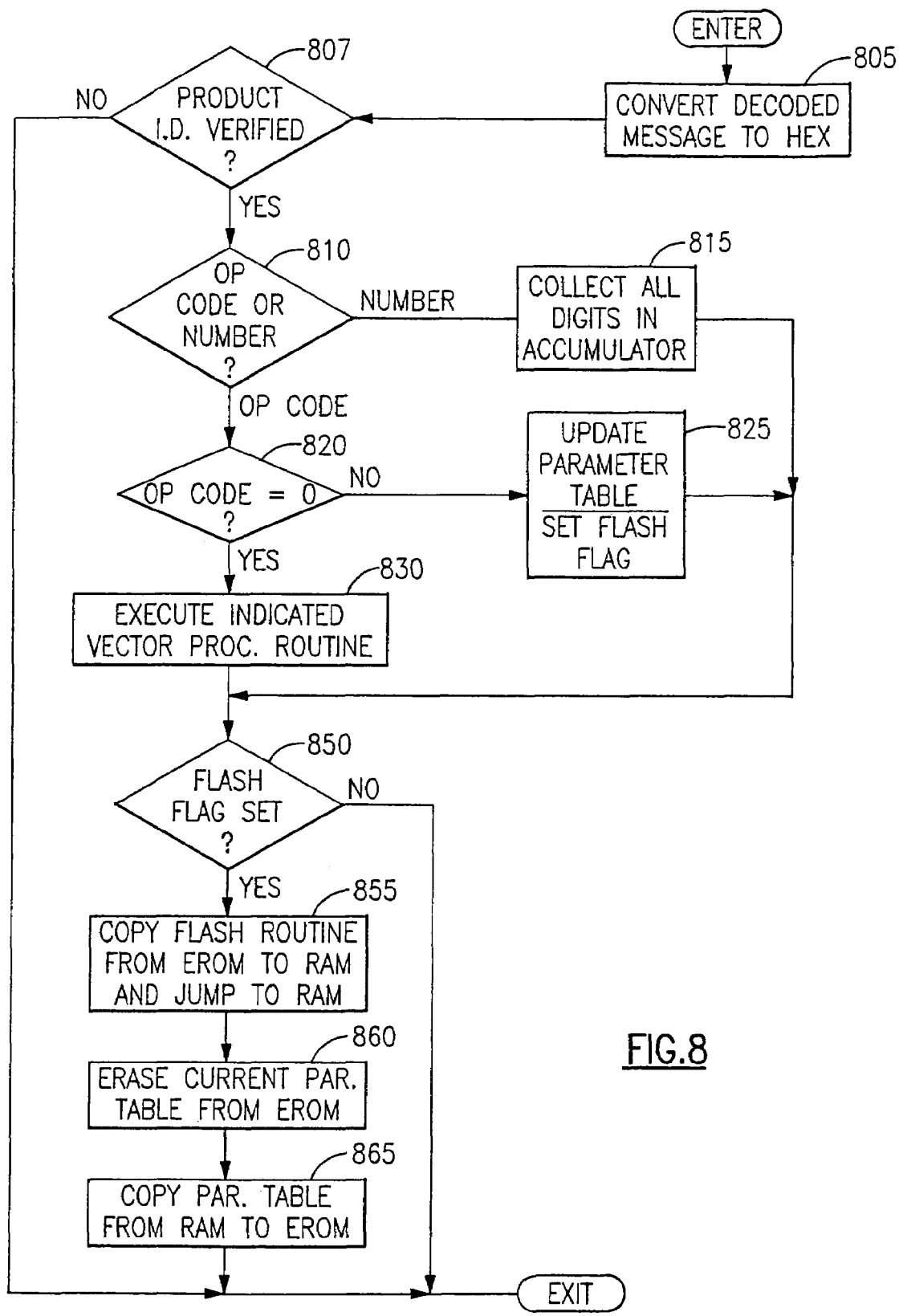
FIG. 8 is a flow chart of the menu routine shown in FIG. 6A.

The menuing feature will now be described with reference to FIGS. 7A through 7C, and the menuing flow chart shown in FIG. 8.

Turning first to FIG. 7A, there is shown the format for a menu message or word 650. This menu word will ordinarily be produced as a result of the decoding of a menu symbol, selected by the user, from a collection of menu symbols printed in a User's Manual supplied with the reader, along with a description of their functions.

Menu word 650 begins with a first one-byte product identification (1D) code field 650-1 that identifies the type and/or model number of the reader. If the decoded product 1D code indicates that it is compatible with the menuing program, execution of the menuing program continues normally. If it is not, the processor is caused to exit the menuing routine without making any menu specified changes.

The next field 650-2 of menu word 650 specifies the op code thereof in terms of a number from 0 to 7. This field specifies the operation to be performed by the menu word. The meanings of these different op codes are listed in FIG. 7C. Among these is op code "0," an op code that specifies some task that does not involve a direct change to the parameter table. Such operations will hereinafter be referred to as "vector processing operations." Exemplary ones of the tasks that may be requested pursuant to op code 0 are listed under headings A1–A4 of FIG. 7C, which tasks may be specified and differentiated from one another by the data included in the data fields 650-3 through 650-7 which follow op code field 650-2.

Specifically, the vector processing operations comprise selectable menu routines. Vectors to these routines can be stored in a vector table. The contents of data field 650-3, "offset," is an index to the vector table relative to the base address thereof. If the offset field includes 10 bits, and only five of these bits are used as an index, then 32 different vector values will be possible. In this case the remaining 5 bits may be used for data.

The vector processing operations are preferably made selectable to a user by including respective menu bar code symbols in tables in the User's Manual of the reader. The user may then select the desired vector routine by imaging the appropriate symbol. The manner in which such a table is used will be described later in connection with FIGS. 8A–8D.

Among the vector processing operations which may be selected under op code 0 are the following. Operation A1 calls for the reader to output, i.e., display or print, via the local host processor, or via an on-reader LCD display, the identity of the version of the software currently being used by the reader. Operation A2 calls for the reader to output the current contents of the parameter table. Operation A3 calls for the reader to output the code options that are enabled, e.g., the types of symbols that the reader is to attempt to decode during the autodiscrimination process and whether or not a "multiple symbols option" has been enabled. Other options may also be defined as desired.

Operation A4 is a particularly powerful and desirable vector processing operation which causes the printer of the local host processor to print a menu bar code symbol that contains all of the information necessary to instruct another reader how it must be programmed if it is to operate in the same manner as the current reader. This, in turn, enables the user to quickly set up the same (or another) reader to operate in a manner that would otherwise require the user to manually select an entire sequence of parameter table values. If it is used to set up other readers, the process of using such a menuing bar code symbol may be thought of as a "cloning" procedure, since it allows a multiplicity of readers to be identically configured.

The type of bar code symbol in which the parameter table is printed must naturally be in a bar code symbology in which the reader is able to both encode (or write) data and decode (or read) data. Because the parameter table has a data content which may be too high to be encoded in many 1D symbologies, the menu symbol encoding the parameter table is preferably encoded in a 2D bar code symbol. One 2D symbology which is particularly suitable for use in encoding a menu bar code symbol of the subject type is that developed by Welch Allyn, Inc. and referred to as the "Aztec" symbology. The manner in which data is encoded in accordance with the Aztec symbology is described in detail in copending, commonly assigned U.S. Pat. No. 5,591,956, which is hereby expressly incorporated herein by reference.

In addition to op code 0, menu word 650 also makes available op codes 1–7, as shown in FIG. 7C. The latter op codes comprise simple commands, each of which specifies a change that is to be made at a particular part of the parameter table, using specified data, if required. Assuming that parameter values are stored as bytes in respective addresses of the memory that are set aside for use as a parameter table, offset field 650-3 will comprise an index to the parameter byte relative to the base address of the table. The data or data mask that is to be used with the specified offset is specified by the data contained in up to four 8 bit data fields 650-4 through 650-7 of menu word 650.

Referring to FIG. 7C, for example, op code "1" specifies a "clear" operation. It directs the processor to the byte of the parameter table that is pointed to by the offset field and uses the content of data field 650-4, Data 0, to specify the bit mask that is to be used to specify the bits to be cleared. Op code "6", on the other hand, specifics a load operation. It directs the processor to the byte of the parameter table that is pointed to by the offset field, uses Data 0 as the bit mask for the bits to be changed, and uses Data 1 as the new data for those bits. Because the use of op codes of this type are known to those skilled in the art, the use of these op codes will not be described in detail herein.

In accordance, the parameter table is used to specify the operating options that are made subject to the control of the user. Representative groups of such options are shown as headings A–E of FIG. 7B, together with some of the options that may be selected under those headings. One important group of those options are those that are labeled as "code options" under heading B. Under this heading may be found the parameter table addresses that are set aside for use in specifying the enabled/disabled states of the various decoding programs that may be used during the autodiscrimination process. The parameter table addresses corresponding to options B1 and B2, for example, may be set aside for specifying whether all 1D codes or all 2D codes are or are not to be used in an attempt to decode an unknown symbol during autodiscrimination. Similarly, the parameter table address corresponding to option B3, may specify a particular bar code symbology, such as MaxiCode, that is to be enabled or disabled, i.e., specify whether the autodiscrimination process is or is not to include an attempt to find a MaxiCode symbol in an image. In addition, the parameter table address corresponding to option B4 may indicate that after decoding, messages that are longer than a specified maximum length or shorter than a specified minimum length are not to be output. Depending on the application, this Min-Max length option may be applied on a symbology dependent basis, i.e., applied so that it is active with some symbologies, but not with others, or may be applied on a symbology independent basis. Finally, the parameter table address corresponding to option B5 specifies whether the Multiple Symbols option is or is not to be used. The enablement of this option, which given effect by block 643 of FIG. 6A, calls for the reader to attempt to decode more than one symbol in the field of view of the reader without having to acquire multiple images of that field of view. The types of options selected for inclusion under heading B will vary from application to application, and the present will be understood not to be restricted to any particular selection of such types.

The inclusion of user selectable code options as part of the menuing process has a significant effect on the overall data throughput rate of the reader, i.e., on the time necessary to decode a symbol whose symbology is not known in advance. If, for example, it is known that none of the symbols to be read during a series of readings comprise 1D symbols of any type, or any subset of 1D symbols such as Codabar, Code 39 or Code 128, code options allow a user to direct that any attempt to decode an unknown symbology according to these symbologies is to be skipped, thereby shortening the total time necessary for the processor to decode the unknown symbol according to the symbology which it does use. This skipping also reduces the chances of a misread. If, on the other hand, it is known that all of the symbols to be read during a series of reading operations are of one type, such as interleaved 2 of 5, all 2D decoding programs and all the decoding programs for 1 D symbologies other than interleaved 2 of 5 may be disabled, thereby limiting all decoding attempts to a single 1D symbology. Thus, the menuing process allows the autodiscrimination process to be optimized so as to achieve the highest possible data throughput rate.

A second important group of options provided by the menuing process are those that are labeled as "Scanning-Decoding" Options under heading C of FIG. 7B. Unlike the code options of heading B, the scanning-decoding options of heading C are not concerned with which codes are enabled or disabled, but rather with the relationships which will be allowed to exist between scanning and decoding. The parameter table address corresponding to option C1, for example, may be used to specify that the reader operate in a "One Shot" scanning-decoding mode. In this "One Shot" mode the reader will scan and attempt to decode one bar code symbol each time that the trigger is depressed and then stop. The address spaces corresponding to scanning-decoding modes C2 and C3, on the other hand, may be used to specify that the reader operate in a "Repeat Until Done" (RUD) or "Repeat Until Stopped" (RUS) scanning-decoding mode. In these modes, the reader will scan repeatedly and attempt to decode repeatedly until there is a successful decode (RUD), or until requested to stop whether or not there is a successful decode (RUS). Scanning-decoding modes C1–C3 are preferably made user selectable by including suitable menu symbols in the User's Manual.

Also included among the scanning-decoding modes are the tracking modes listed under headings C4–C6 of FIG. 7B. Of these, the Scan On Demand (SOD) mode C4, when enabled, causes decoding to proceed continuously while scanning is started and stopped as necessary to maintain a tracking relationship between scanning and decoding. Skip Scan (SS) scanning-decoding mode C5, when enabled, causes the results of older scans to be discarded in favor of more current scans when and as necessary to maintain the desired tracking relationship between scanning and decoding operations. Finally, Decode On Demand (DOD) scanning-decoding mode C6, when enabled, causes scanning to proceed continuously while decoding is started or stopped as necessary to maintain a tracking relationship between scanning and decoding. The particular one of these tracking modes that will be used is preferably set during manufacture, based on the amount of image data memory that is present within the reader, and not changed thereafter. There is no reason in principle, however, why tracking options C4–C6 cannot be made user selectable as, for example, by the inclusion of suitable menu symbols in the User's Manual.

The availability of the SOD, SS and DOD tracking modes among the scanning-decoding options that may be selected during the factory programming of the reader is beneficial since it allows the data throughput rate of the reader to be optimized in view of the amount of memory that is available within the reader. At the same time, because operation in all of these modes may be disabled during operation in the One Shot, Repeat Until Done, or Repeat Until Stopped modes, the reader is able to operate in accordance with the non-tracking variants of these modes when such operation is preferred. One condition under which such operation may be preferred is one in which scanning while decoding is slow as a result of the time sharing of a bus. Thus, the reader combines flexibility of use with time-optimized use of the scanning and memory resources of the reader.

As will be explained more fully later, the RUD and RUS modes may be used either with or without one of the above-described tracking modes. This is because repetition is a necessary but not a sufficient precondition to the use of the tracking modes. Accordingly, if the RUD or RUS mode is not used in conjunction with a tracking mode it will comprise a non-tracking mode. If the RUD or RUS mode is used in conjunction with a tracking mode it will comprise a tracking mode.

Other groups of options that are provided by the menuing feature include those that are set aside under headings A, D and E of FIG. 7B. Of these Communication Options, heading A, is associated with parameter table addresses that correspond to various communication modes that may be used by the reader. Included among these options are A1, an option that enables/disables RS-232 communication through an I/O device (such as I/O 37, 37', etc.), A2 which specifies the baud rate of the selected communications mode, and A3 which enables/disables the RF link that the reader may use in place of multi-conductor cable 54-2 of FIGS. 4A–4C. Option A4 is an example of a network option which specifies the type of computer network with which the reader is to operate, in this case ETHERNET, although other types may also be provided for.

Similarly, heading D is associated with parameter table addresses that correspond to various miscellaneous operating options that may be selected by the user. Included among these options are D1 which enables/disables the beeper and allows the volume thereof to be adjusted, D2 which enables/disables the use of an aiming LED, and D3 which enables/disables the provision of aural feedback to the user, among others. An example of a reader which provides aural feedback is described in U.S. Pat. No. 5,420,409.

Heading E is associated with parameter table addresses that correspond to various transmission options that may be selected by the user. Included among these options are E1 and E2, which enable/disable the outputting of check characters or checksum data with decoded data, and E3 which enable data edit options such as adding a carriage return and/or a line feed and/or other ASCII characters to the decoding data. Options E1 and E2 are useful, for example, in the localization and identification of hardware or software failures during the servicing of the reader. Option E3 is useful in placing decoded data in a form suitable for use with an application program.

Heading F is associated with parameter table addresses that correspond to various message editing commands for editing the form of characters in a decoded message. These commands may be, for example, search and replace commands (option F1), commands to insert characters (option F2), commands to delete characters from a decoded message (option F3), or other commands.

Heading G, meanwhile, is associated with parameter table addresses that correspond to commands for adding prefixes or suffixes, of a selectable character length, to a decoded message. Prefixes and suffixes are added to messages so that the host processor can identify the source of, or other characteristics of received messages. Option G1 allows addition of a prefix to a decoded message while option G2 allows addition of a suffix to a decoded message.

In view of the foregoing, it will be seen that the menuing process provides a wide range of user selectable functions and modes that allow the reader to be tailored to a user's specific application and/or preferences. Among these, the code options and the scanning-decoding options in particular, allow a user to reconfigure the operation of the reader in ways that have not heretofore been possible and thereby substantially increase the flexibility and overall data throughput rate of readers that practice the present feature.

The manner in which the reader can be updated to accomplish the above-described results will now be described with reference to the flow chart of FIG. 8, which shows the steps included within menu routine block 660 of FIG. 6A. The menu routine of FIG. 8 begins with a block 805 which causes the processor to convert the decoded menu symbol message into hexadecimal form. This has the effect of formatting the message so that the fields of the menu word are expressed as pairs of hexadecimal digits. Once this has been done the processor examines the product 1D code to verify that it is compatible with the reader being menued. If it is not, the processor is directed to exit the menuing routine and continue scanning. If it is, the processor is directed to block 810 which distinguishes those menu messages which contain op codes from those which contain numerical data but no op codes. If there is no op code, the processor is directed to block 815, which causes it to collect in an accumulator all of the digits of the message for later use before proceeding to block 850. An example of numerical data without an op code comprises the minimum or maximum length of the messages that are to be output under code option B4.

If the menu message contains an op code, and the op code is other than 0, the processor is directed, via block 820, to a block 825. The latter block causes it to make the parameter table changes called for by the op code and the associated offset and data fields, sets a "flash" flag to indicate that changes have been made and then proceeds to block 850. This has the effect of implementing the user selected changes in the menuing options discussed previously in connection with FIG. 7B. Such changes will ordinarily be made in a copy of the parameter table that is stored in RAM 45, and then later transferred to EROM 46.

If the menu message contains an op code of 0, the processor is directed, via block 820, to a block 830. The latter block causes the processor to perform the vector processing operation indicated by the remainder of the message. This operation will comprise one of the operations discussed previously in connection with items A1–A4 of FIG. 7C, among others, before proceeding to block 850.

In view of the foregoing, it will be seen that, when the processor arrives at block 850 it will have taken all required numerical data, performed all required parameter table modifications, or performed all required vector processing operations. As will now be explained, the remainder of the flow chart of FIG. 8 is directed to storing a semi-permanent copy of the parameter table in EROM 46.

If, on arriving at block 850, the processor finds that the "flash" flag has not been set, it knows that the contents of the parameter table have not been changed and, consequently, that no updated copy thereof needs to be stored in EROM 46. Under this condition, the processor is directed to simply return to the main program of FIG. 6A. If, on arriving at block 850, the processor finds that the "flash" flag has been set, however, it knows that the contents of the parameter table have been changed and, consequently, that an updated copy thereof needs to be stored in EROM 46. Under this condition, the processor is directed to blocks 855, 860 and 865, which defines the steps necessary to store this updated copy.

In accordance with block 855, the processor is instructed to copy from EROM 46 to RAM 45, the program instructions (flash routine) necessary to copy the parameter table from RAM to EROM. The copying of the flash routine to RAM is necessary because the EROM cannot be written to when the apparatus is reading or operating from the EROM. Once the flash routine has been copied to RAM 45, the processor is directed to jump to RAM to begin executing that routine. As it does so it is directed, via block 860, to ease the old (unchanged) parameter table from EROM 46. Per block 865, it then copies new (changed) parameter table from RAM 45 to EROM 46. Once this has been done, the processor is directed back to the main program of FIG. 6A to begin operating in accordance with the operating mode specified by its new parameter table. Thus, the performance of the steps called for by blocks 855–865, when called for by block 850, has the effect of partially reprogramming the reader so that it operates in the manner indicated by the last menuing symbols selected by the user.

Figure 8A:
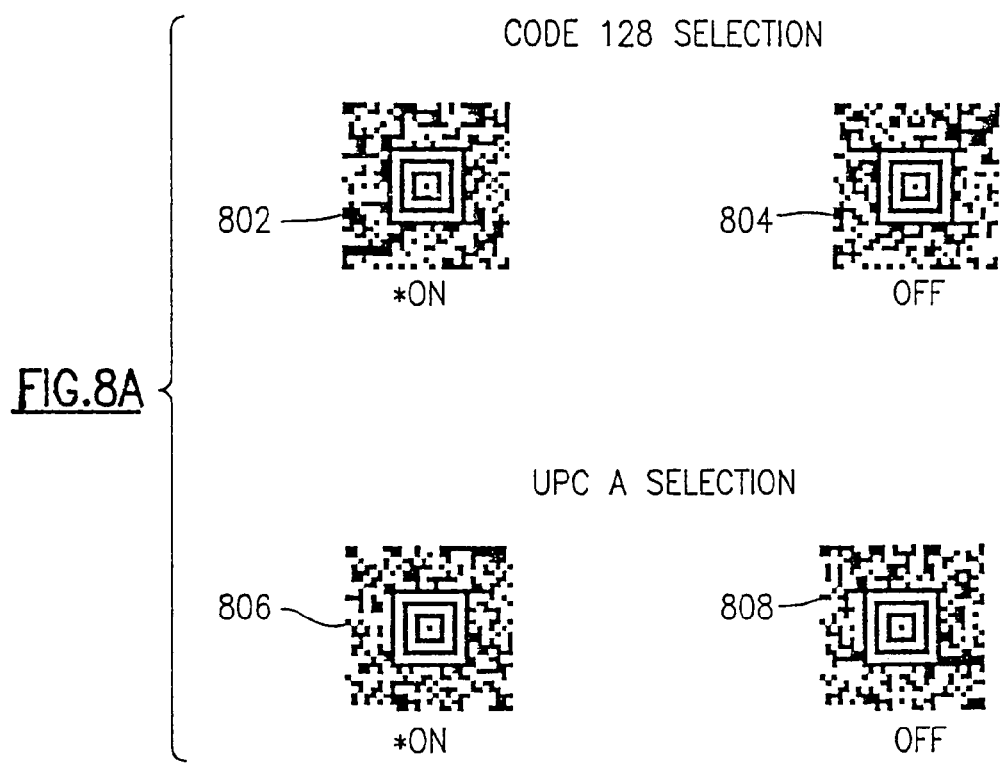

Referring to FIGS. 8A–8D, there are shown examples of menu symbol selection charts of the type that may be used. Referring first to FIG. 8A, there are shown two parts of an option selection or menu chart that is used to enable and disable two exemplary 1D bar code symbologies, namely: Code 128 and UPC A. If a user wants to enable the decoding of Code 128 symbols, he need only image menu symbol 802 which, in the present example, is a 2D bar code symbol expressed in the Aztec bar code symbology. Conversely, if a user wants to disable the decoding of Code 128 symbols, he need only image menu symbol 804. Similarly, imaging symbols 806 or 808 enables or disables the decoding of UPC A symbols. Advantageously, the change called for by the user is accomplished as the result of a single imaging step, rather than as a result of multiple imaging steps.

Figure 8B:
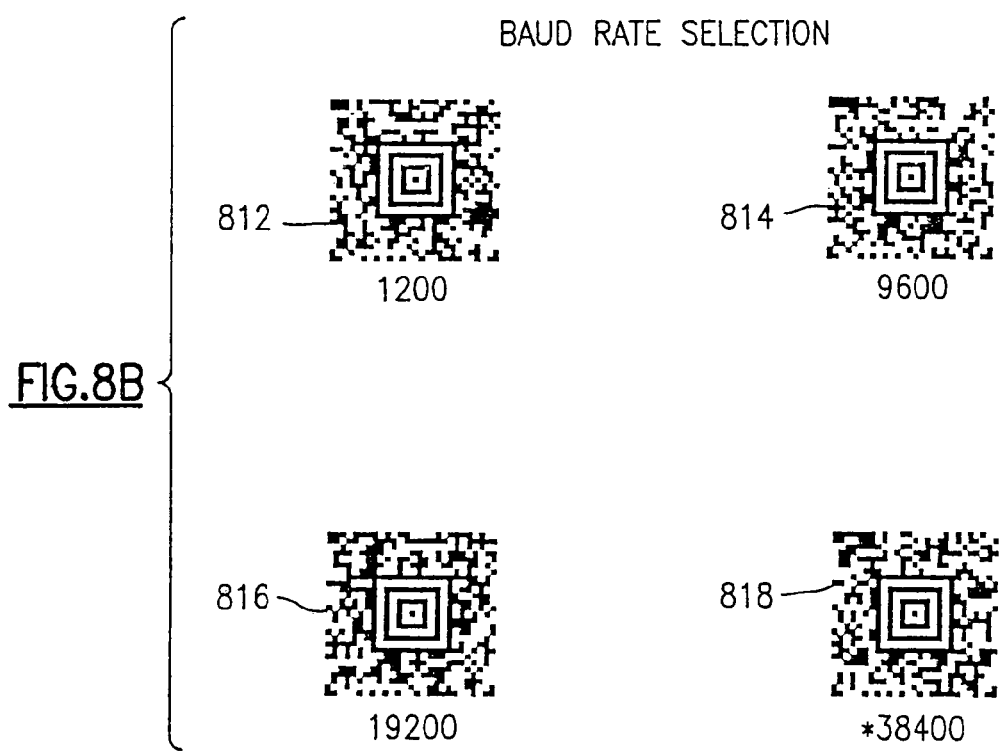

Referring to FIG. 8B, there are shown two parts of an option selection chart that is used to select the desired one of the baud rates that may be used by the reader's I/O devices. A user chooses the desired one of the exemplary 1200, 9600, 19200 and 38400 baud rates by simply imaging the corresponding ones of menu symbols 812–818. Again, the change is accomplished as the result of a single imaging step.

The fact that the above-discussed examples of menu selections make use of menu symbols that use the Aztec 2D symbology is not essential to the practice. Other 2D or 1D menu symbol symbologies could also have been used, if desired, as will be seen from the following discussion of FIGS. 8C and 8D. What is important is that the symbology used for the menu symbols be the one that is correct for the model indicated by the product 1D field of the menu word. In the case of FIGS. 8A and 8B, the illustrated menu symbol symbology is that which is used by the IMAGETEAM™ Model 4400 reader manufactured by Welch Allyn, Inc.

Referring to FIG. 8C, there are shown exemplary parts of the option selection or menu chart that can be used with Welch Allyn SCANTEAM® readers. In FIG. 8C, symbol 822 is an example of a menu symbol that, if imaged, causes all Code 11 and Code 128 settings to assume their default values. Symbols 824 to 836 are examples of menu symbols that allow Code 11 options to be enabled and disabled on an individual basis. Similarly, symbols 848 to 856 are examples of menu symbols that allow Code 128 options to be enabled and disabled on an individual basis.

Referring to FIG. 8D, there are shown further exemplary parts of the option selection or menu chart that may also be used with Welch Allyn SCANTEAM® readers. In FIG. 8D symbol 858 is an example of a menu symbol that, if imaged, causes the settings for one of the RS-232 ports of the reader to assume their default values. Symbols 862 and 864 are examples of menu symbols that enable and disable a CTS check selection feature. Finally, symbols 866 through 884 are examples of menu symbols that allow any of a number of different baud rate selections to be made. Once again, the present reader allows all of these menu selections to be made by means of a single step selection process.

Because fuller information concerning the menu options contemplated by the present invention, and their uses is contained in the User's Manual for the above-identified readers, these menu options will not be discussed further herein.

Reprogramming

In accordance with another feature of the apparatus and method, the reader may be reprogrammed to operate in accordance with an entirely new application program. This means that the reader may not only be provided with a new or updated decoding program, or a new parameter table, it may also be provided with one or both of a new menuing routine and a new main program. As a result, a reader may be effectively reconfigured as a new reader, with new capabilities and features, as often as necessary to keep it up to date with the latest developments in optical reader technology. Advantageously, this reprogramming may be accomplished either locally as, for example, by a local host processor equipped with a diskette or CD-ROM drive, or remotely by a distant processor that is coupled to the reader via a suitable telephone or other transmission line or via a computer network or bulletin board.

The reprogramming feature will now be described with reference to the system block diagram of FIG. 9 and the reprogramming flow chart of FIG. 10A. Referring first to FIG. 9 there is shown a reader 10, of the type shown in FIG. 4 or 5, which is coupled to a local host processor 900 by means of multi-conductor flexible cable 54. The reader may also comprise a cordless battery powered reader 10' which is coupled to a host processor 900 via a suitable RF link including antennae 905 and 910 and an RF interface module 915. Host processor 900 is preferably equipped with a display 930 by which the results of the previously described vector processing operations may be displayed, and with a printer 940 by which the previously described menuing bar code symbol may be printed. As used herein, the term "local host processor" will be understood to include both stand alone host processors and host processors which comprise only one part of a local computer system.

Figure 10A:
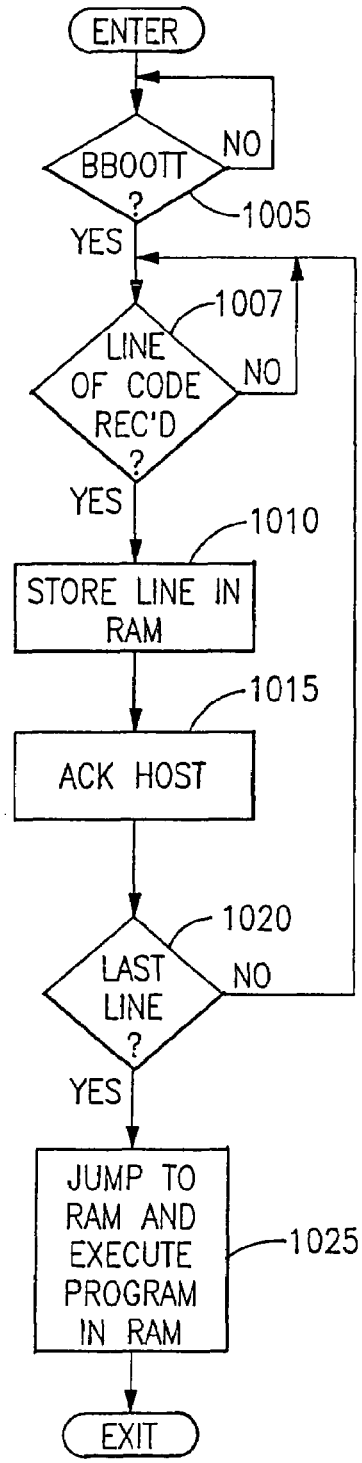
FIG. 10A is a flow chart of a loading routine suitable for use.
Figure 10B:
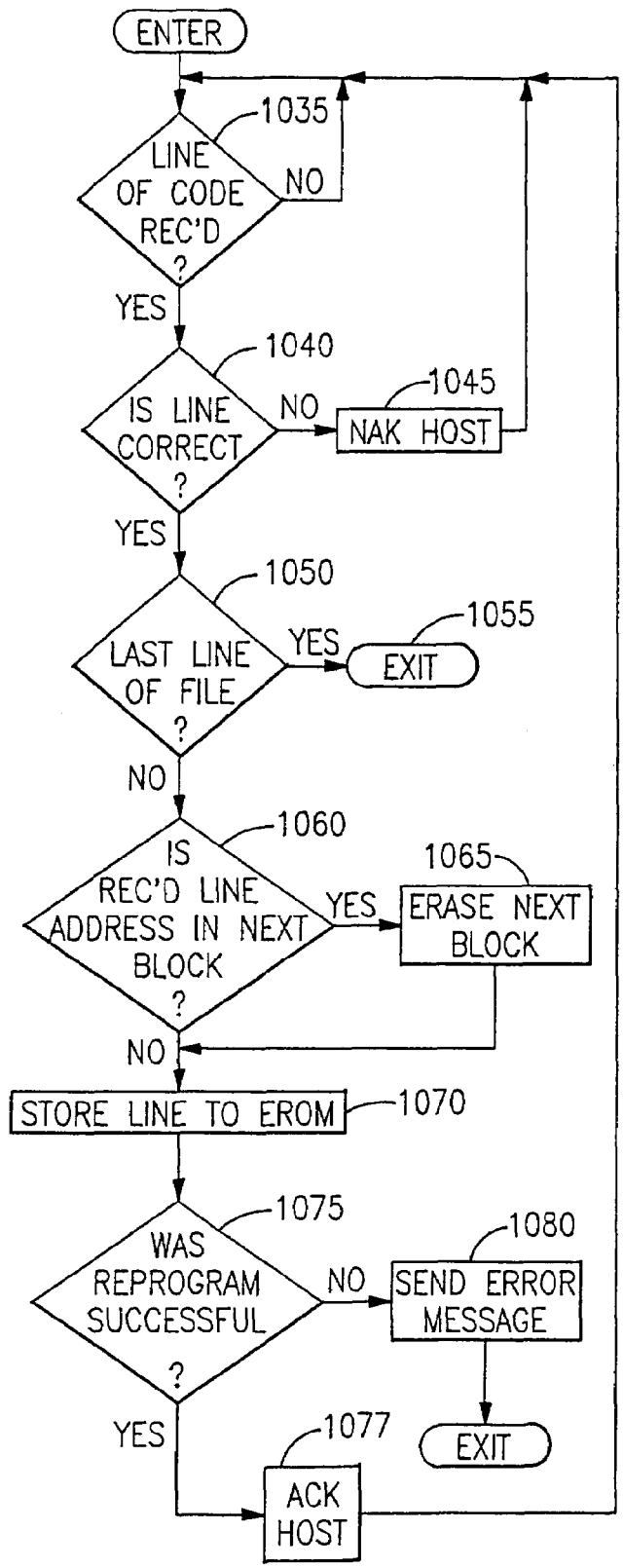
FIG. 10B is a flow chart of a reprogramming routine suitable for use.

If the new reader program is available locally as, for example, on a diskette or CD-ROM, it may be loaded into reader 10 or 10' using a suitable drive unit 920, under the control of a keyboard 925 and the reprogramming routine shown in FIGS. 10A and 10B. In addition to drive unit 920, processor is typically in communication with a read only program storage device such as a ROM 921 and a read/write storage device such as a RAM 922. If the new reader program is available at a remotely located processor 950, it may be loaded into reader 10 or 10' through a suitable transmission link 955, such an electrical conductor link, a fiber optic link, or a wireless transmission link through a suitable communication interface 960, such a modem. As used herein, the term "transmission link" will be understood to refer broadly to any type of transmission facility, including an RS-232 capable telephone line, as called for by communication option A1 of FIG. 7B, an RF link, as called for by communication option A3 of FIG. 7B, or a computer network, e.g., ETHERNET, as called for by communication option A4 of FIG. 7B, although other types of transmission links or networks may also be used. For example, transmission link 955 could be provided by a coaxial cable or any other non-RF electromagnetic energy communication link including a light energy infrared or microwave communication link. Link 955 could also be an acoustic communications link. Additional communication options include a baud rate option A2 which allows different baud rates to be selected.

The manner in which the reader may be made to perform any of a variety of different externally specified functions, including reprogramming itself, will now be described with reference to the flow charts of FIGS. 10A and 10B. As will be explained more fully presently, the flow chart of FIG. 10A is a flow chart by which a program originating outside of the reader may be loaded into the reader for execution thereby. One example of such an externally originated program is the reprogramming program shown in FIG. 10B. Other examples of such externally originated programs may include diagnostic or test programs, among others.

Turning first to FIG. 10A, this flow chart is entered when the reader receives an externally generated command, such as the six character sequence BBOOTT, which it is programmed to recognize and respond to. This command may be initiated either by a local or a remotely located processor and transmitted to the reader via any of the I/O devices shown in FIG. 1. It may, for example, be initiated by the local host processor via keyboard 945 or by remote processor 950. This command may be given effect as an interrupt request and recognized as such by decision block 1005 of FIG. 10A. It will be understood that while interrupt block 1005 is shown in FIG. 10A, it may in fact be located at any point within the main program of the reader.

Once the BBOOTT command has been received and acted on, the processor enters a loading loop including blocks 1007 through 1020. This loading loop causes the processor to load a program into RAM, one line at a time, in conformity with any suitable communication protocol, until the last line of code is detected via block 1020. When the latter has occurred, the processor is directed to block 1025, which causes it to jump to the newly received program and to begin executing the same before returning to the main program.

Referring to FIG. 10B, there is shown an exemplary flow chart for a reprogramming routine suitable for use in reprogramming the reader to operate with new or different decoding programs, and or new or different menuing programs, among others. This program is an example of a program which may be executed as a result of the execution of the loading loop 1007–1020 of FIG. 10A, and which begins to be executed as the processor enters block 1025 of FIG. 10A.

On executing the reprogramming flow chart of FIG. 10B, the device loads the program that is intended to replace all or part of the program currently stored in EROM. This process begins as the processor encounters block 1035, which directs it to wait until a line of externally generated code is received. As each line of code is received, it is first checked for correctness (e.g. checksum), as called for by block 1040 and, if an error is found, sends a negative acknowledgment signal to the sending processor per block 1045. Each time that a correct line of code is received, the flow loops back for additional lines until the last line of the current file has been correctly read, as called for by block 1050. Since the last line of the file does not contain program data, and cannot occur until all blocks of program data have been processed, block 1050 will direct the processor to block 1060, unless and until all blocks of program data have been received and stored in EROM 46, and then cause it to return to the main program of FIG. 6A via exit block 1055.

If the processor has not exited the reprogramming routine of FIG. 10B per blocks 1050 and 1055, block 1060 will cause it to determine if the last received line indicated that a new block has begun. If it has, the processor is directed to block 1065, which causes it to erase that new block of EROM before continuing to block 1070 and storing that last received line therein. If it has not, block 1070 will cause the processor to store the last received line to the last erased block of EROM. If this line has been successfully stored, as determined by block 1075, the processor will acknowledge that fact per block 1077 and loop back for another line.

If, however, any line of data has not been successfully stored, block 1075 will direct the processor to a block 1080 which causes it to output an error message and exit the program. If the latter occurs, the reprogramming routine as a whole must be repeated. If the latter does not occur, the above-described process will continue line-after-line, block-after-block, until the entire file has been successfully transferred.

In view of the foregoing, it will be seen that the effect of the reprogramming routine of FIG. 10B is to attempt to reprogram part or all of EROM 46 as requested, or to continuing the attempt to do so until it either succeeds or fails. To the extent that the reader is reprogrammed, it will effectively become a new or updated reader. This is not only because this reprogramming cannot only modify the parameter table, it can also modify the decoding or other programs referenced by the parameter table and the menuing program itself. Thus, the reprogramming feature cannot only change the manner in which the reader operates, it can also change the manner in which the operation of the reader can be modified in the future.

With the use of the above-described reprogramming feature, the reader may be kept current with the latest available programs that are suitable for use therewith. A user at local processor 900 may, for example, communicate with remote processor 950, via keyboard 925, and determine if new programmable features are available. If they are, he may obtain them from the remote process and download them locally, or request that the remote processor download them directly to the reader. Alternatively, the remote processor may initiate the reprogramming of the reader independently as, for example, pursuant to a service contract or updating service. It will be understood that all such embodiments are within the contemplation of the present invention.

Local Host and Reader System Operations

As has been described hereinabove, reprogramming of a reader may be accomplished with use of a local host processor. This section describes additional features of a system comprising a local host processor 900 and a reader 10, and more particularly describes features and additional system operations that are realized by various interaction between host processor 900 and reader 10, and in certain applications by a host processor 900 that is not in communication with a reader 10.

A flow diagram illustrating the primary program for operating a local host processor for use in controlling a reader is shown in FIG. 11A. By executing block 1102 host processor causes to be displayed on a display monitor 930 a subprogram option screen. The subprogram option screen displays various subprogram options for a user to select. Selection of one subprogram option causes a series of instructions pertaining to that particular option to be executed by local host processor 900. These subprograms of a host primary program controlling local host processor may include, for example, a subprogram for reprogramming a reader; a subprogram for uploading parameter information from a reader to host, or information pertaining to a main program presently operating a reader; a subprogram for instructing a reader to perform self-diagnostic testing; a subprogram for determining the reader's main program revision level; a subprogram for outputting parameter table information, possibly to auxiliary readers; a subprogram for editing parameters of a parameter table; a subprogram for simulating the result of applying editing commands to a decoded message; and a subprogram for displaying barcode symbols for scanning by a reader.

A flow diagram illustrating a subprogram for reprogramming of a reader 10 by control of a local host processor is shown in FIG. 11B. Whereas FIGS. 10A and 10B illustrate instructions executed by processor 40 of reader 10 for providing reprogramming of a reader, FIG. 11B illustrates instructions executed by local host processor for providing reprogramming of a reader.

At block 1110 host processor 900 displays a main reprogramming screen on display monitor 930. The main reprogramming screen prompts a user to designate a source for an operating program. The source designated is typically a bulk storage device such as a hard or floppy disk drive but also may be, for example, a RAM or ROM storage device. When the source is selected, host processor 900 displays on display monitor 930 indicators of the operating programs, or files, that are available in the storage device source selected (block 1114) and a user selects one of the operating programs. Some available operating programs comprise entire main programs and entire parameter tables for loading into reader, whereas other available operating programs include only parameter tables which may be customized parameter tables created by a user during execution of a parameter table editing subprogram.

When a user selects a source for an operating program, and selects a desired operating program, downloading of the operating program proceeds. At block 1116 host processor determines whether a reader is connected to the host processor communications link, normally by serially transmitting a device detection command to a reader, which has been previously programmed to transmit an acknowledge response message on the reception of a detection command.

If a reader is connected to host processor 900 then host processor at block 1118 sends an identification command to reader 10 which is previously programmed to transmit an identification response on the reception of an identification command. After receiving the identification response and comparing the response to the selected operating program at block 1120 processor at block 1122 determines whether the reader is of a type which is compatible with the selected operating program. An operating program is compatible with a reader in communication with host processor if the operating program is specifically adapted for that reader's unique hardware configuration. Bar code readers of various types have different hardware components including different memory devices, image sensors, input/output devices, and other components. The selected operating program must be in form enabling it to communicate with the particular hardware components of the presently connected reader.

If the selected operating program is compatible with the present reader, the host processor at block 1126 determines if the operating program is a parameter-only type operating program or an operating program that comprises a main program and a parameter table. This determination can be made, for example, by reading the contents of a DOC type file which is made to be read by processor 900 when an operating program is read, and which is made to include an identifier as to whether the operating program is of a type which includes a main program and parameter table; by reading the contents of a predetermined address of the operating program which is made to include an identifier as to the type of operating program; or by reading predetermined addresses of an operating program designated for storing a main program and basing the determination on whether instructions are present in the designate addresses.

A memory map for a typical operating program is shown in FIG. 11C. When an operating program is stored in a memory device, which may be, for example EROM 46 of reader 10, or a disk drive 920 or other storage device associated with host processor 900 a plurality of first predetermined address locations e.g. 000 to 5000 of the storage device are designated for storing parameters of the main program, while a plurality of second predetermined address locations e.g. 8000 to 9000 are designated for storing instructions of a parameter table. The beginning and end addresses of the parameter table may change from operating program to operating program. However, the parameters of each parameter table are in identical locations with respect to the beginning address.

When host processor 900 determines at step 1126 that the selected operating program includes a main program then program control proceeds to step 1130 wherein processor transmits the contents of the selected operating program into EROM 46 of reader 10. If host processor 900 determines at block 1126 that the selected operating program is a parameter only type operating program then host processor 900 first queries EROM 46 to determine the begin and end address locations of the parameter table of the operating program currently stored in EROM. To this end host processor 900 at block 1130 polls the contents of a vector pointer table 1134 in predetermined address locations of EROM. Described previously herein vector pointer table 1134 comprises the beginning and end addresses of the parameter table. After vector pointer table is polled, host processor 900 stores the address location of the present parameter table, modifies the parameter table address of the selected parameter-only operating table in accordance with the parameter table addresses of the existing parameter table (block 1136) and writes the contents of the parameter table address locations of the modified parameter-only type operating program into EROM 46 (block 1140).

If processor 900 determines at block 1126 that the selected operating program is of the type having a main program and a parameter table, then processor 900 at block 1144 prompts the user whether the user would like to save the contents of a parameter table of the operating program currently stored in EROM 46 of reader 10; that is, utilize the parameters of the current operating program in the operation of a reader that is programmed to have a new main program. If the user responds affirmatively, then processor 900 reads the contents of the existing parameter table (block 1150) after first polling the vector pointer table and then writes, at block 1152, the contents of the existing parameter table in a predetermined holding address location of a storage device associated with processor 900 or reader 10.

The selected operating table is then written into EROM 46 at block 1140, line by line, until loading is complete. If the user had requested at block 1144 to save the contents of the original parameter table (a determination made at block 1153), then processor 900 writes the contents of the parameter table stored in a holding address location to the appropriate parameter address locations of EROM at block 1154, after determining the address locations of the parameter table at block 1156. Referring again to the primary host processor program shown in FIG. 11A, another subprogram which can be selected from subprogram option screen displayed at block 1102 is a subprogram for editing a parameter table via host processor control. An important feature available in this subprogram is that the subprogram allows a user to edit a parameter table read from a memory location of processor 900 or reader 10 without there being a reader currently in communication with processor 900, thus improving the convenience of operation.

As discussed previously with reference to FIG. 7B, a parameter table is used to specify operating options that are subject to the control of the user. During execution of instructions of a reader's main program stored in a first predetermined memory locations of a storage device, parameters of a parameter table, which is stored in a second predetermined set of memory address locations of a storage device, are called up with use of lookup type instruction as exemplified by representative lookup instruction (in pseudocode) 1160 shown in FIG. 11C. Parameters of a parameter table may be, for example, communications option parameters (subheading A), code option parameters (subheading B), scanning-decoding option parameters (subheading C), operating option parameters (subheading D), transmit option parameters (subheading E), data formatter command parameters (subheading F), prefix/suffix parameters (subheading G), or other types of parameters.

A flow diagram for a parameter table editing subprogram is shown with reference to FIG. 11D. At block 1162 processor 900 determines if a reader is in communication with processor 900 in the fashion described previously with reference to block 1116 of FIG. 11B. If a reader is present, processor 900 at block 1166 reads the parameter table presently stored in EROM 46 (after determining the table's location), along with a list of analog waveform outputs from another predetermined memory location from EROM 46. A list of possible types of analog waveform outputs a reader may be configured to generate allowing the reader to transmit data to various types of terminals is stored in a predetermined waveform list memory location. The waveform list memory location may be determined by querying vector pointer table 1134. A specific one type of waveform output from the list of available outputs is selected by control of a parameter of parameter table, typically stored in an address location corresponding to Communications Options (Heading A) type parameters described previously with reference to FIG. 7B. Processor 900 at block 1116 stores the parameter table and the list of analog waveform outputs in a temporary storage device associated with processor 900 such as a RAM.

In the embodiment shown, the parameter table editing subprogram is configured by default to edit the existing parameter table stored in EROM of the connected reader if a reader is present. It will be recognized, however, that the editing subprogram can also be configured to query the user as to whether the user wishes to edit the parameter table currently stored in reader EROM 46, or another candidate parameter table typically stored in a bulk storage device associated with processor 900.

If a reader is not in communication with processor 900, continuing with reference to the flow diagram shown, then processor at block 1168 prompts the user to select a reader for which the user wishes to edit a parameter table and once a type of reader is selected, a default parameter table associated with that reader type is written in to a temporary storage device of processor 900 typically provided by a RAM device.

Figure 11E:
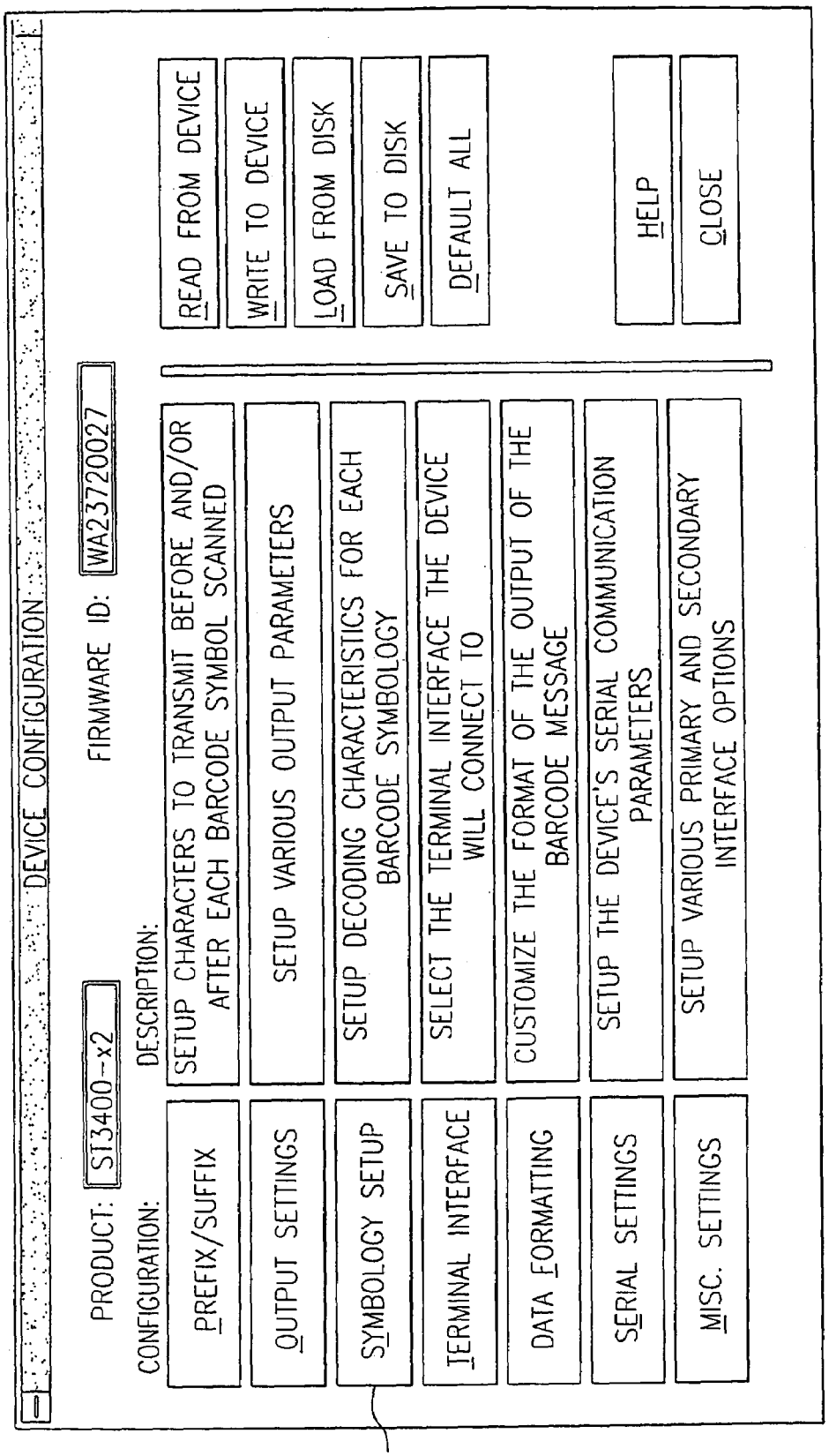
FIG. 11E illustrates an exemplary parameter configuration screen.
Figure 11F:
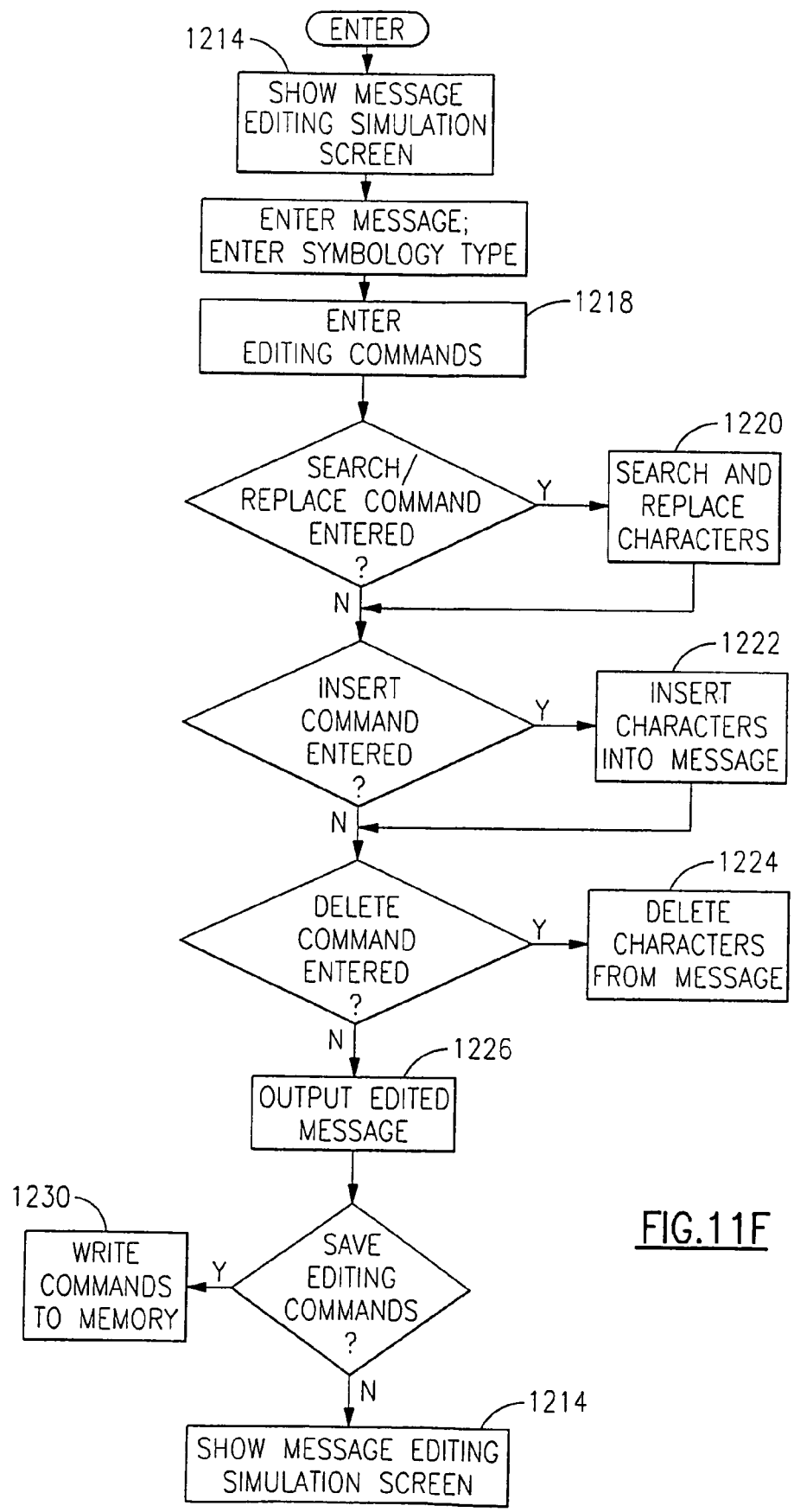
FIG. 11F illustrates a flow diagram executed by a host processor for simulating the results of applying editing commands to a decoded message.

At the termination of block 1168 or block 1166 if a reader is connected, a parameter configuration screen is displayed to a user, at block 1169, an exemplary embodiment of which is shown in FIG. 11E. Typically, a user will edit certain parameters from the parameter table which the user wishes to change, and then, when editing is complete, a user will select an available output option from the parameter configuration screen. The output options available to a user may include writing an edited parameter table to a connected reader; writing an edited parameter table to a bulk storage device; displaying an edited parameter table; or printing an edited parameter table.

Until an output option is selected, the user typically edits various parameters the user wishes to change as shown in blocks 1170 and 1172. Selection of one parameter type option, e.g. code or symbology option parameter 1174 causes a secondary editing screen to appear allowing editing of parameters of the selected parameter type. When editing pertaining to one or several parameter types is complete then program reverts back to parameter configuration screen at block 1169, allowing user to select an output option.

If a user selects the write output option (block 1176), the edited parameter table is written to, or downloaded to reader EROM in the fashion described previously with reference to block 1140 of FIG. 11B. If a user selects the store-to-disc option (block 1178) then the edited parameter table is written to an address location of a bulk storage device such as a hard drive or floppy disc. If a user selects the display option (block 1180) then processor 900 causes the complete or partial contents of the edited parameter table to be printed on display screen associated with host processor 900. If a user selects the print option (block 1182) then processor 900 causes the complete or partial contents of the edited parameter table to be printed by a printer device 940 in communication with processor 900.

Another output option available to a user is to compare two or more parameter tables. If this option is selected (block 1184) then the user is requested at block 1186 to select parameter tables from memory locations (which may be memory location associated with processor 900 or with reader 10). When parameter tables have been selected, processor 900 at block 1186 compares the selected parameter tables. In general, the comparison is carried out by a compare function applied after an offset between the files is accounted for. Processor 900 then outputs the results of the comparison at block 1188, typically by displaying the comparison results on screen 930, or printing the comparison results using printer 940.

One specialized output option allows the user to create programming menu symbols whose general features have described with reference to FIGS. 7A–7C, and 8. The menu symbols created by the output option can be used to reprogram readers reading the created symbols in accordance with the changes made to a parameter table made during execution of the parameter table subprogram. Described as a routine executed during a parameter table editing subprogram, the menu symbol output option can be conveniently implemented as a separate subprogram.

When a menu symbol output option is selected at block 1189, processor 900 determines at block 1202, by reading a reader identifier, whether the reader designated for receipt of the edited parameter table includes a one dimensional (1D) or two-dimensional (2D) image sensor.

If the reader includes a one dimensional image sensor, then processor 900 creates a series of linear bar codes which may be used for reprogramming several readers. Specifically, if the designated reader includes a one dimensional image sensor then processor 900 at block 1204 creates a first linear menu symbol adapted to generate an instruction causing the reader reading the symbol to change parameter table values of the reader's EROM to default values. Then, at block 1206 processor 900 creates a distinct linear programming menu symbol for each parameter of the parameter table that is changed during the editing process from a default value. An important feature is described with reference to block 1208. When the series of menu symbols is created, the created symbols may be printed on paper by printer 940 according to a conventional protocol, or else displayed on display device 930, typically a CRT monitor. The term created symbols herein refers to binary encoded data stored in a memory space which result in an actual symbol being output when the data is written to a display device or printer. An unlimited number of bar code readers may be reprogrammed by reading the menu symbols that are displayed on the display device 930. Displaying the created menu symbols on a display device allows rapid output of created symbols and eliminates the need to supply a paper substrate each time a menu symbol is output.

If the reader designated for reprogramming includes a 2D image sensor, then processor 900 at block 1210 need only create one 2D menu symbol in order to cause reprogramming of the designated reader in accordance with the changes made to a parameter table even in the case where multiple changes to the parameter table are made. This is so because an increased number of instructions may be encoded in a symbol of a 2D symbology type.

Another subprogram which may be selected from a subprogram option screen displayed at block 1102 is a subprogram for simulating the result of applying editing commands to a decoded message. As discussed previously, editing commands may be applied to decoded messages by entry of the commands to a parameter table in parameter table addresses corresponding to heading H of FIG. 7B. Without an editing command simulation subprogram, it would be necessary to decode a symbol with use of reader 10 in order to observe the result of applying the editing commands. The efficiency and convenience advantages of the editing command simulation subprogram therefore should be clear to those skilled in the art.

An exemplary flow diagram for an editing command simulation subprogram is shown in FIG. 11E. At block 1214 processor 900 displays a message editing simulation screen or screens which allows a user to enter an unedited test message and symbology type (block 1216) and enter the type of editing command desired to be applied to the message (block 1218). Three basic types of editing commands are search and replace editing commands, insert character editing commands, and delete character editing commands. Additional, more complex editing commands may also be applied.

When the commands are entered, processor 900 applies the commands entered at block 1218 to the unedited test message at blocks 1220, 1222, and 1224 if all are applicable. When editing is complete processor 900 outputs the result of applying the editing commands, at block 1226, typically by displaying the edited message on display screen 930.

At block 1228 processor queries the user as to whether the user wishes to save the editing commands which resulted in the edited message being displayed or otherwise output at block 1226. If the user elects to save the editing commands, then processor 900 at block 1230 writes the commands to a predetermined command save memory location associated with processor 900. When the parameter table editing subprogram described with reference to FIG. 11D is later executed the commands saved in block 1230 of the message editing command subprogram may be read from the command save memory location during execution of block 1192 of the parameter table editing subprogram.

In addition to being adapted to download new or modified operating programs to reader 10, processor 900 which as shown in FIG. 9 is external with respect to reader 10, can also be adapted to transmit component control instructions to reader 10 which are executed by reader processor 40 substantially on receipt by reader 10 to control one or more components of reader 10 in a manner that can be perceived by a reader operator. For example, processor 900 and reader 10 can be arranged so that processor 900, on receipt of a command from a user, transmits a component control instruction to reader 10 which is executed by reader processor 40 to have the same effect as trigger 52 being manually pulled, or alternatively, being released. Instructions transmitted by processor 900 having the same effect as manually pulling and manually releasing trigger 52 may be termed, respectively, "external device transmitted trigger activation" and "external device transmitted trigger release" instructions. Processor 900 and reader 10 can also be complementarily arranged so that, on receipt of a user activated command received at processor 900 to control reader 10, processor 900 transmits to reader 10 an instruction which is executed by reader 10 substantially on receipt of the instruction to turn on LEDs 22 or to "flash" LEDs according to a predetermined pattern, or to activate an acoustic output device such as speaker 38 to issue a "beep" or a series of beeps. Component control instructions for on-receipt execution which operate to control LEDs 22 or speaker 38 are useful, for example, to signal an alarm condition, to indicate that a task is completed, or to attract the attention of a reader operator for any purpose.

Processor 900 and reader 10 can also be complementarily arranged so that, on receipt of a user activated command, processor 900 transmits to reader 10 a component control instruction which is executed by reader 10 substantially on receipt thereof to transmit data which is stored in memory 45 or in another memory device associated with reader 10 such as a long-term nonvolatile memory device. For example, a component control instruction received from processor 900 may be executed by reader 10 to upload from reader 10 to processor 900 image data that is stored in a specific memory location of reader memory 45 such as a reader memory location that stores the most recently captured image data captured by reader. Processor 900 may subsequently display such uploaded image data on display 930. Other component control instructions which may be transmitted from processor 900 to reader 10 for substantially on-receipt execution by reader processor 40 are instructions which, for example, cause predetermined indicia to be displayed by reader display 56, or which cause processor 40 to capture, by appropriate control over image sensor 32, a single frame of image data corresponding to the scene presently in the field of view of reader 10 in memory 45 or in another memory device.

It will be understood that certain component control instructions require that reader processor 40 execute a series of instruction steps, or repetitive instruction steps to cooperatively control more than one reader component. For example, a component control instruction commanding an optical reader to capture an image normally requires that processor 40 execute a series of instruction steps involving control of such components as LEDs 22, components of the imaging assembly, and memory 45.

Figure 6B:
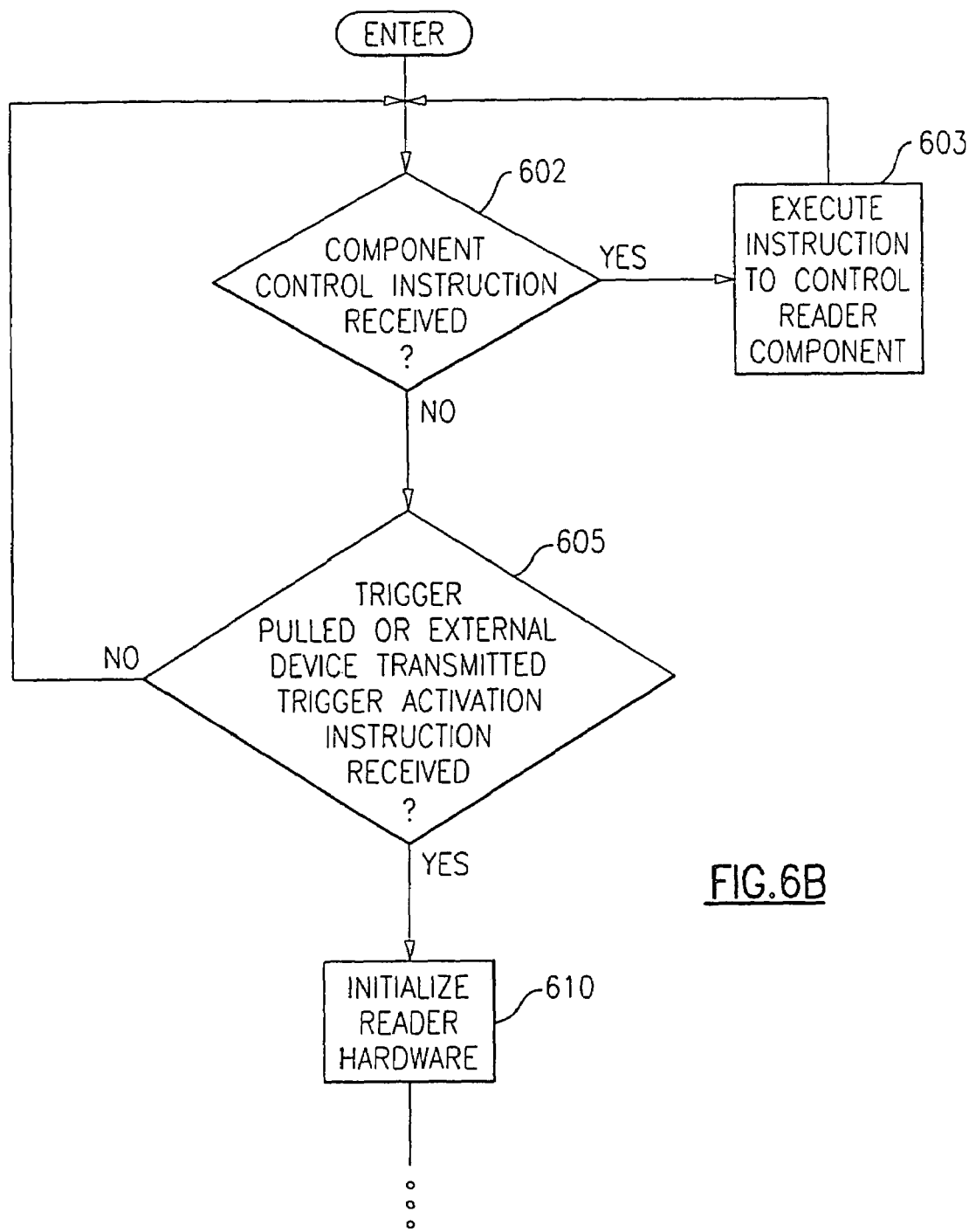
FIG. 6B is a flow chart of a modified main program of the reading apparatus.

A modified reader operating program that adapts a reader to receive component control instructions from an external local host processor for substantially on-receipt execution by reader 10 is shown in FIG. 6B. Reader 10 is readily enabled to receive and execute external device transmitted component control instructions by modification of the program loop indicated by block 605 of FIG. 6A wherein reader 10 waits in a low power state until a trigger is pulled. As shown by the flow diagram of FIG. 6B, block 605 may be modified to the form illustrated by block 605' so that reader executes block 610 and the ensuing blocks shown and described in connection with FIG. 6A in response either to a trigger being manually pulled or to the receipt of an external device transmitted trigger activation instruction from processor 900. Block 635 of the flow diagram of FIG. 6A may also be modified so that the reader is responsive either to a manual trigger release or to receipt of an external device transmitted trigger receive instruction. Reader 10 may also be made to exit the loop indicated by block 605' on the condition that another component control instruction for on-receipt execution by reader 10 is received. As is indicated by block 602 and block 603, reader 10 may be adapted to exit the loop indicated by block 605' and to appropriately control the component associated with the received instruction on the condition that an external device transmitted component control instruction is received from processor 900.

Scanning-Decoding/Autodiscrimination

The scanning-decoding and autodiscrimination features, and their relationships to the above-described menuing and reprogramming features, will now be described with reference to FIGS. 6 and 12–18. More particularly, the combined operation of these features will be discussed in connection with FIG. 6A. The SOD, SS and DOD scanning-decoding modes will be discussed in connection with FIGS. 13 and 14, and the OS, RUD and RUS scanning-decoding modes will be discussed in connection with FIG. 15. Finally, the 1D and 2D portions of the autodiscrimination feature will be discussed in connection with FIGS. 16–18, respectively.

Turning first to the main program of FIG. 6A, the scanning and decoding operations are shown as blocks 625–647. In those embodiments or modes in which the multiple symbols code option is not enabled (see option B5 of FIG. 7B), the processor assumes, that only one symbol is to be decoded. Under this condition, if decoding is successful, the processor processes the decoded symbol as a menu symbol in accordance with previously described menu routine 660, or as output data in accordance with block 646, and then is stopped by one of blocks 647, 635 or 642. If decoding is not successful, the processor is directed back (unless stopped by blocks 635 or 642) to capture and attempt to decode another image. In this case, the "no" output of multiple symbols block 643 is selected, allowing additional images to be captured as necessary.

In those embodiments or modes in which the multiple symbols option is enabled, the processor assumes that more than one symbol is present in the image data. Under this condition, if decoding is successful, the processor continues to loop back to block 627 to make additional decoding attempts, unless stopped by one of blocks 635 or 642. In this case, however, the "yes" output of block 643 is selected, preventing additional images from being captured.

When the processor begins executing its scanning-decoding program, it first determines from the parameter table which scanning-decoding option or combination of options is to be used. It will then be directed to an autodiscrimination routine that is configured to execute that routine in accordance with the selected scanning-decoding option or options.

At start up, the parameter table maybe set up so that operation in the One Shot scanning-decoding mode is established as a default condition. Alternatively, the parameter table may be set up so that the RUD or RUS scanning-decoding mode is established as a default condition. Since the One Shot mode is inherently a non-tracking mode, its selection as a default mode implies that none of the tracking modes is selected. Since the RUD and RUS modes can be used either with or without one of the three tracking modes, its selection as a default parameter may or may not be associated with one of the three tracking modes, depending upon how the reader is programmed at the time of manufacture.

(a) Tracking Options

Figure 12:
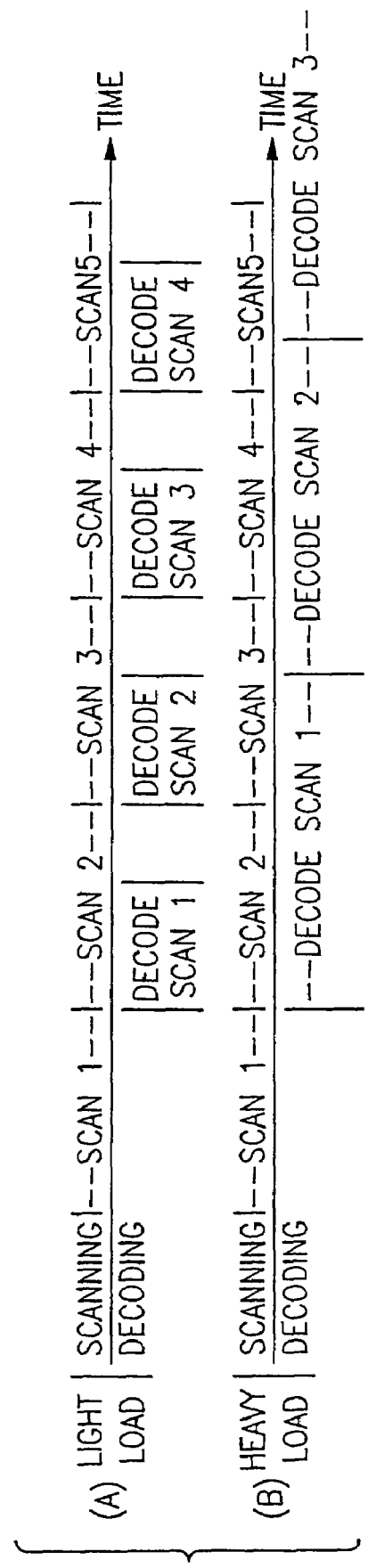
FIG. 12 is a timing diagram which shows the scanning/decoding relationship used by the prior art.
Figure 13:
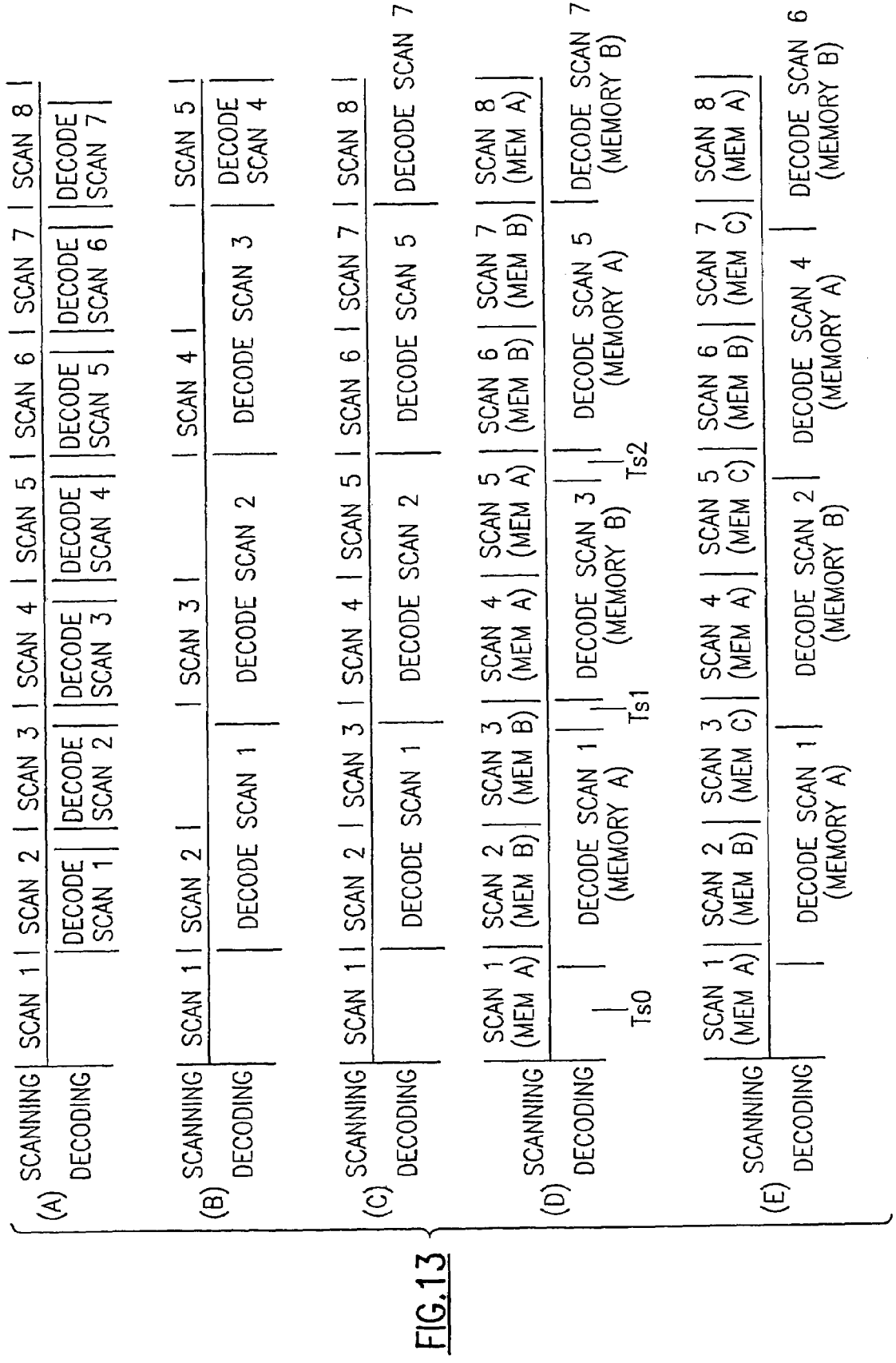
FIG. 13A through 13E are timing diagrams which illustrate various ones of the tracking relationships made possible.
Figure 14:
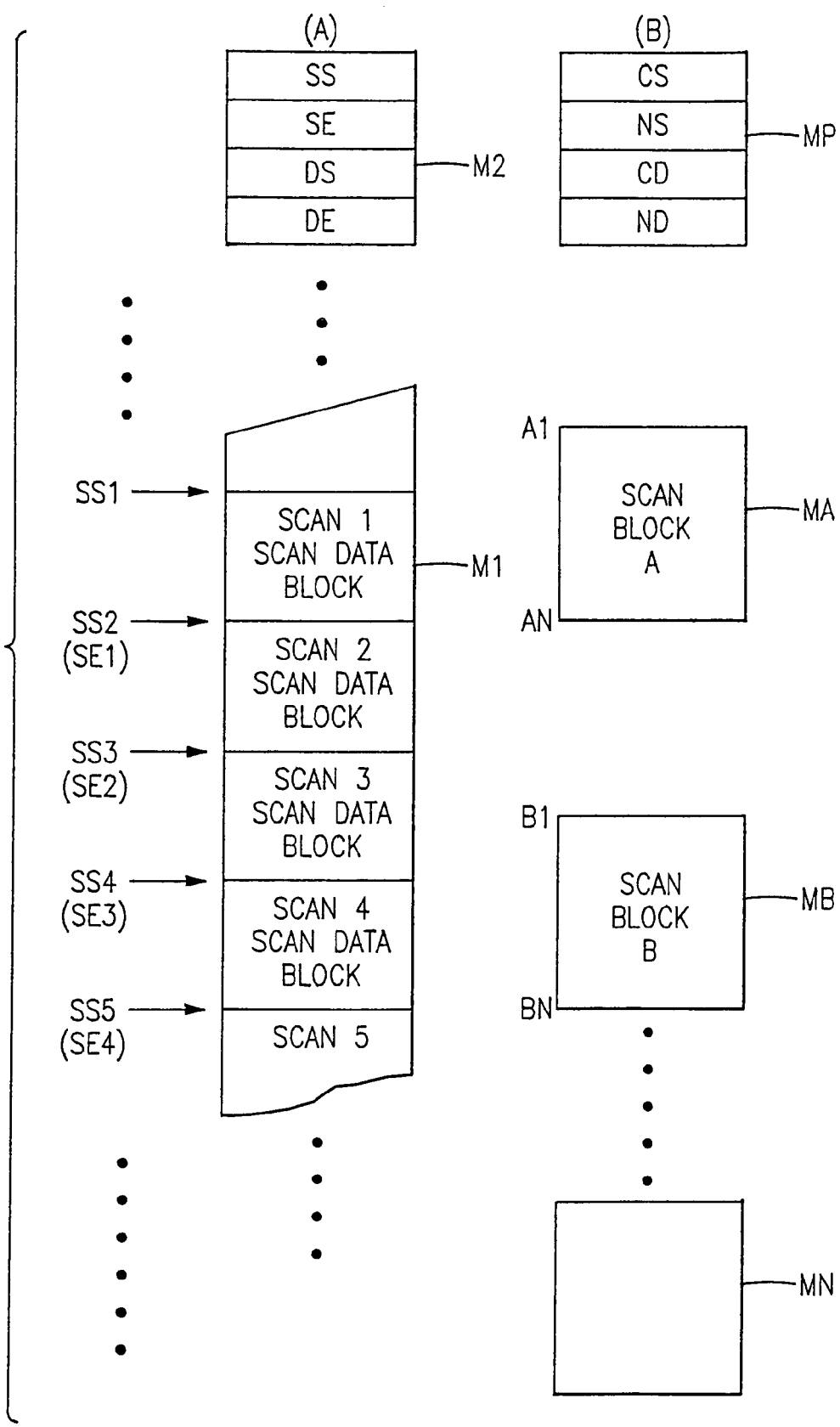
FIG. 14 shows examples of memory structures that may be used in implementing the tracking relationships shown in FIGS. 13A through 13E.

The differences between the three tracking modes are best understood with reference to FIGS. 12–14. The latter figures (with changes in figure and indicia number) are incorporated from prior copending U.S. patent application Ser. No. 08/914,883, together with their associated descriptions as follows:

Scanning of indicia can take place under either of two generalized conditions, depending upon the decoding load presented by the indicia. Under light decoding loads, shown in FIG. 12A for a prior an reader, the amount of data to be decoded is relatively small, allowing scan data from a complete scan to be decoded in a time which is less than the duration of a scan. Under this condition, the result of each scan is decoded before the completion of the following scan, and no problems arise as a result of any mismatch between the scan time and the decode time of the reader. The prior art and the instant reader perform equally well under such light decoding loads as will be seen later from FIG. 13.

Under heavy decoding loads, however, prior art methods do not allow sufficient time for decoding. Thus, as shown in FIG. 12B, when a first scan, Scan 1 is completed, a second scan, Scan 2 is initiated immediately. Scan 2 is then followed by Scan 3 while the decoding of Scan 1 is still in progress. As this situation continues, the decoding process will be seen to fall further and further behind the scanning process until, at some point, the data memory becomes filled. When this occurs new scan data will overwrite old scan data which was not processed, thereby causing a loss of large blocks of scan data.

In the embodiment disclosed in prior copending application Ser. No. 08/205,539, now issued as U.S. Pat. No. 5,463,214, this problem is solved by modifying the reader in a way that allows the scanning process to be suspended and restarted as required to prevent the decoding process from falling so far behind the scanning process that data overflows the memory and is lost. This embodiment is referred to herein as the "Scan on Demand" or SOD tracking mode. This solution to the problem may be understood with reference to FIGS. 13A and 13B. Referring to FIG. 13A, there is shown the operation of the subject embodiment under light decoding loads. It will be noted that, under this condition, the relationship between scanning and decoding is the same as that shown in FIG. 12A.

FIG. 13B shows the relationship which exists between the scanning and decoding processes when the Scan On Demand mode is used under heavy decoding loads. As shown in FIG. 13B, the suspension of the scanning process continues until the results of the prior scan have been decoded. This prevents the decoding process from falling more than a small amount of time behind the scanning process. As a result, there cannot arise a situation, such as that which can arise with the prior art, in which there is a massive loss of scan data. Because this process is described in detail in U.S. Pat. No. 5,463,214, it will not be described in detail herein.

Referring to FIG. 13C there is shown the tracking relationship which exists between the scanning and decoding operations when these operations are controlled in accordance with a tracking mode referred to as the "Skip Scan" or SS tracking mode. With this mode, under heavy decoding loads, decoding proceeds without interruption so long as the scanning function is called for. As shown in FIG. 13C, each decoding operation begins immediately after the preceding decoding operation ends, and proceeds on the basis of the scan data from the then most current complete block of scan data.

More particularly, FIG. 13C illustrates one possible scenario in which decoding of Scan 1 data is immediately followed by the decoding of Scan 2 data. This occurs because Scan 3 data is incomplete at the time that the second decoding operation begins. The decoding of Scan 2 data, however, is immediately followed by the decoding of Scan 5 data. This occurs because Scan 5 data represents the then most current complete block of scan data. While the results of scans 3 and 4 are therefore unused and skipped over, the data lost by their non-use is provided by more current scan data or, if decoding is unsuccessful, by the results of a later scan. Any occasional decoding failure that results from the skipping of relatively old blocks of scan data is in any case more than offset by the avoidance of the large scale data losses discussed in connection with FIG. 12B.

Referring to FIG. 13D there is shown the tracking relationship which preferably exists between the scanning and decoding operations when these operations are performed in a reader which includes two and only two scan data memory spaces A and B. With this reader, the preferred tracking mode is the "Decode on Demand" or DOD tracking mode. With this mode decoding does not proceed without interruption. As shown in FIG. 13D, each decoding operation begins at the beginning of a block of scan data. In the event that the end of a decoding operation does not coincide with the beginning of such a block, i.e., occurs while a scanning operation is still in progress, the beginning of the next decoding operation will be delayed until the scanning operation that is then in progress is completed, and then proceeds with reference to the block of scan data which is produced by that scanning operation.

More particularly, FIG. 13D shows that the decoding of Scan 1 data is completed while Scan 3 is still in progress, overwriting data for Scan 2. Under this condition, decoding is discontinued for a time period $T_{s1}$ that is equal to the time necessary for Scan 3 to be completed. At the end of time period $T_{s1}$, decoding resumes with the then most current block of scan data, namely: the scan data produced during Scan 3. Thus, like the mode which is illustrated FIG. 13C, the mode which is illustrated in FIG. 13D begins its decoding operation with the then most current complete block of scan data.

Referring to FIG. 13E, there is shown the tracking relationship which exists between the scanning and decoding operations when these operations are performed in a reader which includes three scan data memory spaces A, B and C. With this embodiment decoding proceeds without interruption so long as the scanning function is called for. As shown in FIG. 13E, each decoding operation begins immediately after the preceding decoding operation ends, and proceeds on the basis of scan data from the memory which contains the then most current complete block of scan data.

More particularly, FIG. 13E shows that the decoding of Scan 1 is completed while Scan 3 is still being acquired. Under this condition, with three memory spaces available, decoding is immediately undertaken on the most recent complete Scan (Scan 2) which is contained in memory space B. Upon the completion of the decoding of Scan 2, decoding is commenced on Scan 4 which is contained in memory space A. Thus, the utilization of three memory spaces allows the decoding portion to be occupied one hundred percent of the time.

The mode illustrated in FIG. 13C is best suited for use with readers having memories and addressing procedures which can accommodate large numbers of relatively short blocks of scan data having sizes that are not known in advance. Applications of this type typically include readers, such as that shown in FIG. 3, which use 1D image sensors.

The modes illustrated in FIGS. 13D and 13E, on the other hand, are best suited for use with readers having memories and addressing procedures which can accommodate small numbers of relatively long blocks of scan data of fixed length. Applications of these types typically include readers, such as that shown in FIG. 2, which use 2D image sensors. With the embodiment illustrated in FIG. 13D, only two scan data memory spaces are used and decoding is discontinuous. With the embodiment illustrated in FIG. 13E three scan data memory spaces are used and decoding is continuous. More than three scan data memory spaces can also be used if additional decoding resources are made available. The one of these different embodiments which is used in a particular application is a design choice which is based on economic considerations.

The fact that some embodiments use 1D image sensors while others use 2D image sensors should not be taken to mean that embodiments which use 1D image sensors can only read 1D symbols or that embodiments which use 2D image sensors can only read 2D symbols. This is because techniques exist for using either type of image sensor to read both 1D and 2D symbols. It will therefore be understood that the present invention is not restricted to use with any one type of image sensor or to any one type of bar code or other optically encoded symbol.

Referring to FIG. 14A, there is shown a memory space M1 suitable for use in storing blocks of scan data of the type produced by a reader with a 1D image sensor, together with a pointer or tracking memory M2 suitable for use in storing address or pointer information that makes it possible for the reader to identify the beginning and end point of a block of interest. As shown in FIG. 14A, the block of scan data produced during a first scan of the target is stored in memory M1 beginning at address SS1 (Scan Start for Scan 1) and ending at address SE1 (Scan End for Scan 1). Similarly, the block of scan data resulting from a second scan of the target is stored between addresses SS2 and SE2, and so on. Because scanning takes place continuously, the end of one scan block (e.g. SE1) coincides with the beginning of the next scan block (e.g., SS2). The sizes (in memory space) of these blocks will ordinarily vary from block to block, depending on the number of data transitions in each 1D scan of the target. The boundaries between blocks will, however, be fixed by the occurrence times of the Scan Interrupt signals which are generated by the image sensor or its clock generating circuitry.

Locations SS and SE of memory M2 are updated in the course of a series of scans so that they always identify or otherwise point to the address of the beginning and ending of the most recently produced complete block of scan data. As a result, when the decoding circuitry is ready to decode the most recently produced complete block of scan data, it need only refer to locations SS and SE to obtain information as to where to begin and end decoding. Before decoding begins, the contents of locations SS and SE are written into locations DS (Decode Start) and DE (Decode End) so that locations SS and SE can continue to be updated while decoding proceeds on the basis of the contents of locations DS and DE. In the preferred embodiment, the decoding circuitry is programmed to mark these beginning addresses as "invalid" (for example, by changing its sign) after it is acquired. Since the decoding processor is programmed to decode only "valid" data, this assures that it can decode a single block of scan data only once.

Referring to FIG. 14B there are shown a plurality of memory spaces MA, MB MN suitable for use in storing blocks of scan data of the type produced by a reader having a 2D image sensor, together with a pointer or tracking memory MP suitable for use in storing address or pointer information for identifying the memory spaces to be used for entering new scan data, decoding, etc. Since the amount of scan data in each block of scan data is known in advance, being the same for each scan, the starting and ending addresses for each memory space (e.g., $A_1$ and $B_1$ and $A_N$ and $B_N$, etc.) will also be the same for each scan. As a result, the memory to be used for storing new scan data, decoding etc. may be specified by specifying just a few bits stored in memory MP. Location CS, for example, may be used as a pointer which identifies the memory where the current scan is being stored, and location NS may be used as a pointer which identifies where the next scanned image is to be stored.

Similarly, location CD may be used as a pointer which identifies the memory space where the current decode is being undertaken. Finally, location ND may be used as a pointer which identifies where the next available image is for decoding purposes.

Under ordinary circumstances, three scan data memory spaces will be sufficient to keep the decoding activity of the reader fully occupied and current. This is because the tracking method allows the skipping over of old blocks of scan data as necessary for the decoder to remain occupied and current. If the decoding load becomes extremely heavy, however, it is possible that more old blocks of scan data are skipped over than is advisable. In such instances, it may be desirable to increase the number of memory spaces from 3 to N, where N may be 4 or even more, and to use more than one decoding circuit. If such an increased number of memories and decoders is used, blocks of scan data may be distributed among the memories according to a simple sequential rule and kept track of by increasing the number of bits in the pointers of memory space MP. In addition, the decoding circuits may be assigned to the then most current complete block of scan data as they become free. It will be understood that all such numbers of memory spaces and decoding circuits and the associated tracking procedure are within contemplation.

Figure 15:
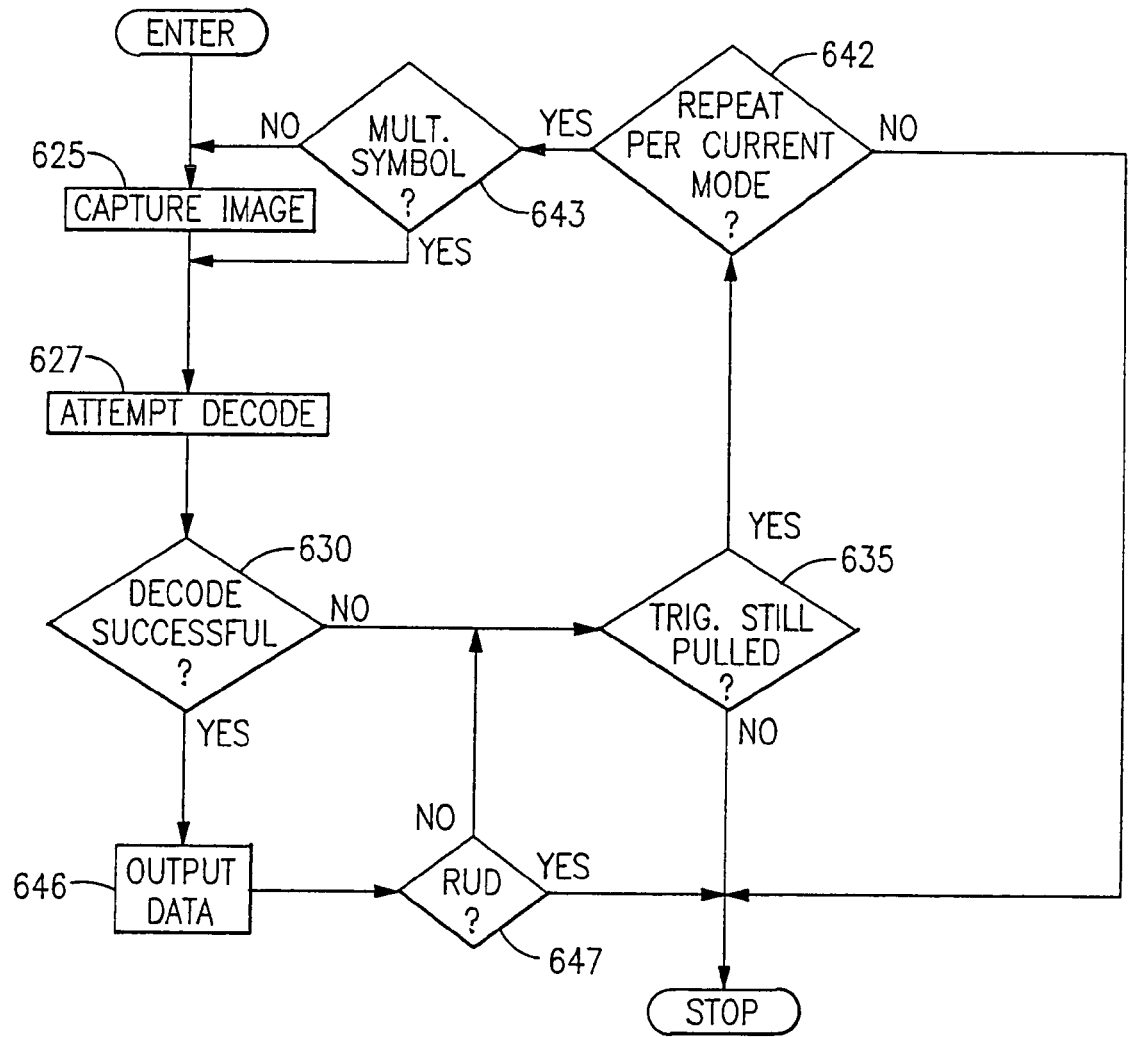
FIG. 15 is a simplified flow chart which illustrates the "Repeat Until Done," "Repeat Until Stopped," and "One Shot" scanning-decoding modes.

Referring to FIG. 15, there is shown a simplified version of FIG. 6A which eliminates those blocks which do not relate directly to the use of the scanning-decoding parameters of FIG. 7B to produce decoded output data. Of the blocks shown in FIG. 15, blocks 625, 627 and 646 are common to prior art readers and to readers constructed according to the present feature. The remaining blocks of FIG. 15 operate either singly or in various combinations to establish the permitted combinations of the scanning-decoding modes shown in FIG. 7B. These remaining blocks together comprise the preferred embodiment of the means by which the reader is controlled in accordance with the scanning-decoding relationships called for by the parameter table thereof. Other combinations of flow chart blocks, and other combinations of scanning-decoding parameters may also be used. Blocks 642 and 643 may, for example, be configured so that only a preset number of multiple symbols or a preset number of repeats is permitted. Alternatively, all scanning-decoding control blocks may be collectively replaced by a look-up table which directly specifies the next action to be taken. These and other variants will be understood to be within contemplation.

In view of the foregoing, it will be seen that the scanning and decoding processes may have a selectable one of any of a plurality of different relationships with one another, some of these relationships being tracking relationships and some being non-tracking relationships. In accordance, the menuing feature allows a user to select that operating mode, whether or not tracking, which gives the best overall data throughput rate in view of the user's then current objectives.

(b) Autodiscrimination/Code Options

Figure 16:
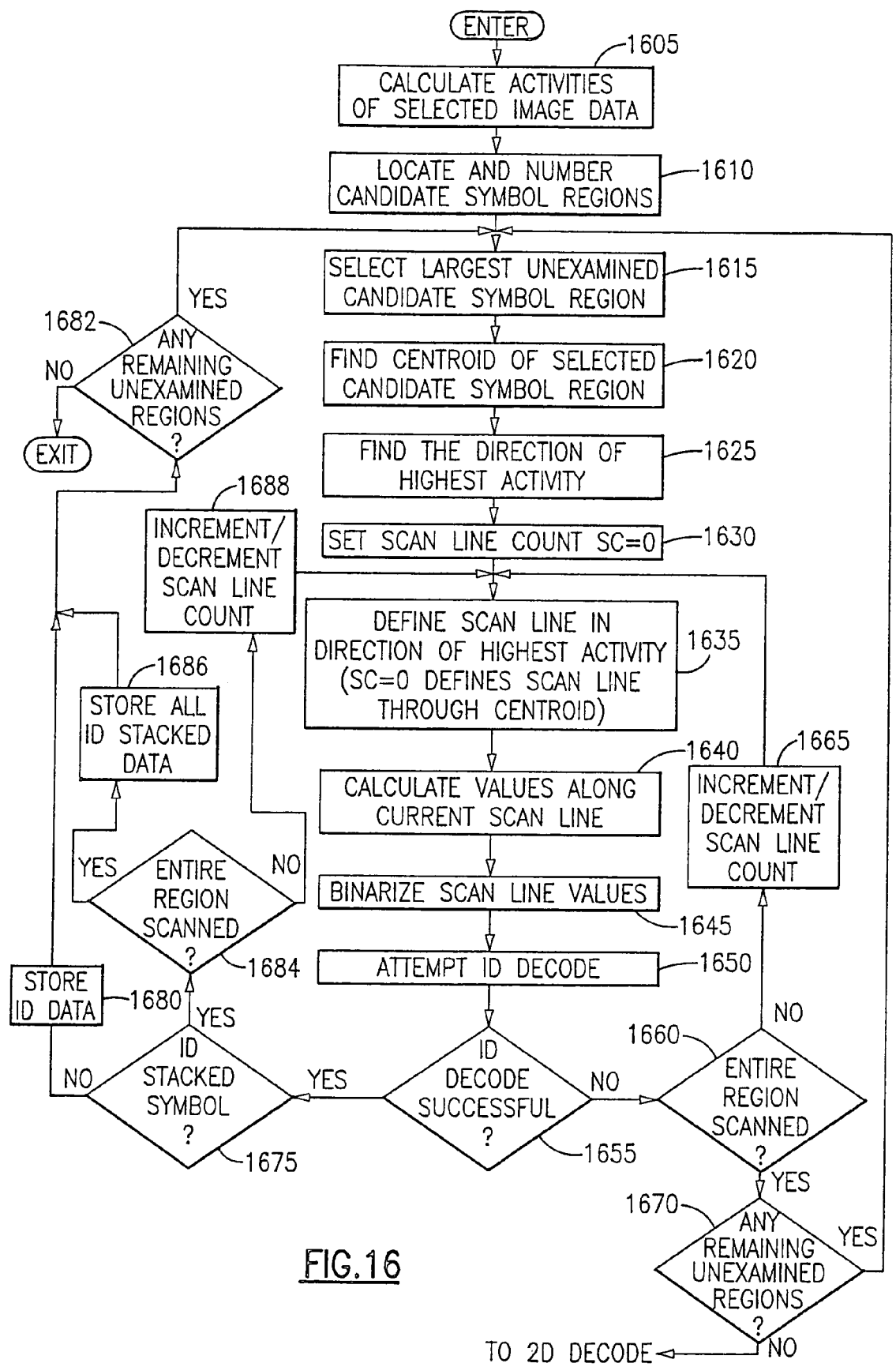
FIG. 16 is a flow chart of one embodiment of the 1D portion of the autodiscrimination program.
Figure 18:
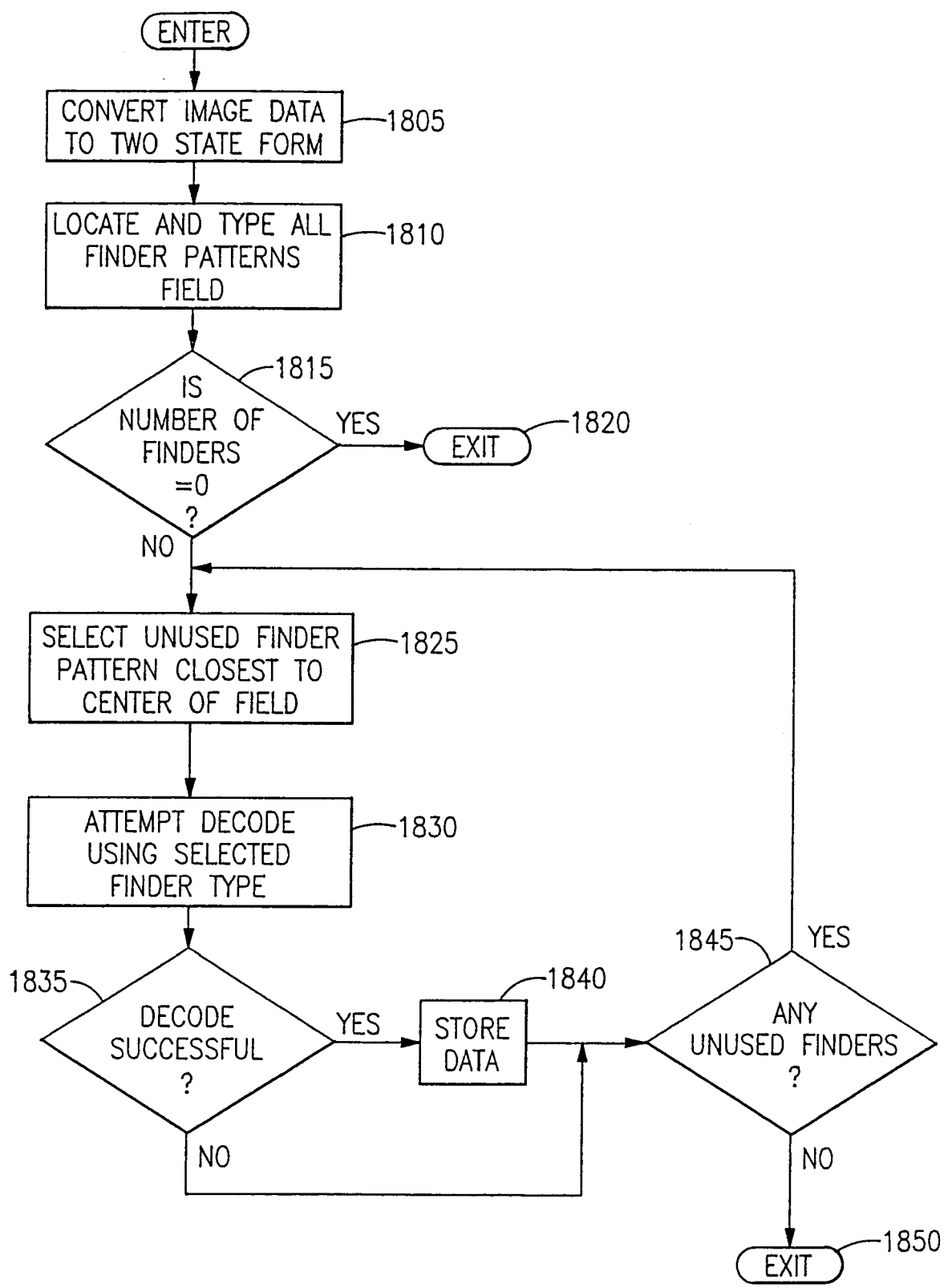
FIG. 18 is a flow chart of one embodiment of the 2D portion of the autodiscrimination process.

The manner in which the code options called for by the parameter table are implemented in conjunction with the autodiscrimination feature, will now be described with reference to the flow charts of FIGS. 16 and 18. Generally speaking, the flow chart of FIG. 16 illustrates the 1D portion of a complete 1D/2D autodiscrimination process, while the flow chart of FIG. 18 illustrates the 2D portion of a complete 1D/2D autodiscrimination process. If both the 1D and 2D code options of the parameter table are enabled (see options B1 and B2 of FIG. 7B), the steps called for by both FIGS. 16 and 18 will be executed before the autodiscrimination process is completed. If, however, only one or the other of the 1D and 2D code options of the parameter table is enabled, only the steps called for by FIG. 16 or by FIG. 18 will be executed before the autodiscrimination process is completed. It will therefore be seen that the menuing features and the autodiscrimination features interact with one another in a manner that allows a user to tailor the autodiscrimination circuitry as necessary to achieve the highest possible data throughput rate for a particular application.

In order to gain an understanding of the present as a whole, it should be borne in mind that the above-described relationships between the decoding and menuing processes exist as a subset of an even more complex set of relationships that include the tracking and multiple symbols features. When, for example, a portion of the flow chart of FIGS. 16 and 18 calls for an attempted decode, it must be remembered that the attempted decode takes place in the context of the tracking or non-tracking relationships indicated by the parameter table options. In addition, the number of passes that the processor makes through the flow chart of FIG. 16, before continuing on to the flow chart of FIG. 18, depends upon whether or not the multiple symbols feature has been enabled.

In principle, at least, each one of the possible combinations of the above-described options may be represented in a complete and separate flow chart and described as such. Because adopting the latter approach would obscure rather than clarify, however, the present application will describe these combinations simultaneously in terms of a representative flow chart, with different options being described potential variants of that representative flow chart.

Turning first to the flow chart of FIG. 16, there is shown the 1D portion of the autodiscrimination process, which operates on a set of image data that has been scanned from a target symbol of unknown type and orientation and stored in RAM 45. If the reader is a 2D reader, this image data will comprise a gray scale representation of the 2D image formed on the image sensor, each pixel of the image sensor being represented by an image data element that includes an 8 bit gray scale indication of its brightness. If, on the other hand, the reader is a 1D reader, the image data may comprise either binary or gray scale values.

If the reader includes a 2D image sensor, this image data will have been scanned as a 2D image while the reader is held substantially stationary with respect to its target. If the reader includes a 1D image sensor this image data will have been scanned as a series of 1D images while the reader is being moved asynchronously across the target in the manner described in copending commonly assigned U.S. patent application Ser. No. 08/504,643, which is expressly incorporated herein by reference.

On encountering block 1605, the processor is directed to calculate the "activities" of selected image data elements. The "activity" of a point P as used herein comprises a measure of the rate of change of the image data over a small two dimensional portion of the region surrounding point P. This activity is preferably calculated along any two arbitrarily selected directions which are mutually perpendicular to one another, as shown by the lines parallel to directions X and Y of FIG. 17A. One example of an activity calculation is that which is based on the squares of the gray scale differences of two pairs of points P1X–P2X and P1Y–P2Y that are centered on point P, as shown in FIG. 17A. Two mutually perpendicular directions are used because the orientation of the symbol is unknown and because a high activity level that by chance is difficult to detect in a first direction will be readily detectable in a second direction perpendicular to that first direction.

In the preferred embodiment, an activity profile of the image data is constructed on the basis of only a selected, relatively small number of image data elements that are distributed across the field of view that corresponds to the stored image data. Using a relatively small number of data elements is desirable to increase the speed at which the symbol may be imaged. These selected points may be selected as the points which lie at the intersections of an X-Y sampling grid such as that shown in FIG. 17A. The spacing of the lines defining this grid is not critical, but does affect the resolution with which the activity profile of the image can be measured.

When the processor has determined the activities of the selected image data points, it is directed to block 1610, which causes it to look for candidate bar code symbols by identifying regions of high activity. This is conveniently done by determining which sets of image data points have activities that exceed a predetermined activity threshold value. A simplified, one-dimensional representation of this step is illustrated in FIG. 17B, wherein those image data points having an activity that exceed a threshold value TH are labeled as a candidate symbol region CSR1.

In embodiments which are adapted to find and decode all of the symbols that occur in fields of view that include a plurality of bar code symbols, (i.e., embodiments in which the multiple symbols option is enabled), the result of the step called for by block 1610 is the identification of a plurality of candidate symbol regions (CSRs), any one or more of which may be a bar code symbol. Whether or not they are bar code symbols is determined on the basis of whether they are decodable. As will be explained more fully later, if the multiple symbols option is not enabled, the processor may be instructed to select one of the CSRs according to a suitable selection rule, such as the largest CSR first, the CSR nearest the center of the field of view first, the CSR with the highest total activity first, etc., and then attempt to decode only that symbol and stop, whether or not a symbol has been decoded. Alternatively, as a further option, the processor may be instructed to attempt to decode each CSR in turn until one of them is successfully decoded, and then stop. If the multiple symbols option is enabled, the processor will process all of the CSRs, in turn, according to a suitable priority rule, and continue to do so until all of the CSRs have been either decoded or have been determined to be undecodable.

Once all CSRs have been located, the processor is directed to block 1615, which calls for it to select the then largest (or most centrally located) as yet unexamined CSR for further processing, and then proceed to block 1620. The latter block then causes the processor to find the centroid or center of gravity of that CSR, before proceeding to block 1625. An example of such a centroid is labeled C in FIG. 17C. Because the steps involved in finding a centroid are well known, they will not be described in detail herein.

On encountering block 1625, the processor is directed to examine the selected CSR by defining various exploratory scan lines there through, determining the activity profile of the CSR along those scan lines, and selecting the scan line having the highest total activity. In the case of a 1D bar code symbol, this will be the direction most nearly perpendicular to the direction of the bars, i.e., the optimum reading direction for a 1D symbol.

On exiting block 1625, the processor encounters blocks 1630 and 1635. The first of these sets a scan line counter to zero; the second defines an initial, working scan line through the centroid in the previously determined direction of highest activity. The result of this operation is the definition, in the image data space representation of the CSR, of a working scan line such as SC=0 in FIG. 17C.

Once the initial scan line has been defined, the processor is directed by block 1640 to calculate, by interpolation from the image data of the CSR, the values of sampling points that lie along this scan line. This means that, for each sampling point on the initial scan line, the processor will calculate what brightness the sampling point would have if its brightness were calculated on the basis of the weighted brightness contributions of the four nearest measured image data points of the CSR. These contributions are illustrated by the dotted lines which join the sample point SP of FIG. 17D to the four nearest image data points DPA–DPD. So long as these sampling points are more closely spaced than the image data points, this interpolation procedure will be performed on a subpixel basis, and will produce a usably accurate representation of the image data along the scan line. The result of the subpixel interpolation of the sampling points on a representative scan line of this type is shown in FIG. 17E. Because the particulars of the subpixel interpolation process are known to those skilled in the art, this process will not be further described herein.

Once the above-described scan line data have been calculated, the processor is directed to block 1645, which calls for it to binarize the scan line data, i.e., convert it to a two-state representation of the data which can be processed as a candidate for 1D decoding. One such representation is commonly known as a timercount representation. One particularly advantageous procedure for accomplishing this binarization process is disclosed in U.S. Pat. No. 5,286,960, which is hereby incorporated herein by reference.

On exiting block 1645, the processor will be in possession of a potentially decodable two-state 1D representation of the CSR. It then attempts to decode this representation, as called for by block 1650. This attempted decoding will comprise the trial application to the representation of one 1D decoding program after another until the latter is either decoded or determined to be undecodable. Because decoding procedures of the latter type are known to those skilled in the art, they will not be discussed in detail herein.

As the 1D autodiscrimination process is completed, the processor is directed to decision block 1655 which causes it to continue along one of two different paths, depending on whether or not decoding was successful. If it was not successful, the processor will be caused to loop back to block 1635, via blocks 1660 and 1665, where it will be caused to generate a new working scan line that is parallel to initial scan line SC=0, but that passes above or below centroid C. This looping back step may be repeated many times, depending on the "spacing" of the new scan lines, until the entire CSR has been examined for decodable 1D data. If the entire CSR has been scanned and there has been no successful decode, the processor is directed to exit the just-described loop via block 1670. As used herein, the term "parallel" is used in its broad sense to refer to scan lines or paths which are similarly distorted (e.g., curvilinear) as a result of foreshortening effects or as a result of being imaged from a non-planar surface. Since compensating for such distorting effects is known, as indicated, for example, by U.S. Pat. No. 5,396,054, it will not be discussed in detail herein.

Block 1670 serves to direct the processor back to block 1615 to repeat the above-described selection, scanning and binarizing steps for the next unexamined CSR, if one is present. If another CSR is not present, or if the processor's program calls for an attempt to decode only one CSR, block 1670 causes the processor to exit the flow chart of FIG. 16 to begin an attempt to decode the then current set of image data as a 2D symbol, in accordance with the flow chart of FIG. 18. If other CSRs are present, and the multiple symbols option is enabled, block 1670 directs the processor back to block 1615 to repeat the selection, scanning and binarizing process for the next CSR, and the next, and so on, until there is either a successful decode (block 1655) or all of the CSRs have been examined (block 1670).

Figure 19A:
FIGS. 19A through 19D show representative bar code symbols of types that may be decoded by the reading apparatus.
Figure 19B:
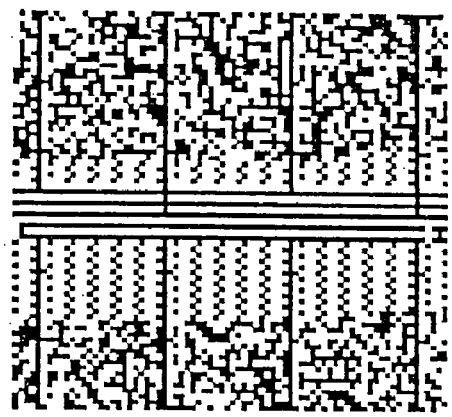
Figure 19C:
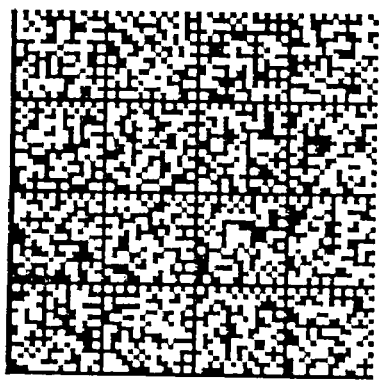
Figure 19D:
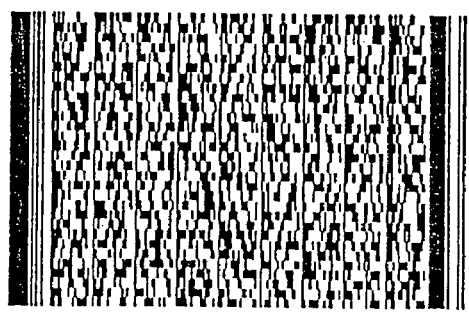

If the processing of the first CSR has resulted in a successful decode, block 1655 directs the processor to block 1675, which causes it to determine whether the decoded data indicates that the CSR contains a 1D stacked symbol, such as a PDF417 symbol. One example of such a symbol is shown in FIG. 19D. If it is not, i.e., if the decoded symbol includes only a single row of bars, the 1D data is stored for later outputting in accordance with block 648 of the main program of FIG. 6A, as called for by block 1680. Alternatively, the data may be output immediately and block 648 later skipped over. Then, if there are no remaining unexamined CSRs, or if the multiple symbols option is not enabled, the processor is directed to exit the flow chart of FIG. 16 via block 1682. If, however, there are remaining CSRs and the multiple symbols option is enabled, block 1682 will direct the processor back to block 1615 to begin processing the next CSR, and the next, and soon until all CSRs have been examined and decoded (block 1682) or examined and found to be undecodable (block 1670).

If, on encountering block 1675, the decoded data indicates that the CSR contains a 1D stacked symbol, the above-described processing is modified by providing for the repetition of the scanning-digitizing process, beginning with block 1635. This is accomplished by blocks 1684, 1686 and 1688 in a manner that will be apparent to those skilled in the art. Significantly, by beginning the repeating of the process at block 1635, all additional scan lines defined via the latter path will be parallel to the first decodable scan line, as required by a 1D stacked symbol, at least in the broad sense discussed earlier.

In view of the foregoing, it will be seen that, depending on the number of CSRs that have been found in the stored image data, and on the enablement of the multiple symbols option, the flow chart of the embodiment shown in FIG. 16 will cause all 1D symbols in the image data to be either decoded or found to be undecodable before directing the processor to exit the same.

As will be explained more fully in connection with FIG. 20, the 2D autodiscrimination flow chart of FIG. 18 may be processed after the processing of the 1D autodiscrimination flow chart of FIG. 16 has been completed. It may also be processed without the flow chart of FIG. 16 having been previously processed, i.e., the 1D portion of the 1D/2D autodiscrimination process may be skipped or bypassed. (In principle, the steps of the 2D portion of the 1D/2D autodiscrimination process (FIG. 18) may also be processed before the 1D portion thereof (FIG. 16), although this option does not comprise the preferred embodiment). This is because the code options of the menuing feature make all of these options selectable by the user. It will therefore be understood that the present feature contemplates all possible combinations of autodiscrimination options.

Referring to FIG. 18, there is shown a flow chart of the 2D portion of the 1D/2D autodiscrimination process. When the flow chart of FIG. 18 is entered, the image data that is stored in RAM 45 is the same as that which would be stored therein if the flow chart of FIG. 16 were being entered. If the reader is a 2D reader this image data will comprise an array of 8-bit gray scale image data elements produced by image sensor 32-2 and its associated signal processing and A/D converter circuits 3502 and 36-2. If the reader is a 1D reader that produces a 2D image by being moved across the target symbol, the image data will comprise an array of binary data elements such as those shown in above-cited copending application Ser. No. 08/504,643.

The flow chart of FIG. 18 begins with a block 1805, which directs the processor to convert the gray scale image data representation stored in RAM 45 (if present) into a two-state or binarized representation of the same data. This may be accomplished in generally the same manner described earlier in connection with FIG. 17B, i.e., by comparing these gray scale values to a threshold value and categorizing these values as 1s or 0s, depending upon whether they exceed or do not exceed that threshold value.

Once the image data has been binarized, the processor continues on to block 1810, which causes it to identify and locate all of the 2D finder patterns that appear in the field of view of the image data. This is preferably accomplished by examining all of the candidate 2D finder patterns (CFPs) that are present and identifying them by type, i.e., identifying whether they are bullseye type finder patterns, waistband type finder patterns or peripheral type finder patterns. An example of a bullseye type finder pattern is shown in the central portion of the 2D bar code symbol of FIG. 19A, which symbol encodes data in accordance with a 2D matrix symbology named "Aztec." An example of a waistband type finder pattern is shown in the middle portion of the 2D bar code symbol of FIG. 19B, which symbol encodes data in accordance with a 2D matrix symbology named "Code One." An example of a peripheral type finder pattern is shown in the left and lower edges of the 2D bar code symbol of FIG. 19C, which symbol encodes data in accordance with a 2D matrix symbology known as "Data Matrix." The finder identification process is performed by applying to each CFP, in turn, a series of finder pattern finding algorithms of the type associated with each of the major types of finder patterns. Since such finder finding algorithms are known for finders of the waistband and peripheral types, these algorithms will not be discussed in detail herein. One example of a finder finding algorithm for a waistband type finder may be found, for example, in "Uniform Symbology Specification Code One," published by AIM/USA Technology Group. Finder finding algorithms for bullseye type finders that include concentric rings, (e.g. MaxiCode) are also known and will also not be described in detail herein.

Particularly advantageous, however, is bullseye type finder finding algorithm of the type that may be used both with 2D symbologies, such as MaxiCode, that have bullseye finder patterns that include concentric rings and with 2D symbologies, such as Aztec, that have bullseye finder patterns that include concentric polygons. A finder finding algorithm of the latter type is described in copending, commonly assigned U.S. patent application Ser. No. 08/504,643, which has been incorporated herein by reference. The Aztec 2D bar code symbology itself is fully described in U.S. patent application Ser. No. 08/441,446, which has also been incorporated herein by reference.

Once all of the finder patterns have been located and their types have been determined, the processor is directed to decision block 1815. This block affords the processor an opportunity to exit the flow chart of FIG. 18, via exit block 1820, if no 2D finder patterns could be found and typed. This block speeds up the execution of the program by skipping over decoding operations which have no hope of success without their associated finder pattern.

If a finder pattern has been found and typed, the processor is directed to block 1825. This block causes the processor to select for decoding the bar code symbol whose finder is closest to the center of the field of view of the image data. Optionally, the processor may be instructed to find the largest 2D bar code symbol that uses a particular 2D symbology or the 2D bar code symbol using a particular 2D symbology which is closest to the center of the field of view of the image data. The "closest-to-the-center" option is ordinarily preferred since a centrally located symbol is likely to be a symbol, such as a menu symbol, at which the user is deliberately aiming the reader. Once this selection has been made, the processor attempts to decode that symbol, as called for by block 1830. If this decoding attempt is successful, as determined by decision block 1835, the resulting data may be stored for outputting in accordance with block 648 of the main program of FIG. 6A, as called for by block 1840. Alternatively, the decoded data may be output immediately and block 648 later skipped over. If the decoding attempt is not successful, however, block 1840 is skipped, and the processor is directed to decision block 1845.

If the user has elected not to use the multiple symbols option, block 1845 may direct the processor to exit the flow chart of FIG. 18, via block 1850, after any 2D symbol has been successfully decoded. Optionally, block 1845 may be arranged to direct the processor to exit the flow chart of FIG. 18 after the attempted decoding of the centermost symbol, without regard to whether or not the decoding attempt was successful.

If the user has elected to use the multiple symbols option, block 1845 will direct the processor back to block 1825 to process the next 2D symbol, i.e., the symbol whose CFR is next closest to the center of the field of view. The above described attempted decoding and storing (or outputting) steps will then be repeated, one CFR after another, until there are no more symbols which have usable finder patterns. Finally, when all symbols having usable finder patterns have been either decoded or found to be undecodable, the processor will exit the flow chart of FIG. 18, via block 1850, to return to the main program of FIG. 6A.

In view of the foregoing, it will be seen that, depending on the number of identifiable CFRs that have been found in the stored, digitized image, and on the enablement of the multiple symbols option, the 2D autodiscrimination routine shown in FIG. 18, will cause one or more 2D symbols in the image data to be either decoded or found to be undecodable before directing the processor to exit the same.

For the sake of clarity, the foregoing descriptions of the 1D and 2D phases of the 1D/2D autodiscrimination process have been described separately, without discussing the combined or overall effect of the code options and scanning-decoding options discussed earlier in connection with FIG. 7B. The overall effect of these code options and the manner in which they are implemented will now be described in connection with FIG. 20. As will be explained presently, FIG. 20 shows (with minor simplifications) the contents of block 627 of FIG. 6A. It also shows, as blocks 2009 and 2035 (again with minor simplifications), the 1D and 2D autodiscrimination routines discussed earlier in connection with FIGS. 16 and 18, respectively.

Figure 20:
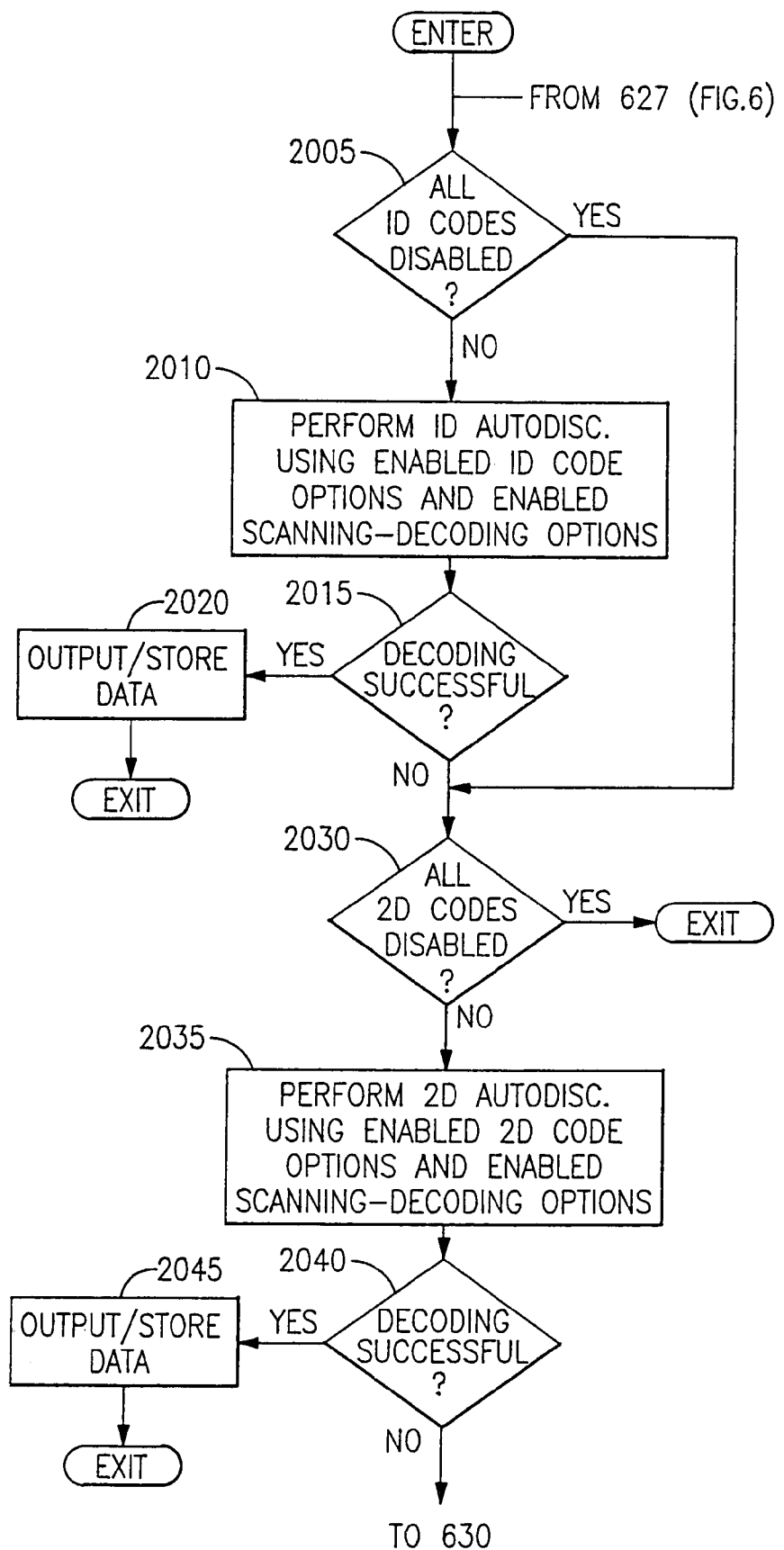
FIG. 20 is a flow chart that illustrates the effect of the code options of the autodiscrimination process.

On entering the flow chart of FIG. 20, the processor encounters a block 2005 which causes it to determine, with reference to the code options of the parameter table, whether all of the 1D codes have been disabled. If they have not, the processor continues to block 2009. In accordance with block 2009, the processor performs the 1D autodiscrimination process described in connection with FIG. 16, using the 1D code and scanning-decoding options indicated by the parameter table. Depending upon whether 1D decoding was successful, as determined by block 2015, the processor either outputs (or stores) data per block 2019 and exits, or continues on to blocks 2029 and 2035 to begin the 2D autodiscrimination process.

If all 1D codes have been disabled, the processor is directed directly to block 230, thereby skipping block 2009 in its entirety. Then, unless all 2D codes have also been disabled (per block 2029), it proceeds to block 2035 to begin the autodiscrimination process described in connection with FIG. 18, using the 2D codes and scanning-decoding options indicated by the parameter table. Depending upon whether 2D decoding was successful, as determined by block 2040, the processor either outputs (or stores) data, per block 2045, or returns to the main program of FIG. 6A. Returning to the latter then causes or does not cause further scans to be made depending on the states of blocks 635 and 640 thereof.

In view of the foregoing, it will be seen that the 1D/2D autodiscrimination process may be practiced in many different ways, depending upon the menuing options that have been chosen by the user. Among these menuing options, the code options increase the data throughput rate of the reader by assuring that the processor does not waste time trying to autodiscriminate and decode symbols which it has been told are not present, or are not of interest. The scan tracking options also increase the data throughput rate of the reader by assuring that the scanning and decoding phases of read operations both operate, to the extent possible in view of the then current decoding load and decoding options, at a 100% utilization rate. Even the multiple symbols option also increases the data throughput rate of the reader by either discontinuing the reading of symbols that are not centered and therefore not of interest or speeding up the processing of multiple symbols that are of interest. Thus, for a processor with a given performance rating and a set of decoding programs of given length, the apparatus assures a higher overall data throughput rate than has heretofore been possible.

[Excerpts from certain of the applications referenced herein above are reproduced herein below, with figure and reference numerals changed to avoid duplication.]

[The following is an excerpt from the referenced U.S. patent application Ser. No. 08/516,185, filed Aug. 18, 1995].

In accordance, there is provided an improved method and apparatus for scanning and decoding optical patterns at high data throughput rates without a corresponding reduction in read accuracy.

In prior U.S. Pat. No. 5,463,214, which is hereby expressly incorporated herein by reference, there is disclosed an embodiment in which high data throughput rates are achieved by operating the decoding circuitry of the scanner on a substantially continuous basis, i.e., at a 100% utilization rate, and by utilizing scanning circuitry that can be stopped and started substantially instantaneously as necessary to coordinate the scanning and decoding phases of the reading process. Because this embodiment is described and claimed in said prior U.S. patent, it will not be discussed in detail herein.

There are disclosed embodiments in which high data throughput rates are achieved by operating the scanning circuitry of the reader on a substantially continuous basis, i.e., at an approximately 100% utilization rate, and by utilizing decoding circuitry which operates so as to maintain a "tracking" relationship between the scanning and decoding phases of the reading process. This tracking relationship is characterized not by an inflexibly maintained lockstep synchronism between the scanning and decoding operations, but rather by a loosely maintained linkage between the decoding operation and the most recent scan data produced by the scanning operation.

Significantly, this tracking relationship between the scanning and decoding operations has been found to be compatible with the complete and accurate decoding of optically encoded patterns. This result is possible because patterns, such as 2D bar code symbols, which have a relatively high data content which often include both vertical redundancy and error checking bits which make it possible for the symbol to be fully decoded even if part of that symbol is skipped or unreadable. This property is utilized by skipping over those blocks or emits of scan data which, though complete, have been superseded by a more recent block of scan data. Stated differently, although the loose tracking used may result in some loss of scan data, that loss takes place in favor of more current scan data which, even if incomplete, permits a symbol to be fully decoded.

In a first embodiment, both the scanning and decoding phases of the reading process proceed without interruption. In embodiments of this type a relatively large number of blocks of scan data are stored in and/or shifted through a relatively large memory space. As this occurs, address information (e.g. address pointers) which is indicative of the beginnings and endings of the scan blocks are updated, substantially in real time, so that the reader can at all times keep "track" of which block of scan data is the most recently completed block. Then, as each decoding cycle is completed, it is immediately followed by another decoding cycle which begins at the beginning of the most recently completed block of scan data, skipping over any then older blocks of scan data. In this way, both the scanning and decoding operations take place at a substantially 100% utilization rate, thereby assuring a high data throughput rate.

In a second embodiment, the scanning and decoding phases of the reading process preferably (but not necessarily) proceed without interruption. In embodiments of this type blocks of scan data are stored in two or more sequentially selected memory spaces, having a predetermined size, scan data for each newly begun scan being written over the scan data in the memory space with the then oldest complete block of scan data. As this occurs, the memory space with the then most current block of scan data may be identified using an address pointer which directs the reader to one of the known scan data starting addresses.

Either of the two above-described embodiments may be practiced using either a 1D image sensor or a 2D image sensor, such as an image sensor of the charge coupled or CCD type. In the case of bar code symbols, this is true whether the bar code symbols are 1D symbols or 2D symbols. This does not, however, mean that embodiments which use 1D image sensors have the same memory requirements as those which use 2D image sensors.

In the case of embodiments which use a 2D image sensor, both 1D and 2D bar code symbols may be captured and stored in a single step, full frame imaging operation while the sensor is held stationary with respect to the symbol. A method and apparatus for capturing and storing 1D and 2D bar code symbols in this manner is shown and described in commonly assigned copending U.S. patent application entitled "Optical Reader Having Improved Interactive Image Sensing and Control Circuitry", Ser. No. 08/441,447, filed May 15, 1995. With embodiments of this type, the memory requirements are relatively large.

In the preferred embodiments, the beginnings and endings of each block of scan data are fixed with a high degree of precision by using interrupt signals such as start and/or end of scan signals which are derived directly or indirectly from the timing signals that control the imaging activity of the image sensors. Because these timing signals are ultimately derived from a highly stable source, such as a crystal oscillator, and are synchronized with the imaging activity of the image sensor, they allow blocks of scan data to be easily and accurately located. In addition, since scanning takes place without interruption (except when the scanning function is not called for), a single interrupt signal may be used to locate both the end of one block of scan data and the beginning of the next. As a result, the reader not only accurately locates each individual block of scan data, it also accurately locates the boundaries between adjacent blocks of scan data.

Figure 21:
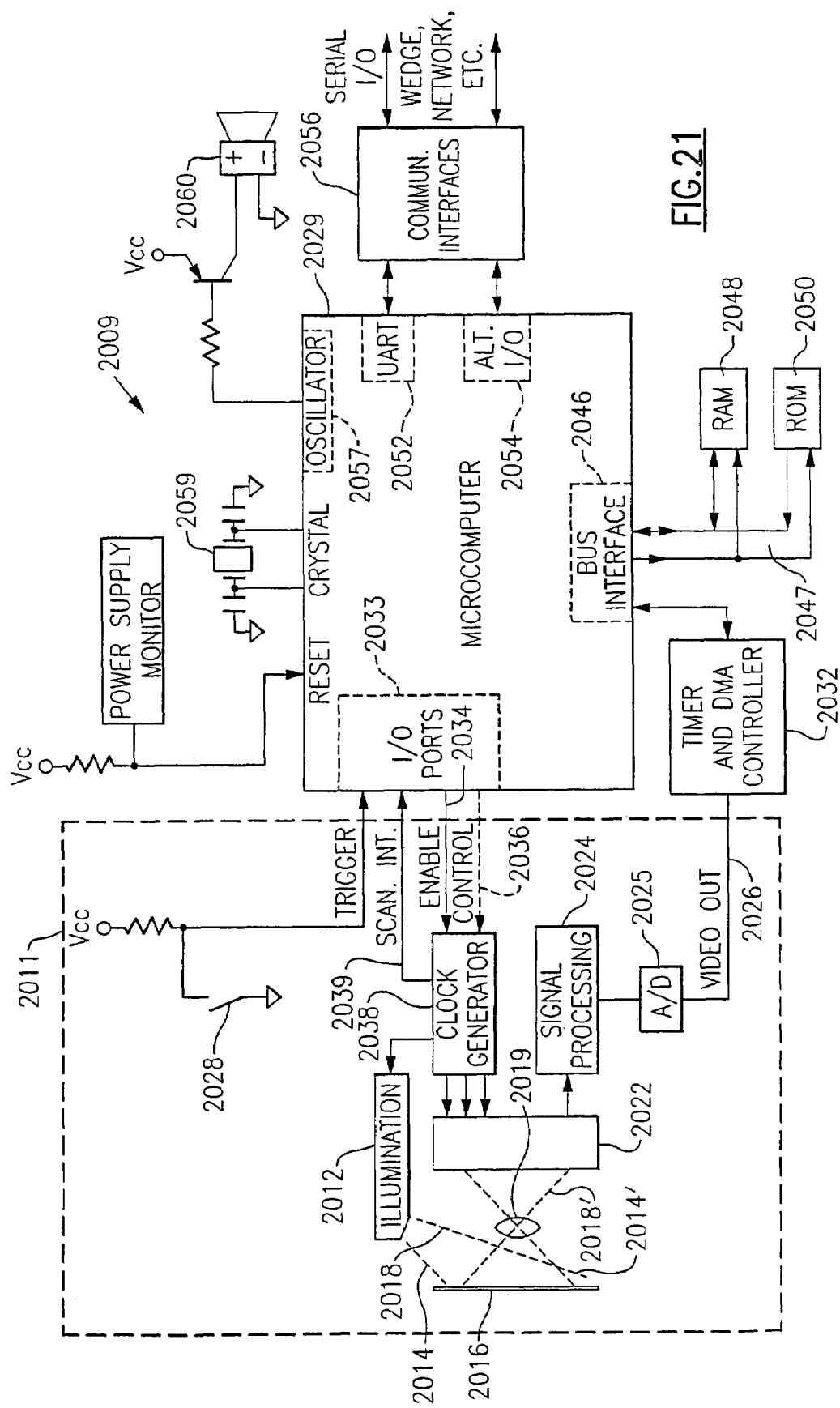
FIG. 21 is a schematic-block diagram of a first embodiment of a reader.

Referring to FIG. 21, there is shown a block diagram of one embodiment of an optical reader 10 suitable for use. Reader 2009 includes a scanning section 2011, which is enclosed by dotted lines at the left side of FIG. 21. Scanning section 2011 includes an illuminator 2012, such as an LED array, a laser, or the like, which produces a light beam represented by outer defining rays 2014, 2014'. The beam strikes a target 2016 on which are found visible indicia, such as 1D or 2D bar code symbols or OCR characters. This light beam is reflected through optics 2019, the reflected beam being shown representatively as rays 2018, 2018'. Optics 2019 projects an image of the indicia onto an image sensor 2022 which, in the embodiment of FIG. 21, preferably comprises a 1D CCD type image sensor. Analog signals developed by image sensor 2022 in response to light incident thereon are received and processed by a signal processing circuit 2024 and an analog to digital converter 2025 to produce a digitized video output signal on an output conductor 2026.

Reader 2009 also includes scanning control and decoding circuitry which preferably comprises a programmed microcomputer 2029 together with a DMA controller 2032. In operation, microcomputer 2029 controls the operation of scanning section 2011 and decodes the data produced thereby in accordance with a program stored in a ROM 2050. DMA controller 2032 assists microcomputer 2029 by taking over there from the task of receiving digitized video data produced by scanning section 2011 and directing this data through a bus interface 2046 and a bus 2047 to a RAM 2048. DMA controller 2032 may also include circuitry which performs a variety of other support and housekeeping functions for microcomputer 2029 and in this way allows the latter to devote more time to decoding activities and thereby increase the data throughput rate for the reader as a whole. If desired, these functions may be integrated into a single application specific integrated circuit (ASIC). One example of an ASIC of this type is commercially available from Welch Allyn, Inc., Skaneateles Falls, N.Y. under the part number designation 21203276-01.

Operation of scanning section 2011 is controlled by a trigger 2028, which can be a manual trigger, or an automatic trigger that responds to the presence of indicia. Trigger 2028 is coupled to microcomputer 2029 via an I/O port section 2033. Microcomputer 2029 outputs a scan enable signal on a line 2034 responsive to the trigger 2028 to turn on scanning section 2011 and begin scanning target symbol 2016. Control signals are output on a line 2036 to control clock generator 2038 which in turn provide suitable enabling signals for illuminator 2012 and clock signals 2042 for image sensor 2022 as required for the proper operation thereof. Clock generator 2038, is also arranged to generate a scan interrupt (or end of scan) signal which is applied as an input to I/O port 2033 via conductor 2039 to provide microcomputer 2029 with information that indicates the times at which each block of scan data ends.

Microcomputer 2029 may also be provided with a UART 2052 and an auxiliary I/O port section 2054 for connecting communications devices (not shown) to the reader. Representative of such devices are a keyboard when the scanner is employed in a wedge configuration, a telecommunications network, and other devices as may be required for a given application of the system.

Figure 22:
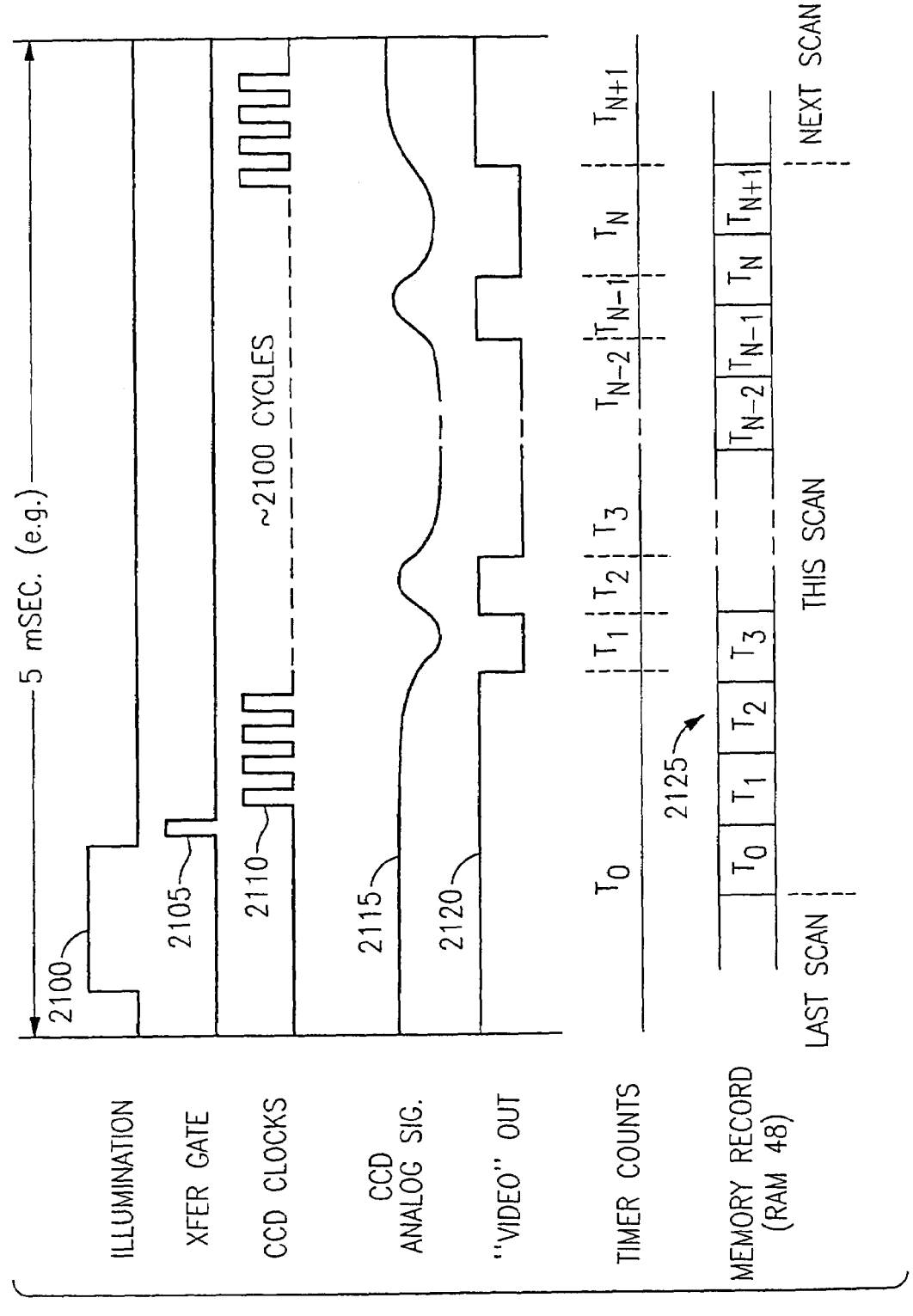
FIG. 22 shows a representative CCD scan cycle.

A typical scan cycle for the reader of FIG. 21 (a linear scanning device) is shown in FIG. 22. During the time period of the scan (5 msec is used in the figure, although this can vary) the cycle begins with illumination pulse 2100 during which the target is illuminated. The target may contain bar code or any other indicia which is amenable to scanning and decoding. During the illumination pulse 2100, photosensors in image sensor 2022 receive a linear image of the target and convert that image to an electrical representation thereof. This electrical representation is then transferred via a transfer gate 2105 to an analog shift register and clocked with pulses 2110 to shift the image out as an analog signal 2115. Analog signal 2115 is then transformed into a digitized video output signal 2120 by an A/D converter 2025 and output over a line 2026. Video signal 2120 is a digitized representation of whatever high contrast elements were observed during illumination pulse 2100. The time between successive leading and trailing edges of the video out signal 2120 is then timed using the microprocessor clock counts as a time reference, to produce a timercount representation 2125 of the result of the scan. This timercount representation is preferably produced by timer circuitry, included with DMA controller 2032, which then controls the storage of the resulting timercount representation in RAM 2048, while concurrently the microprocessor may be undertaking other operations including the decoding of prior scan data.

Figure 21A:
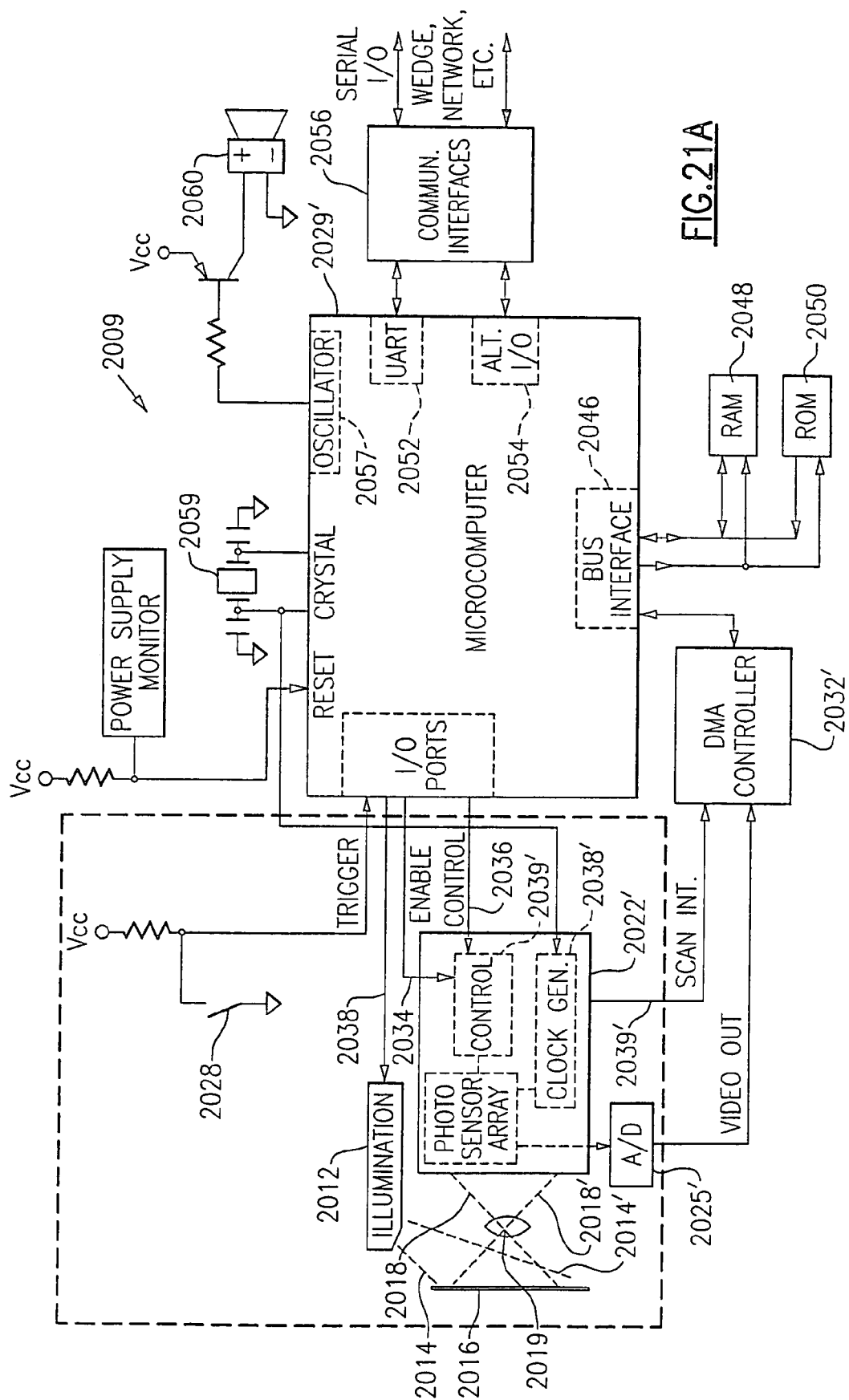
FIG. 21A is a schematic-block diagram of a second embodiment of a reader.

Referring to FIG. 21A there is shown a second embodiment 2009' of a reader suitable for use. Reader 2009' of FIG. 21A is generally similar to reader 2009 of FIG. 21, except that it has a scanning section 2011' which includes a 2D image sensor 2022' that processes indicia, such as 2D bar codes symbols, on a full frame rather than line-by-line basis, and a microcomputer 2029' that is programmed to control sensor 2022' and decode output signals produced thereby. Because 2D image sensors have many more pixels than a 1D image sensor, the reader of FIG. 21A will be understood to operate with higher clock rates and to use microcomputers and memory structures that are somewhat different from their counterparts in the reader of FIG. 21. These differences are differences of degree rather than of kind, however, and do not involve broader aspects, as will be made clear later in connection with FIGS. 24A–24D.

Unlike currently available 1D image sensors, some 2D image sensors include much of the control and clock generating circuitry necessary to control their operation. In the reader of FIG. 21A this fact is reflected by the showing of clock generator circuitry 2038' within the outlines of image sensor 2022'. Similarly, image sensor 2022' of FIG. 21A is shown as including on-chip control circuitry 2039' for generating control signals which in the case of the embodiment of FIG. 21 are supplied by microcomputer 2029. These differences between the readers of FIGS. 21 and 21A will be understood to reflect different manufacturer selected groupings of known imaging control circuitry and not to be material to the practice of the present feature.

Because 2D image sensors produce video output signals that include data for a number of different horizontal rows of the symbols imaged thereby, and are designed to be used without regard to the orientation of the symbol with respect thereto, their outputs are more usefully processed and stored as bit mapped or bit image representations of symbols than as timercount representations thereof. As a result, DMA controller 2032' of the embodiment of FIG. 21A need not include timer circuitry of the type included in DMA controller 2032 of the embodiment of FIG. 21. On the other hand, DMA controller 2032' of the embodiment of FIG. 21A preferably does include circuitry for receiving the "end of frame" signal produced by 2D image sensor 2022' and using it as a scan interrupt signal without involving microcomputer 2029'. As in the case of DMA controller 2032, DMA controller 2032' and the associated scanning control circuitry may be integrated into a single ASIC. In both embodiments, however, the DMA controller is designed to receive and process image data of the type produced by the image sensor with which it is used and to control the storage of that image data in the form and in the quantity best suited to the decoding activity of the microcomputer with which it is used. Thus, while DMA controllers 2032 and 2032' differ in the specifics of their design, they operate in generally the same way to receive and store image data for decoding by the associated microcomputer with minimal involvement by that microcomputer.

With the embodiment of FIG. 22 the stored scan data is a timercount representation of a 1D image of the indicia of interest, as shown in FIG. 22. Because the number of memory locations necessary to store this scan data is dependent upon the number of data transitions in the scan, the length of a complete block of scan data will vary from scan to scan. With the embodiment of FIG. 21A, however, stored scan data is the bit mapped or bit representation of the indicia of interest. Because the number of memory locations necessary to store this scan data depends only on the number of pixels in the 2D image sensor, the length of a complete block of scan data will be the same for each scan.

Figure 23A:
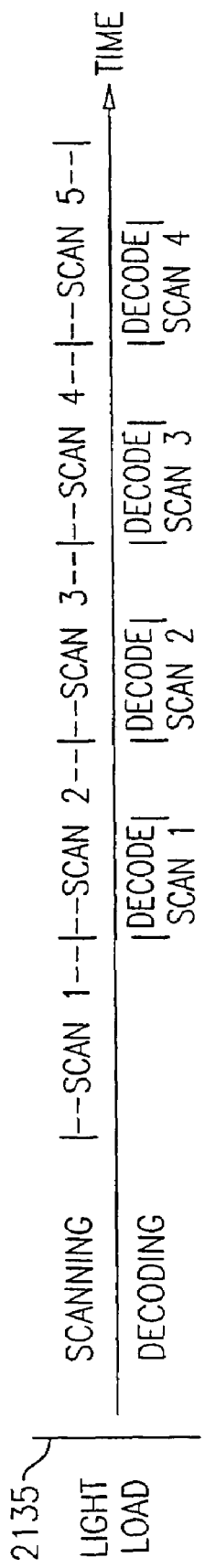
FIGS. 23A and 23B show timing diagrams illustrating the scanning and decoding operations of a typical prior art optical reader under light and heavy decoding loads, respectively.

In order to avoid unnecessary repetition, the terms "scan" and "block of scan data" as used herein will be understood to refer to both of the above-described types of scans generically where the context permits, or non-generically to one or the other of these types of scans where the context indicates that only one or the other is being referred to. For example, the descriptions of FIGS. 23 and 24 which follow are framed in generic terms and will be understood to apply to embodiments which use either 1D or 2D image sensors. The descriptions of FIGS. 25–29, on the other hand, will be framed in embodiment-specific terms, except where otherwise indicated.

Scanning of indicia can take place under either of two generalized conditions, depending upon the decoding load presented by the indicia. Under light decoding loads, shown in FIG. 23A for a prior art reader, the amount of data to be decoded is relatively small, allowing scan data from a complete scan to be decoded in a time which is less than the duration of a scan. Under this condition, the result of each scan is decoded before the completion of the following scan, and no problems arise as a result of any mismatch between the scan time and the decode time of the reader. The prior art and the instant reader perform equally well under such light decoding loads as will be seen later from FIG. 24.

Figure 23B:
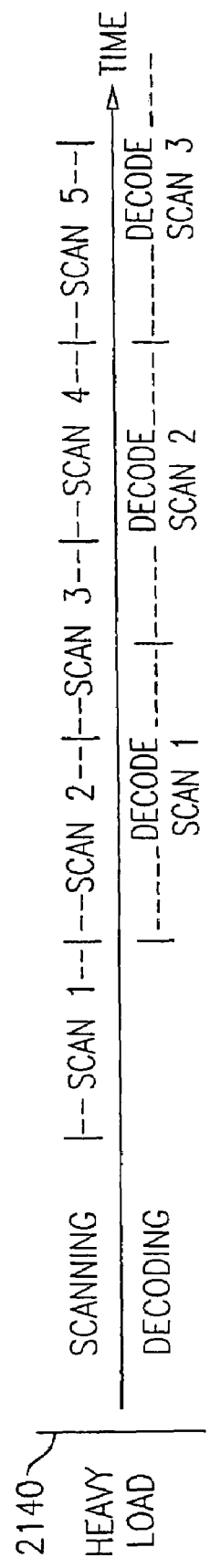
Figure 25:
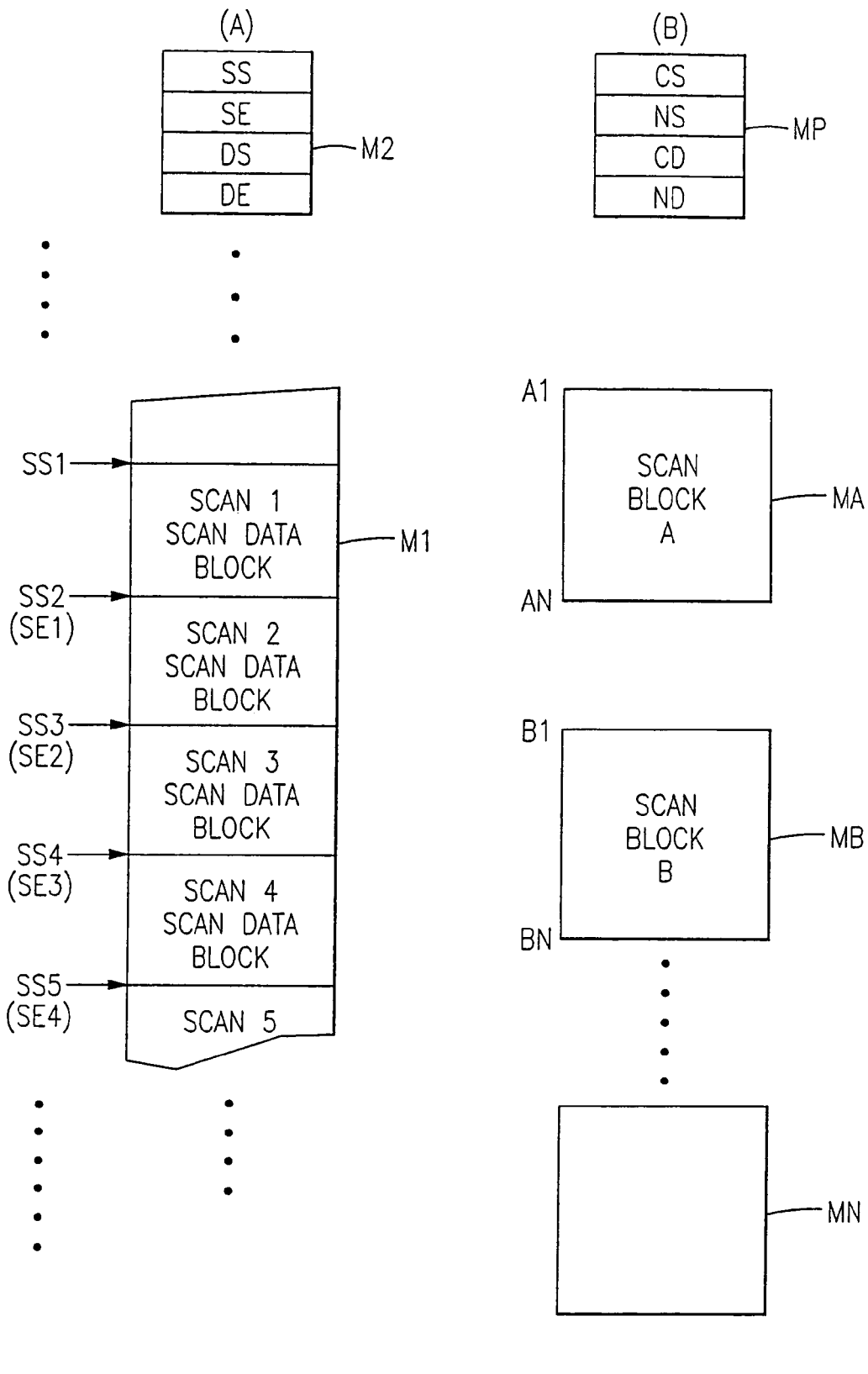
FIGS. 25A and 25B show memory and memory pointer structures which are suitable for use with the embodiments of FIGS. 21 and 21A, respectively.

Under heavy decoding loads, however, prior art methods do not allow sufficient time for decoding. Thus, as shown in FIG. 23B, when a first scan Scan 1 is completed, a second scan Scan 2 is initiated immediately. Scan 2 is then followed by Scan 3 while the decoding of Scan 1 is still in progress. As this situation continues, the decoding process will be seen to fall further and further behind the scanning process until, at some point, the data memory becomes filled. When this occurs new scan data will overwrite old scan data which was not processed, thereby causing a loss of large blocks of scan data.

In the embodiment disclosed in prior U.S. Pat. No. 5,463,214, this problem is solved by modifying the reader in a way that allows the scanning process to be suspended and restarted as required to prevent the decoding process from falling so far behind the scanning process that data overflows the memory and is lost. This solution to the problem may be understood with reference to FIGS. 24A and 24B. Referring to FIG. 24A, there is shown the operation of the subject embodiment under light decoding loads. It will be noted that, under this condition, the relationship between scanning and decoding is the same as that shown in FIG. 23A.

FIG. 24B shows the relationship which exists between the scanning and decoding processes when the subject embodiment is used under heavy decoding loads. As shown in FIG. 24B, the suspension of the scanning process continues until the results of the prior scan have been decoded. This prevents the decoding process from falling more than a small amount of time behind the scanning process. As a result, there cannot arise a situation, such as that which can arise with the prior art, in which there is a massive loss of scan data. Because this embodiment is described in detail in the last-mentioned copending application, it will not be described in detail herein.

Referring to FIG. 24C there is shown the tracking relationship which exists between the scanning and decoding operations when these operations are controlled in accordance with a first embodiment. With this embodiment, under heavy decoding loads, decoding proceeds without interruption so long as the scanning function is called for. As shown in FIG. 24C, each decoding operation begins immediately after the preceding decoding operation ends, and proceeds on the basis of the scan data from the then most current complete block of scan data.

More particularly, FIG. 24C illustrates one possible scenario in which decoding of Scan 1 data is immediately followed by the decoding of Scan 2 data. This occurs because Scan 3 data is incomplete at the time that the second decoding operation begins. The decoding of Scan 2 data, however, is immediately followed by the decoding of Scan 5 data. This occurs because Scan 5 data represents the then most current complete block of scan data. While the results of scans 3 and 4 are therefore unused and skipped over, the data lost by their non-use is provided by more current scan data or, if decoding is unsuccessful, by the results of a later scan. Any occasional decoding failure that results from the skipping of relatively old blocks of scan data is in any case more than offset by the avoidance of the large scale data losses discussed in connection with FIG. 23B.

Referring to FIG. 24D there is shown the tracking relationship which exists between the scanning and decoding operations when these operations are controlled in accordance with an embodiment which includes two and only two scan data memory spaces A and B. With this embodiment decoding does not proceed without interruption. As shown in FIG. 24D, each decoding operation begins at the beginning of a block of scan data. In the event that the end of a decoding operation does not coincide with the beginning of such a block, i.e., occurs while a scanning operation is still in progress, the beginning of the next decoding operation will be delayed until the scanning operation that is then in progress is completed, and then proceeds with reference to the block of scan data which is produced by that scanning operation.

More particularly, FIG. 24D shows that the decoding of Scan 1 data is completed while Scan 3 is still in progress, overwriting data for Scan 2. Under this condition, decoding is discontinued for a lime period $T_{s1}$ that is equal to the time necessary for Scan 3 to be completed. At the end of time period $T_{S1}$, decoding resumes with the then most current block of scan data, namely: the scan data produced during Scan 3. Thus, like the embodiment whose operation is illustrated FIG. 24C, the embodiment whose operation is illustrated in FIG. 24D begins its decoding operation with the then most current complete block of scan data.

Referring to FIG. 24E there is shown the tracking relationship which exists between the scanning and decoding operations when these operations are controlled in accordance with an embodiment which includes three scan data memory spaces A, B and C. With this embodiment decoding proceeds without interruption so long as the scanning function is called for. As shown in FIG. 24E, each decoding operation begins immediately after the preceding decoding operation ends, and proceeds on the basis of scan data from the memory which contains the then most current complete block of scan data.

More particularly, FIG. 24E shows that the decoding of Scan 1 is completed while Scan 3 is still being acquired. Under this condition, with three memory spaces available, decoding is immediately undertaken on the most recent complete Scan (Scan 2) which is contained in memory space B. Upon the completion of the decoding of Scan 2, decoding is commenced on Scan 4 which is contained in memory space A. Thus, the utilization of three memory spaces allows the decoding portion to be occupied one hundred percent of the time.

The embodiment illustrated in FIG. 24C is best suited for use with readers having memories and addressing procedures which can accommodate large numbers of relatively short blocks of scan data having sizes that are not known in advance. Applications of this type typically include readers, such as that shown in FIG. 21, which use 1D image sensors.

The embodiments illustrated in FIGS. 24D and 24E, on the other hand, are best suited for use with readers having memories and addressing procedures which can accommodate small numbers of relatively long blocks of scan data of fixed length. Applications of these types typically include readers, such as that shown in FIG. 21A, which use 2D image sensors. With the embodiment illustrated in FIG. 24D, only two scan data memory spaces are used and decoding is discontinuous. With the embodiment illustrated in FIG. 24E three scan data memory spaces are used and decoding is continuous. As will be explained more fully later, more than three scan data memory spaces can be used if additional decoding resources are made available. Each one of these different embodiments which is used in a particular application is a design choice which is based on economic considerations.

The fact that some embodiments use 1D image sensors while others use 2D image sensors should not be taken to mean that embodiments which use 1D image sensors can only read 1D symbols or that embodiments which use 2D image sensors can only read 2D symbols. This is because techniques exist for using either type of image sensor to read both 1D and 2D symbols. It will therefore be understood that the present reader is not restricted to use with any one type of image sensor or to any one type of bar code or other optically encoded symbol.

Referring to FIG. 25A, there is shown a memory space M1 suitable for use in storing blocks of scan data of the type produced by the reader of FIG. 21, together with a pointer or tracking memory M2 suitable for use in storing address or pointer information that makes it possible for the reader to identify the beginning and end point of a block of interest. As shown in FIG. 25A, the block of scan data produced during a first scan of the target is stored in memory M1 beginning at address SS1 (Scan Start for Scan 1) and ending at address SE1 (Scan End for Scan 1). Similarly, the block of scan data resulting from a second scan of the target is stored between addresses SS2 and SE2, and so on. Because scanning takes place continuously, the end of one scan block (e.g. SE1) coincides with the beginning of the next scan block (e.g., SS2). The sizes (in memory space) of these blocks will ordinarily vary from block to block, depending on the number of data transitions in each 1D scan of the target. The boundaries between blocks will, however, be fixed by the occurrence times of the Scan Interrupt signals which are generated by the image sensor or its clock generating circuitry.

As will be explained more fully in connection with the flow charts of FIGS. 26 and 27, locations SS and SE of memory M2 are updated in the course of a series of scans so that they always identify or otherwise point to the address of the beginning and ending of the most recently produced complete block of scan data. As a result, when the decoding circuitry is ready to decode the most recently produced complete block of scan data, it need only refer to locations SS and SE to obtain information as to where to begin and end decoding. Before decoding begins, the contents of locations SS and SE are written into locations DS (Decode Start) and DE (Decode End) so that locations SS and SE can continue to be updated while decoding proceeds on the basis of the contents of locations DS and DE. In the preferred embodiment, the decoding circuitry is programmed to mark these beginning addresses as "invalid" (for example, by changing its sign) after it is acquired. Since the decoding processor is programmed to decode only "valid" data, this assures that it can decode a single block of scan data only once.

Referring to FIG. 25B there are shown a plurality of memory spaces MA, MB . . . MN suitable for use in storing blocks of scan data of the type produced by the reader of FIG. 21A, together with a pointer or tracking memory MP suitable for use in storing address or pointer information for identifying the memory spaces to be used for entering new scan data, decoding, etc. Since the amount of scan data in each block of scan data is known in advance, being the same for each scan, the starting and ending addresses for each memory space (e.g., $A_1$ and $B_1$ and $A_N$ and $B_N$; etc.) will also be the same for each scan. As a result, the memory to be used for storing new scan data, decoding etc. may be specified by specifying just a few bits stored in memory MP. Location CS, for example, may be used as a pointer which identifies the memory where the current scan is being stored, and location NS may be used as a pointer which identifies where the next scanned image is to be stored.

Similarly, location CD may be used as a pointer which identifies the memory space where the current decode is being undertaken. Finally, location ND may be used as a pointer which identifies where the next available image is for decoding purposes.

Under ordinary circumstances, three scan data memory spaces will be sufficient to keep the decoding activity of the reader fully occupied and current. This is because the tracking method allows the skipping over of old blocks of scan data as necessary for the decoder to remain occupied and current. If the decoding load becomes extremely heavy, however, it is possible that more old blocks of scan data are skipped over than is advisable. In such instances, it may be desirable to increase the number of memory spaces from 3 to N, where N may be 4 or even more, and to use more than one decoding circuit. If such an increased number of memories and decoders is used, blocks of scan data may be distributed among the memories according to a simple sequential rule and kept track of by increasing the number of bits in the pointers of memory space MP. In addition the decoding circuits may be assigned to the then most current complete block of scan data as they become free. It will be understood that all such numbers of memory spaces and decoding circuits and the associated tracking procedure are within contemplation.

The manner in which the circuits of FIGS. 21 and 21A are used with the memory structures of FIGS. 25A and 25B, respectively, to produce the tracking relationships shown in FIGS. 24C, 24D and 24E, respectively, will now be described with reference to the flow charts of FIGS. 26, 27, 28 and 29, respectively.

Figure 26:
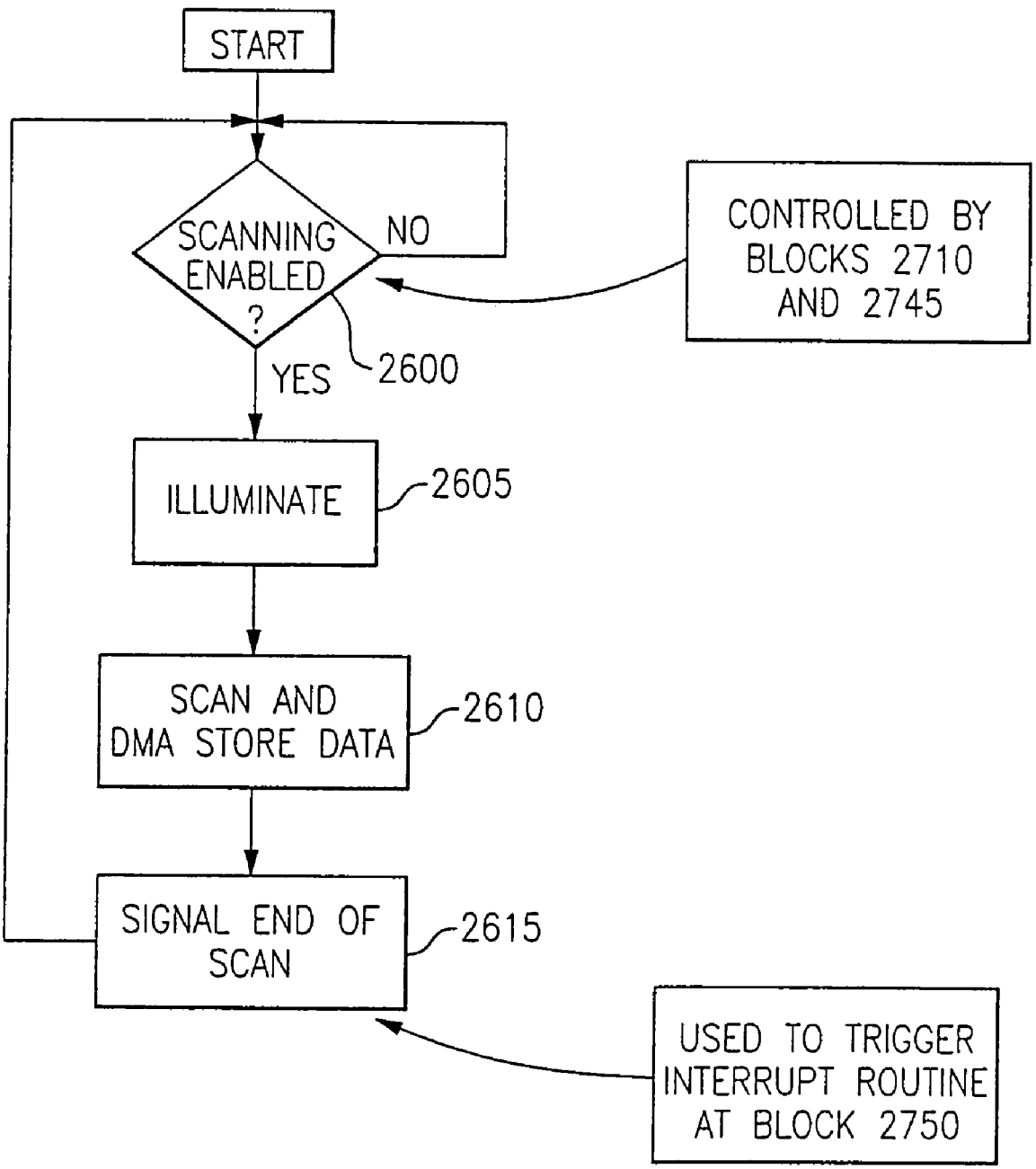
FIGS. 26 and 27 are flow charts illustrating the scanning and decoding phases, respectively, of a first embodiment.
Figure 27:
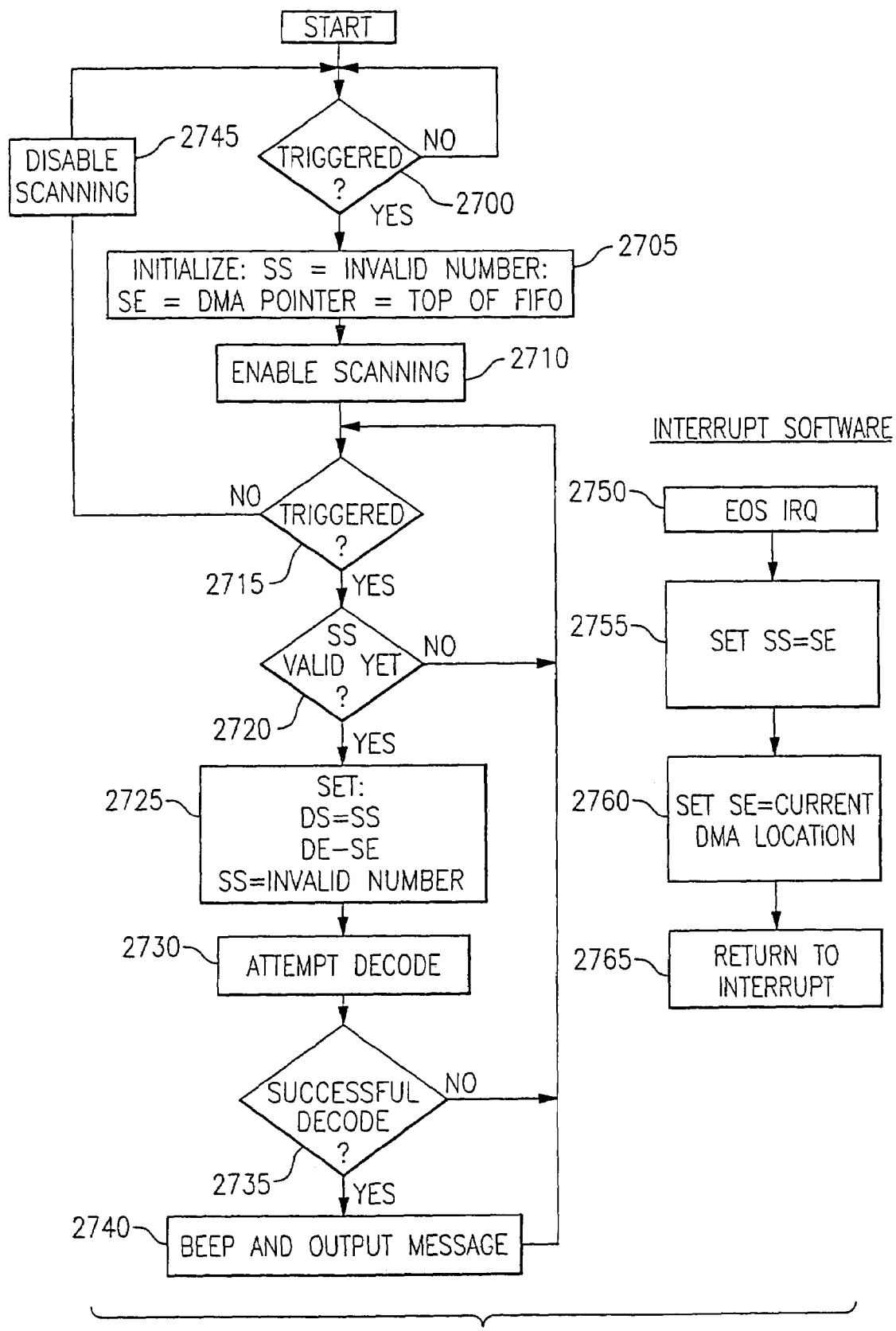

Referring to FIGS. 26 and 27, there are shown flow charts which illustrate the scanning and decoding operations used by the embodiment of FIG. 21. These processes are made up of a hardware component which operates independently and simultaneously with the Microprocessor to acquire images while the Microprocessor is decoding prior images. Secondly, a software interrupt routine is triggered by the scanning hardware which maintains the loose linkage between the hardware and the software of the present embodiment. Turning first to the scanning process shown in FIG. 26, this process begins with block 2600, which causes the scanning hardware to test for whether scanning is enabled by the Microprocessor at Blocks 2710 and 2745. If not, the reader cycles through block 2600 and waits. When scanning is enabled, the hardware operation proceeds to block 2605 which illuminates the bar code symbol. After exiting block 2605, the operation is directed to block 2610 where the operation scans the 1D CCD who's output is stored by the DMA into a memory space. After exiting block 2610, the operation at block 2615 causes a signal which indicates that a scan has been completed. Upon completion, the scanning operation loops back to the beginning of the scanning operation at block 2600 to acquire more scans unless disabled by the Microprocessor.

Referring to FIG. 27 when the End of Scan Interrupt signal is captured in the Microprocessor at block 2750, the Microprocessor halts whatever it was doing. At block 2755, the address associated with the end of the previously completed block of scan data is set into scan start pointer SS; this address is the memory address corresponding to the occurrence of the scan interrupt signal at the start of the most recent scan. It also causes the current address contained in the DMA pointer to be set into scan end pointer SE at block 2760; this address is the memory address corresponding to the occurrence of the scan interrupt signal at the end of the most recent scan. This leaves both of the pointers SS and SE with valid addresses which bracket the most recent scan. This data is thus immediately available for decoding in accordance with the decoding operations shown in the flow chart of FIG. 27. At this point after block 2760, the Microprocessor's operation returns from the End of Scan Interrupt at block 2765 and resumes what it was previously doing. It is this interrupt routine in conjunction with block 2705 and block 2725 of the decoding process which manipulate the memory pointers and embody the loose linkage between the scanning hardware and the decoding routine undertaken by the Microprocessor.

Such decoding routine is used to decode scan data produced by the above described scanning process and will now be described with reference to the flow chart of FIG. 27. Decoding begins with block 2700 when the processor waits until scanning is called for by, for example, the pulling of trigger 2028. When scanning is called for, the processor at block 2705 initializes the SS pointer to an invalid number and sets the SE pointer equal to the DMA pointer which is equal to the beginning address of the top of the first in-first out memory space. After the initialization is completed, the processor at block 2710 enables the scanning hardware at block 2600 to proceed with acquiring scans. At block 2715, the processor again checks to see if scanning is still called for in order to prevent an unnecessary decode cycle. If not, the processor proceeds to block 2745 and disables the scanning hardware. When scanning is enabled, the processor at block 2720 examines pointer SS to see if it contains a valid address, i.e. to see if there is a block of scan data which is ready to be decoded. When SS pointer is valid, the processor proceeds to block 2725 which causes it to set decoding start and end pointers DS and DE to the addresses contained in SS and SE pointers, respectively, which identify the memory space location of the most recent scan data. The processor then sets pointer SS to an invalid value to assure that it does not decode that block of scan data more than once.

Once the processor has completed the above-described steps, it proceeds with decoding, as called for by block 2730. If decoding is successful (block 2735), the decoded message is output, as called for by block 2740, and, if scanning is still being called for by block 22715, the processor proceeds to block 2720 to commence another decode cycle. If decoding was not successful, no message is output and the processor is looped back to block 2715 to see if scanning is still being called for. Since, as explained earlier, scanning takes less time than decoding under heavy decoding loads, there will ordinarily be no operating condition under which the decoder must wait for further valid data. Thus, the operation depicted in the flow charts of FIGS. 26 and 27 results in the desired continuous decoding action.

While, for the sake of clarity, the flow charts of FIGS. 26 and 27 illustrate the scanning and decoding operations as proceeding separately and virtually independently, these operations will ordinarily proceed simultaneously (i.e., in parallel) with the scanning operation being undertaken and controlled by hardwired scanning circuitry associated with DMA controller 2032 and the enabling of the scanning hardware and decoding operation being undertaken and controlled by microcomputer 2029. This is because paralleling of the two operations in this way allows the reader to use its processing resources more efficiently and to use less total program memory space. Because the programming techniques necessary to perform the scanning and decoding operations on a parallel basis are well known to those skilled in the art they will not be described in detail herein.

Figure 28:
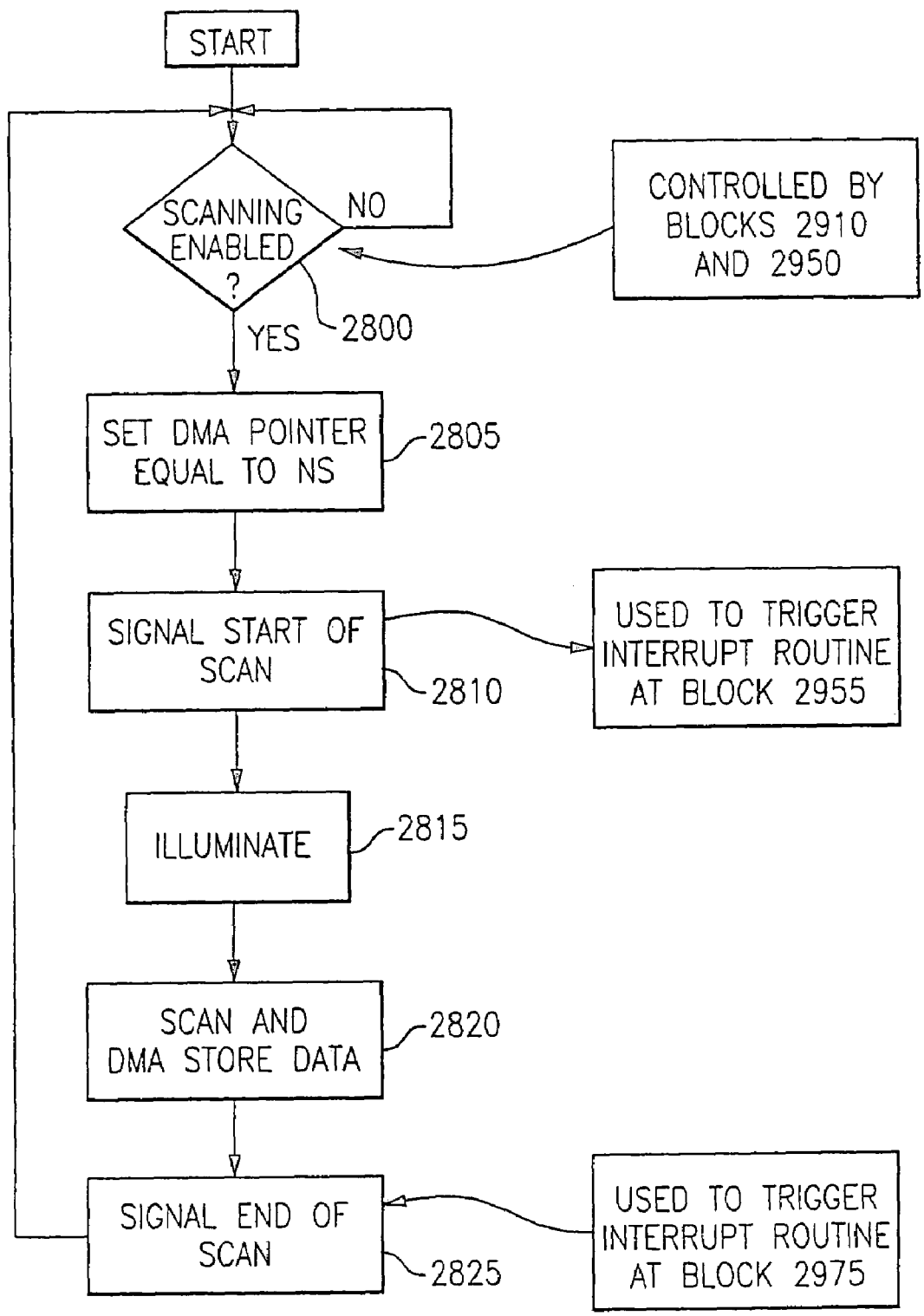
FIGS. 28 and 29 are flow charts illustrating the scanning and decoding phases, respectively, of a second embodiment.
Figure 29:
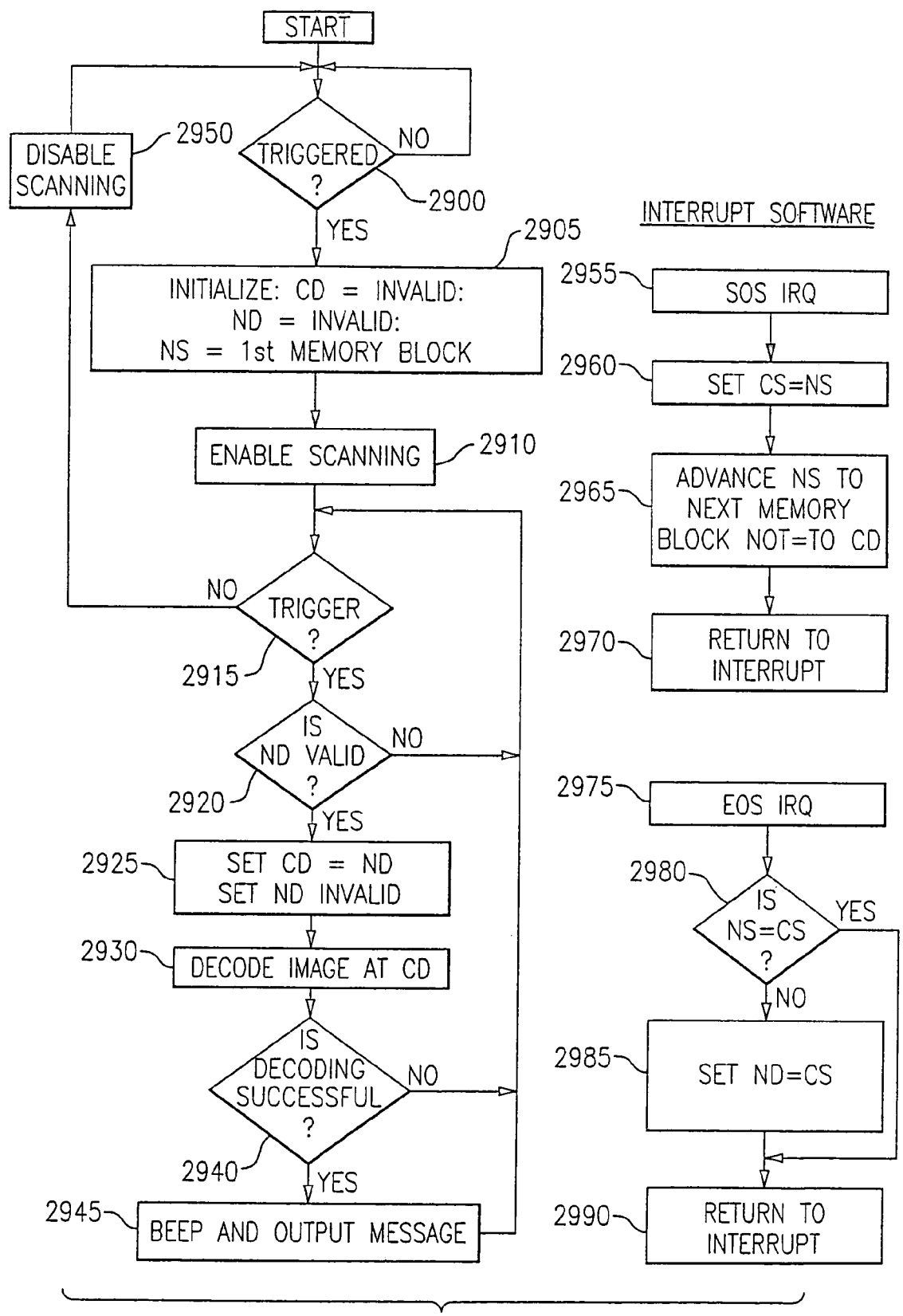

Referring to FIGS. 28 and 29, there are shown flow charts which illustrate the scanning and decoding operations preferably used by the embodiment of FIG. 21A. These processes are made up of a hardware component which operates independently and simultaneously with the Microprocessor to acquire images while the Microprocessor is decoding prior images. Secondly, software interrupt routines are triggered by the scanning hardware to maintain the loose linkage between the hardware and the software of the present embodiment. Turning first to the scanning process shown in FIG. 28, this process begins with block 2800, which causes the scanning hardware to test for whether scanning is enabled by the Microprocessor at Blocks 2910 and 2950. If not, the reader cycles through block 2800 and waits. When scanning is enabled, the DMA pointer is loaded with a value from the next scan pointer NS which points to the start address of the memory space where the next scan data block will be stored.

The scanning hardware at block 2810 causes a signal, Start of Scan Interrupt, which indicates that a scan is commencing and which is captured by the Microprocessor. The scanning hardware then proceeds to block 2810 to illuminate the image. Next, the scanning hardware at block 2820 scans the image sensor and stores its contents in the memory space pointed to by NS. After exiting block 2820, the hardware causes a signal, End of Scan Interrupt, which indicates that a scan has been completed and which is captured by the Microprocessor. After block 2825, the scanning operation loops back to the beginning of the scanning operation at block 2800 and proceeds to acquire more images unless disabled by the Microprocessor.

Referring to FIG. 29 when the Start of Scan Interrupt is captured in the Microprocessor at block 2955, the Microprocessor halts whatever it is doing. At block 2960, the current scan CS pointer is set equal to NS. Pointer CS will now point to the memory space which will contain the most recently completed scan. The interrupt routine then proceeds to block 2965 where NS is advanced to the next memory space which is not equal to current decode CD pointer which points to the start address of the memory space where the current decoding is to occur. Pointer NS will now point to a memory space where the next scanned image can be stored. At this point after block 2965, the Microprocessor operation returns from the Start of Scan Interrupt at block 2970 and resumes what it was previously doing.

Again referring to FIG. 29 when the End of Scan Interrupt is captured in the Microprocessor at block 2975, the Microprocessor halts whatever it is doing. At block 2980, the processor checks to see if NS is equal to CS. If NS is equal to CS, then the Microprocessor resumes what it was doing without setting next decode ND pointer to a valid value. If NS is not equal to CS, ND is set equal to CS at block 2985 so the decode routine will have a valid ND pointer and know the memory space which contains the next image to be decoded. At this point after block 2985, the Microprocessor operation returns from the End of Scan Interrupt at block 2970 and resumes what it was previously doing.

It is the above interrupt routines in conjunction with blocks 2905, 2925 and 2935 of the decoding process which manipulate the memory pointers to inform the decoding routine of the most recent image to decode and embody the loose linkage between the scanning hardware and the decoding routine undertaken by the Microprocessor. These interrupt and memory pointer routines are independent of any memory constraints such that they work equally well with two, three or more memory spaces. Simultaneously and independent of these above functions, the processor undertakes the decoding of the most recent block of scan data.

Referring now to FIG. 29, there will now be described a decoding process suitable for use with the embodiment of FIG. 21A. The processor begins the decoding routine at block 2900 where the processor waits until scanning is called for by, for example, the pulling of trigger 2028. When scanning is called for, the processor at block 2905 initializes CD to be marked as invalid to prevent decoding from being attempted before a usable image becomes available. Block 2905 also sets ND pointer to invalid and NS pointer equal to the first memory space in which the next image is to be stored.

After setting the various pointers, the processor at block 2910 enables the scanning hardware at block 2800 to proceed with acquiring images. At block 2915, the processor again checks to see if scanning is still called for. If not, the processor proceeds to block 2950 and disables the scanning hardware. When scanning is enabled, the processor waits at block 2920 and examines ND to see if it contains a valid address, i.e., to see if there is an image which is ready to be decoded. This wait interval may correspond to time intervals $T_{s0}$, $T_{s1}$, etc. in FIG. 24D. Once a memory space contains a complete image, the processor at block 2925 sets CD pointer equal to ND pointer, thereby informing the decode routine of the memory space location of the most recent image available. The processor at block 2930 decodes the image in the memory space pointed to by CD pointer. At the same time, ND is set to an invalid value to prevent the image in the memory space pointed to by ND from being decoded more than once. Once the decode of the image pointed to by CD is complete, the processor sets NS equal to CD and then sets CD invalid at block 2935 to free up the memory space which was pointed to by CD such that newly acquired images can be stored therein (see Block 2965).

Once decoding is complete, at block 2940 a determination is made as to whether decoding was successful. If decoding was successful, the decoded message is output as called for by block 2945 and, if scanning is still being called for (block 2915), the processor loops back to blocks 2915 and 2920 to wait to begin another decoding cycle. If decoding was not successful, block 2940 causes the processor to loop back for a new decoding cycle without outputting any data message. In either case, if scanning is no longer required, the processor proceeds to block 2950 and disables the scanning hardware.

As explained in connection with the embodiment of FIGS. 26 and 27, the showing of the scanning and decoding operations of the embodiment of FIGS. 28 and 29 in separate flow charts does not mean that these operations are performed separately and independently. It will, therefore, be understood that the scanning and decoding operations shown in FIGS. 28 and 29 are preferably performed substantially simultaneously, with the scanning operation being performed by hardwired scanning circuitry associated with DMA controller 2032 and the decoding operation being performed by microcomputer 2029.

While this invention has been explained with reference to the structure disclosed herein, it is not confined to the details set forth and this application is intended to cover any modifications and changes as may come within the scope of the following claims:

[End of Excerpt of U.S. patent application Ser. No. 08/516,185, filed Aug. 18, 1995.]

[The following is an excerpt from the referenced U.S. patent application Ser. No. 08/205,539, filed Mar. 4, 1994].

It is therefore a primary object to provide optimal throughput in decoded-output optical scanners.

It is another object to provide optimal throughput in optical scanners that can be stopped and started instantaneously.

It is still another object to provide optimal throughput in CCD based optical scanners.

It is a further object to provide optimal throughput in CCD based bar-code scanners.

It is still a further object to provide optimal throughput in two-dimensional CCD based bar-code scanners.

It is yet another object to provide a decoded-output optical scanner where the scanning function waits until decoding of an earlier scan has been completed.

These and other objects are attained by a method of improving throughput in a scanner whose scanning action is capable of being stopped and started instantly, comprising the steps of A) storing results of a first scan of a target containing indicia in a first region of a memory and B) upon determining that the first scan is complete 1) decoding results of the first scan 2) initiating a second or subsequent scan 3) storing results of the second scan of the target containing indicia in a second region of a memory, and 4) awaiting completion of the decoding before initiating an additional scan.

Figure 30:
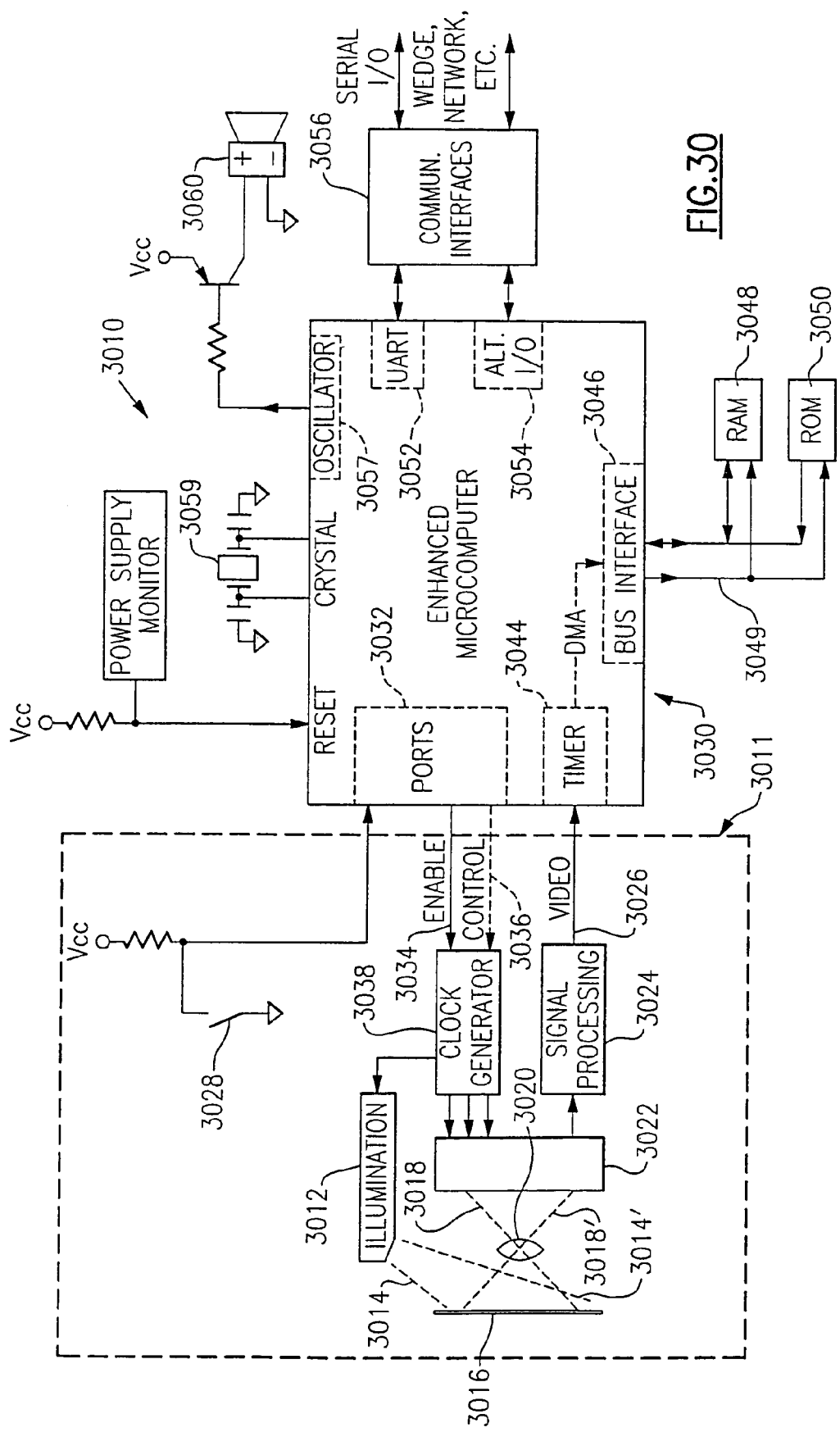
FIG. 30 is a block diagram representing the elements that constitute a decoded-output CCD scanner.

Turning now to the Drawing and particularly, FIG. 30 thereof, there is seen a block diagram of a system 3010 that embodies the teachings of the present feature. System 3010 includes a scanning section 3011, which is enclosed by the dotted line at the left side of FIG. 30, Illuminator 3012, which can be an LED array, a laser, or the like, produces a light beam represented by outer defining rays 3014, 3014'. The beam strikes a target 3016 on which are found visible indicia, such as one or two dimensional bar code or OCR characters. The light beam is reflected through optics 3020, the reflected beam being shown representatively as rays 3018, 3018'. The optics project an image of the indicia onto image sensor 3022, which is preferably realized as a CCD array or matrix. Signals developed by the image sensor 3022 responsive to light incident thereon are conducted through signal processing electronics 3024, and a suitably conditioned video signal 3026 is presented to an enhanced microcomputer or microprocessor 3030.

Operation of the scanning section 3011 is controlled by a trigger 3028, which can be a manual trigger, or an automatic trigger that responds to the presence of indicia. The trigger 3028 is coupled to the microcomputer 3030 via an I/O port section 3032. The microcomputer asserts an enable signal 3034 responsive to the trigger 3028 to turn on the illuminator 3012 and the image sensor 3022. Control signals 3036 are provided for clock generators 3038 that provide suitable enabling signals for the illuminator 3012, and clock signals 3042 for the image sensor 3022 as are required for the operation of a CCD device.

The microcomputer is provided with a timer and DMA controller 3044. The video signal is conducted through a bus interface 3046 onto bus 3049, and then stored as data at an address in a RAM 3048, the transfer mediated by the DMA controller 3044. The stored data is representative of the optical pattern of the indicia on the target 3016. While DMA access to the RAM is preferred for rapidity of operation, other memory addressing techniques can be also used. Other conventional provisions include a UART 3052 and an auxiliary I/O port section 3054 for connecting communications devices (not shown) to the scanner. Representative of such devices are a keyboard when the scanner is employed in a wedge configuration, a telecommunications network, and other devices as may be required for a given application of the system.

A ROM 3050 contains system programs, and may also contain a program for decoding the data stored in the RAM 3048. Of course the program could equivalently reside in RAM 3048, and be loaded therein from a secondary memory storage (not shown), or via communications interface 3056.

In this particular embodiment as shown, the decoder is integrated into the scanner, although it could also be external thereto.

Figure 31:
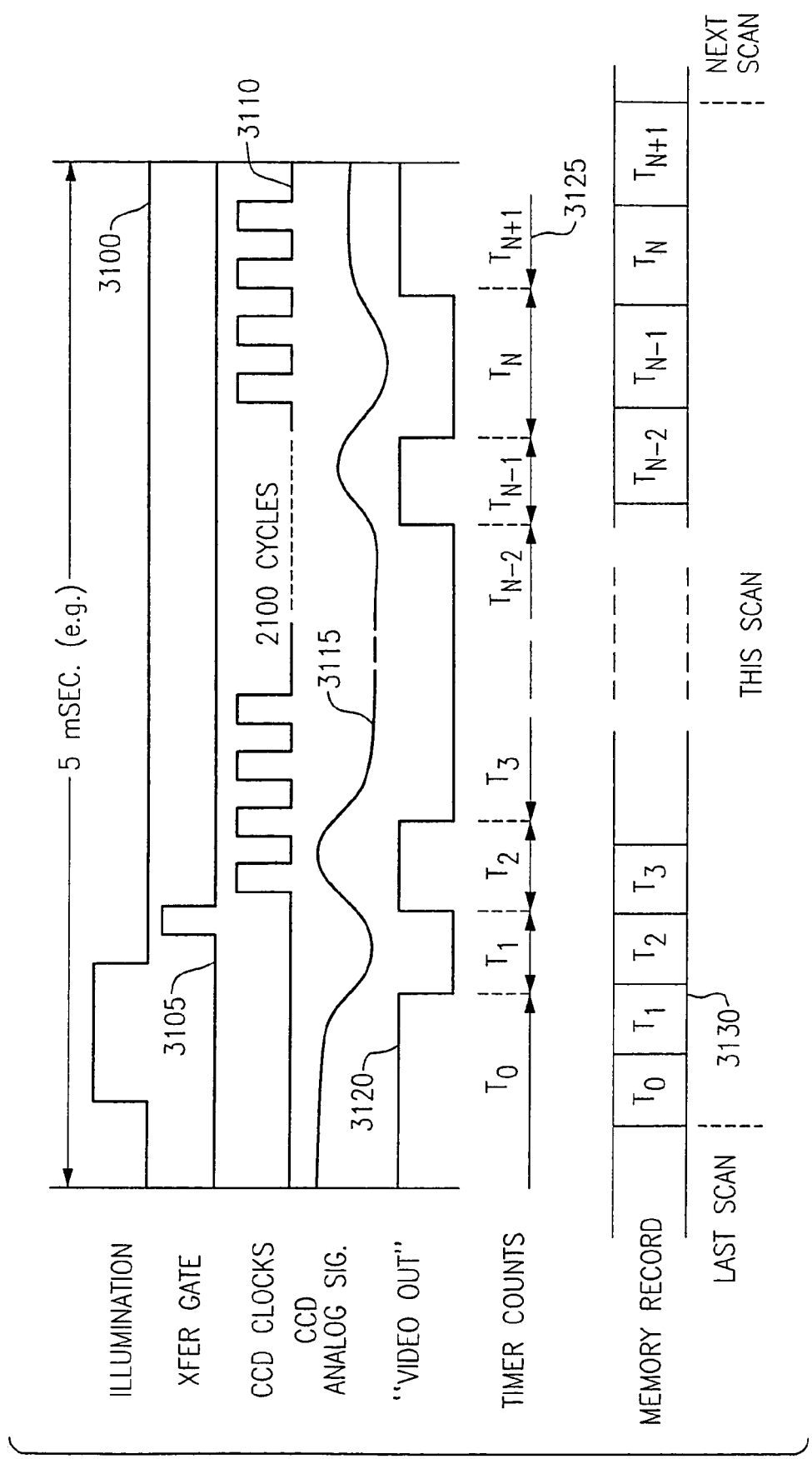
FIG. 31 shows a representative CCD scan cycle.

A typical scan cycle for a CCD scanner is shown in FIG. 31. During the time period of the scan (5 msec is used in the figure, although this can vary) the cycle begins with illumination pulse 3100 during which brief time period the target is illuminated. The target may contain bar code or any other indicia such as OCR which are amenable to scanning and decoding. During the illumination pulse 3100 period, photosensors in the scanner obtain a linear image of the target which is then transferred via a transfer gate 3105 to the charge coupled device. The CCD is clocked with pulses 3110 to shift the image out to a CCD analog signal 3115. The CCD analog signal 3115 is then transformed via the microprocessor to a digitized signal termed video out 3120 in FIG. 31. Video out 3120 is a digitized representation of whatever high contrast elements were observed during the illumination period 3100. This could be the black regions of a bar code, for example. It can be seen that there is not regularity to either the size or the placement of the '1' and 0 segments of the video out 3120.

The time between successive leading and trailing edges of the video out signal 3120 is then timed using the microprocessor clock counts 3125 as reference. Next the information is then stored in memory 3130.

Figure 32A:
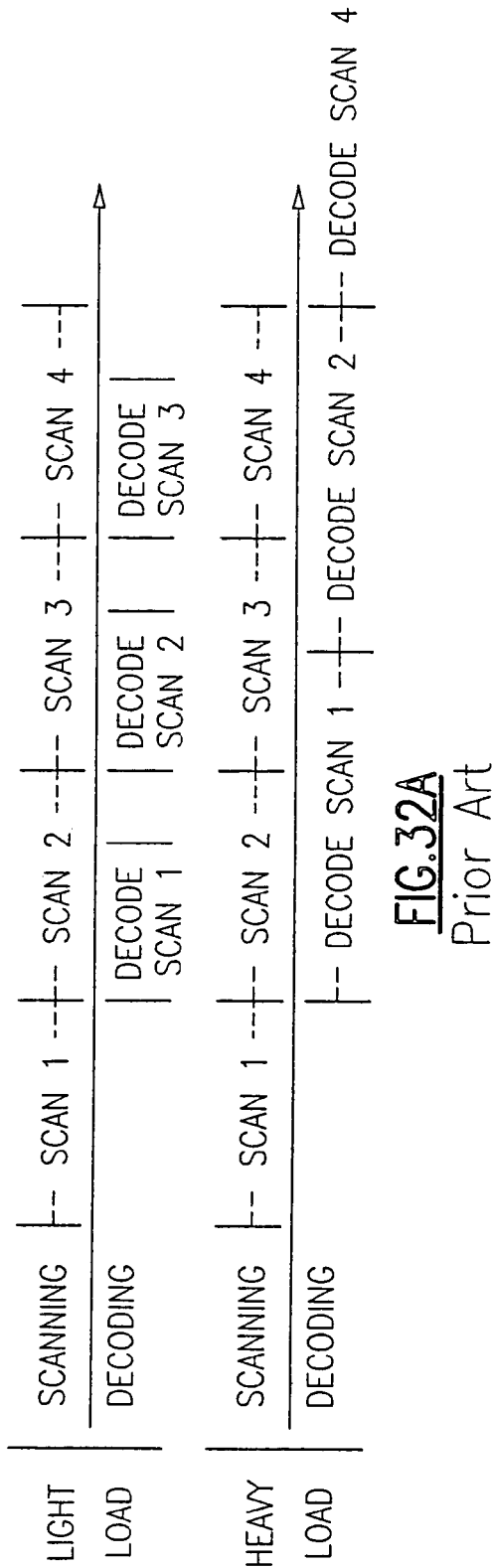
FIGS. 32A and B shows schematically the operation of the prior art and the instant reader in scanning under different load conditions.
Figure 32B:
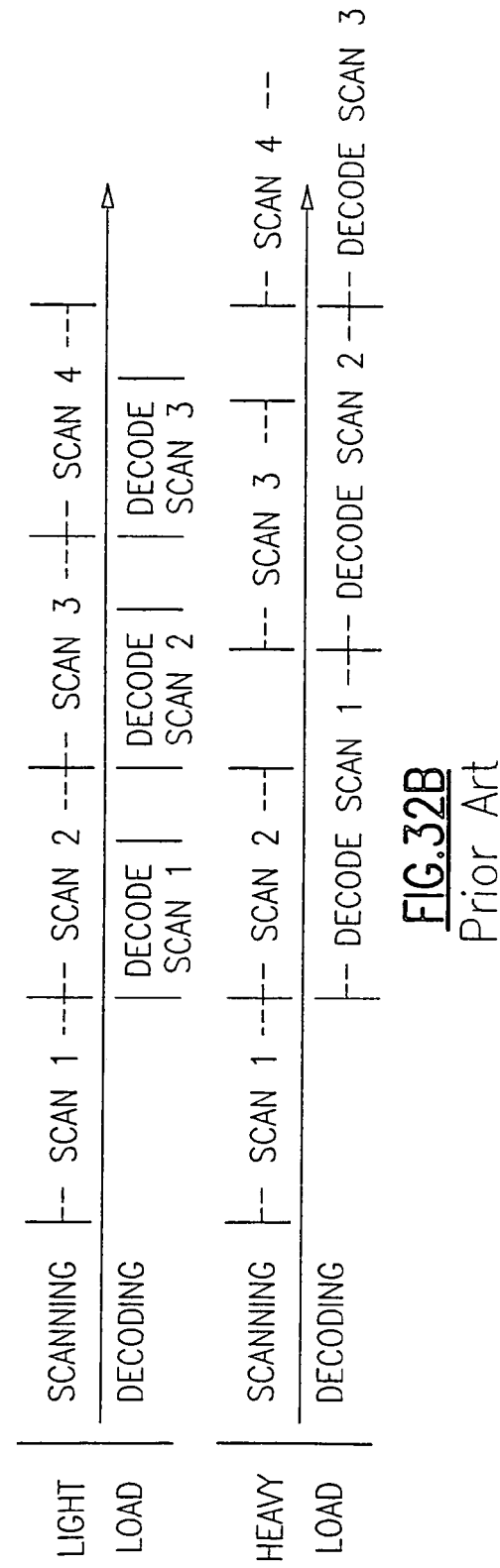

Scanning of indicia can take place under either of two generalized conditions with respect to the information load presented by the indicia. These are there being a light load of information or a heavy load thereof. The situation is set forth in FIG. 32. The prior art and the instant reader perform equally well under a light load. This can be seen by inspecting the representation of the timing of successive scans and decoding operations of prior art 3135 and the instant reader 3155 under a light information load. Each decode of a previous scan's information can be completed during a subsequent scan.

However, under a heavy information load it can be seen that the prior art methods 3140 did not allow sufficient time for decoding. Thus, for the method illustrated, after scan1 3141 is completed scan2 3142 is initiated immediately before the decoding of scan1 3143. Scan2 3142 is completed while decode1 3143 is still in progress and so scan3 3144 is initiated. The decoding process falls further and further behind the scanning process until some point where memory is filled and information must be discarded.

This contrasts with the heavy information load handling of the instant reader 3160. Again scant 3161 obtains and stores information in memory. Then scan2 3162 is initiated immediately before the decoding of scan1 3165 is begun. However when scan2 3162 is terminated, the decode 3163 is not yet completed. Therefore the scanner is halted at 3170 and only restarted at 3171 to perform scan3 3164 when the decode of scan 1 3163 is completed. Of course immediately after scan3 3164 is initiated, so is the decoding of scan2 3165.

Figure 33:
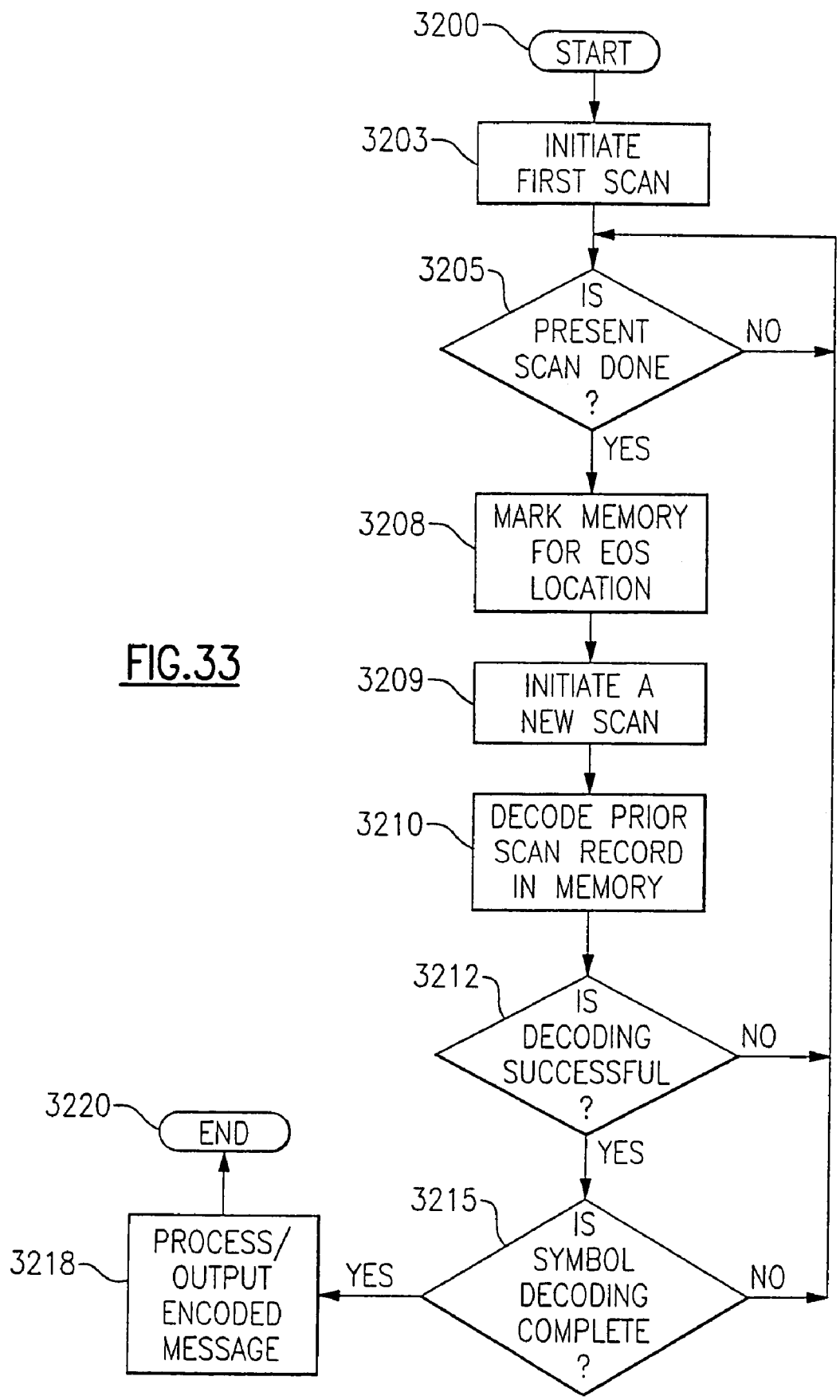
FIG. 33 is a flow diagram showing the preferred embodiment of the instant invention.

FIG. 33 shows the steps used to accomplish this synchronization of scanning and decoding so that information does not have to be discarded from memory. The scanning process as a whole is initiated in step 3200 by an act such as turning on the power to the scanner or depressing a button or other trigger to initiate the illumination. The first scan is then initiated in step 3203. This first scan is a special instance as it is the one time, under normal circumstances, that a scan will be initiated without a decoding operation being initiated as well. After this step 3203 the succeeding steps are repeated from one cycle to the next.

First a determination is made as to whether the present scan is complete 3205. This is accomplished via a signal from the scanner to the microprocessor informing the microprocessor that the scan is complete. The signal may either be initiated by the scanner or be a response to a query signal from the microprocessor. Once the scan is complete, and the information garnered from the scan has been placed in RAM memory, then in the preferred embodiment the last memory location containing information from the previous scan is marked in step 3208. This can be done using timing information with respect to the last scan. In this embodiment memory is handled as a circular queue (with each region logically successive to both the prior and subsequent regions of memory) so as to maximize the use of memory, as only the amount needed for each scan is used by it. However storage of the information can take place using two predetermined blocks of memory where each block is of sufficient size to accommodate the greatest possible information obtainable from a single scan. The information from the scan may have been transferred to memory by any of the techniques that are well known in the art such as, for example, direct memory access.

A new scan is then initiated in step 3209 and thereafter the microprocessor begins, in step 3210, decoding the results from the prior scan that are already completely stored in memory. A determination is then made under microprocessor control in step 3212 as to whether the symbol decoding is successful. This query breaks into two parts: first has the decoding been completed and second has the last collection of information been decoded so as to obtain a valid symbol? If the decoding is not complete then no new scan is initiated until such time as it is complete—that is initiation of scanning will be prevented. If however the decoding is complete but does not yield a valid results, then the information will have to be discarded and the system will return to wait for the present scan to be completed.

If, on the other hand, a valid decode has been accomplished, then a determination will be made in step 3215, again under microprocessor control, as to whether the entire group of scans has successfully decoded a complete symbol or informational grouping. If not, the system will wait for the completion of the current scan. If so, then in step 3218 the completed group of scans comprising a message will be processed and/or output as directed by the microprocessor using the peripherals which are attached to the system. The process will then end in step 3020 by either having the power disconnected or the button or trigger for illumination released.

It can be seen that by practicing this feature information is decoded at a rate that keeps up with the scanning process so that no discarding of stored information due to memory constraints is ever necessary.

While this invention has been explained with reference to the structure disclosed herein, it is not confined to the details set forth and this application is intended to cover any modifications and changes as may come within the scope of the following claims:

[End of Excerpt of U.S. patent application Ser. No. 08/205,539, filed Mar. 4, 1994].

[The following is an excerpt from the referenced U.S. patent application Ser. No. 08/504,643, filed Jul. 20, 1995].

There is provided an improved bar code reader which uses a 1D image sensor and yet which is able to read both 1D and 2D bar code symbols. This bar code reader is specially adapted to practice a novel method for one dimensionally and asynchronously imaging a bar code symbol, and acquiring and storing a digital representation of one or more imaged slices thereof. In the case of 1D linear symbols or 1D stacked symbols, these one or more digital representations preferably comprise "timercount" representations of the imaged slices, i.e., representations which record the occurrence times of the transitions occurring within the slices. These slices preferably extend across all of the code bars of each row of the symbol and have a resolution which is sufficient to permit the information encoded in the symbol to be accurately decoded.

In the case of 2D matrix symbols, these digital representations comprise "bit image" or "bit mapped" representations of the imaged slices, i.e., representations which record the locations of each data element or bit of the imaged slice. When a plurality of successive bit image representations (hereafter often abbreviated to "bit representations") are considered together, they together comprise a stored representation in which the bits making up the symbol are stored or mapped in memory space in a way that is closely related to the way in which the bits making up the symbol are positioned in the physical space of the printed symbol. Because of this close relationship, the bit representation, once acquired and stored, can be used and decoded in much the same way as a 2D image which has been acquired and stored by a 2D bar code reader, once its finder pattern has been identified and located.

Significantly, the reader may be used with both 1D and 2D bar code symbols, provided that it is equipped with software that enables it to distinguish between the various types of bar code symbologies that may be used. In the case of distinguishing between 1D and 2D symbols, this comprises software which enables the reader to distinguish between 1D bar code symbols and 2D bar code symbols and, if it is a 1D symbol, to decode the symbol using one or more timercount representations thereof. In the case of distinguishing between the various kinds of 2D symbols, this comprises software which enables the reader to successively test for the presence of the finder patterns that are characteristic of the different 2D bar code symbologies and, when the finder pattern has been identified, to decode the symbol using the stored bit representations thereof. The accomplishment of these two results is facilitated by the fact that the reader generates both timercount and bit representations of the symbol substantially simultaneously and in real time.

As will be explained more fully presently, one important advantage of the feature is its ability to determine, solely from information contained in a succession of imaged slices or scans, when to stop acquiring data from the 2D symbol. The present feature accomplishes this by examining the bit representations of successive imaged slices, substantially in real time, for indications of the presence of the types of finders that are used with 2D bar code symbologies. Among these finders are "peripheral" type finders, such as those used with the DataMatrix symbology, "waistband" type finders such as those used with the Code One symbology, and "central" or "bullseye" type finders, such as those used by the Maxicode and Aztec symbologies. The last mentioned symbology is described in copending U.S. patent application Ser. No. 08/441,446, filed May 15, 1995, entitled "Two Dimensional Data Encoding Structure and Symbology For Use With Optical Readers".

With "bullseye" type symbologies, the presence of the central finder is indicated by the emergence of easily recognized numerical patterns that are derived from the above-mentioned succession of bit representations using a new finder identifying algorithm to be described hereinafter. With the "peripheral" and "waistband" type finders, the finders may be identified by means of the known finder identifying algorithms for the DataMatrix and Code One symbologies. If symbols with more than one type of finder are being autodiscriminated, these finder identifying algorithms may be applied alternatively and successively, i.e., as candidate algorithms, until one actually succeeds, and makes decoding possible.

In the preferred embodiment of the method, advantage is taken of the fact that many 1D bar code readers already include programmed control circuitry which operates in conjunction with a fixed frequency timing signal to convert the video signal for a 1D slice of the symbol into a "timercount" representation thereof. These timercount representations of the symbol are produced for each successive slice of the symbol, substantially in real time, as the reader is moved manually across the symbol. As this occurs these timercount representations are stored in successive locations of a timercount memory space. At approximately the same time, these timercount representations are converted to the corresponding bit representations, using a simple well-known conversion algorithm and then stored in an image memory space. In this way, the method takes the fullest possible advantage of existing capabilities of existing 1D bar code readers to enable the reader to distinguish between and then decode both 1D and 2D symbols. It will be understood, however, that, if taking advantage of existing bar code reader capabilities is not important, the reader may be designed so that the timercount and bit image signals are generated simultaneously and independently.

In the event that it is known that the reader will be used to read only 2D bar code symbols, the inclusion in the method (or apparatus) of steps (or circuitry) that are used to identify and process 1D bar code symbols is unnecessary. It will therefore be understood that, in embodiments of the latter type, the generation of timercount representations becomes optional, being included or not included depending upon whether or not it is useful in generating the bit representations used with 2D bar code symbols. In embodiments of the latter type, there may also be eliminated those steps or program segments that are directed only to the identification and processing of 1D bar code symbols.

In accordance with a secondary feature, digital representations are stored in both of the above-mentioned memories, substantially in real time, on a first in-first out basis, with representations of old slices being shifted through the memory (or at least with respect to an address pointer) as representations of new slices are stored. On reaching the end of the memory space, representations of old slices are re-entered at the beginning of the memory space. As a result, the two memory spaces contain two circulating representations of the symbol being read, one a timercount representation and one a bit representation. Sets of newly received timercount representations are examined as they occur and, if they indicate the presence of a 1D symbol, are decoded at once. If this decoding does not succeed, indicating that a 2D symbol may be present, the bit representations are examined to determine if a finder can be identified and located. Once the finder is identified and located, the portion of the symbol that is then being imaged is known. The finding of this finder may then be used to continue the imaging of the symbol until there are enough stored representations of the symbol to allow the latter to be decoded.

Thereafter, optionally, the bit representations may be reorganized (e.g. rewritten in a different order or re-addressed) so that both the individual data bits and the finder pattern are located in their true relative positions with respect to one another. If the image memory space is too small for this to be done within the image memory, the reorganization may take place in the course of transferring the bit representation from the image memory to the timercount memory. In either case, the resulting bit image will be in condition for decoding using the decoding algorithm that is associated with the symbology indicated by the type of finder that has been found.

In its apparatus aspect the apparatus can be a 1D bar code reader which is in many respects similar to existing 1D bar code readers, except that its timing, memory structure and programming has been altered in a way that allows it to be used in accordance with the above summarized method. More particularly, the apparatus may comprise a 1D bar code reader which has been modified to increase its clock rate by an amount sufficient to enable it to be used to image many successive slices of the symbol as it is moved there across. In addition, the memory structure of the reader is modified to make the above-mentioned memory spaces available for use in storing and shifting the timercount and bit representations which are associated with these slices. Finally, the programming of the reader is modified to coordinate the generation and storage of the latter representations, to differentiate between 1D and 2D bar code symbologies and, if a 2D symbology is used, to identify the symbology on the basis of the type of finder that is used, and then discontinue the imaging of the symbol after there has been stored a number of digital representations which is sufficient for decoding purposes. (It should be noted in the last mentioned connection that, because error correction data is encoded in 2D bar code symbols along with message data, it is often possible to fully decode a message even though a part of the symbol is missing.) Because the functions of these modifications have already been discussed in connection with the foregoing summary of the method, they will not be repeated here.

Other objects and advantages will be apparent from the following description and drawings.

Figure 34:
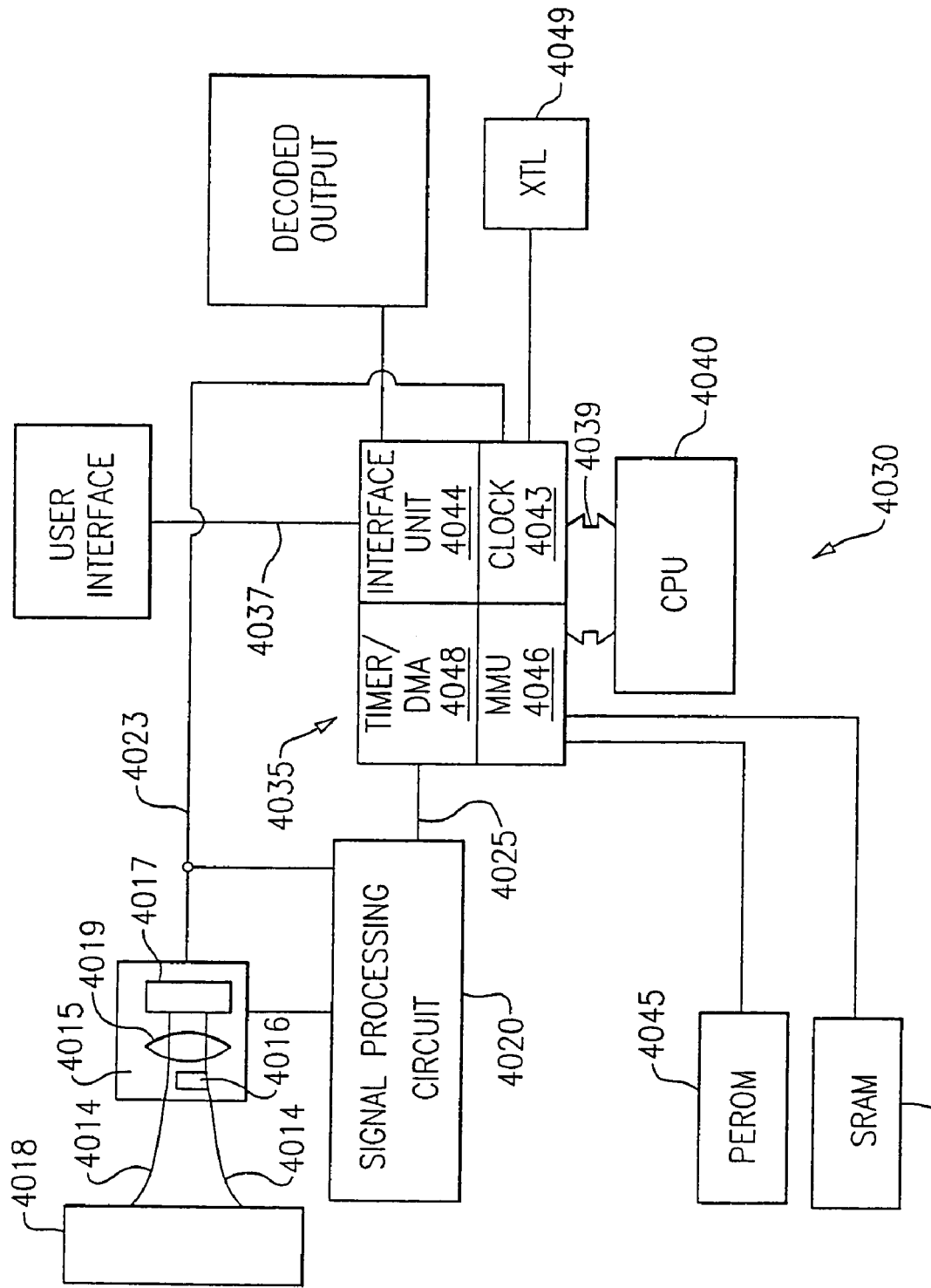
FIG. 34 is a block diagram of a bar code reader suitable for use.

Referring to FIG. 34 there is shown a block diagram of a bar code reader of a type which is suitable for use. This bar code reader may be a 1D bar code reader of the type sold by Welch Allyn, Inc., Skaneateles, N.Y. under the model designation ST-3000-22, provided that certain modifications to be discussed later are made thereto.

The bar code reader includes an illumination system which may comprise a plurality of 660 nm light emitting diodes 16 that illuminate a narrow strip or slice of a bar code symbol 4018. Reader 4010 also includes focusing optics 4019 which may be of the type described in U.S. Pat. No. 5,291,008, which is assigned to the assignee of the present application, and incorporated herein by reference. Focusing optics 4019 causes light returning from the bar code symbol along a receive path 4014 to be focused or imaged upon a 1D image sensor 4017 which may be of the charge coupled type. Sensor 4017 develops analog signals that represent the optically readable content of a complete slice of the bar code symbol. These analog signals are supplied to signal processing circuit 4020, which provides signal conditioning and digitization, using a high frequency timing signal or clock received over a clock input line 4023. Digitization is accomplished using an analog reconstruction circuit which is disclosed in U.S. Pat. No. 5,294,783, of common assignee herewith, and also incorporated herein by reference. The resulting video signal representation of the imaged slice is supplied via an output line 4025 to programmed control circuitry 4030 of FIG. 34.

Programmed control circuit 4030 performs various tasks necessary to the operation of the reader. It includes a central processing unit 4040 which may comprise a Motorola MC68HC11 microcontroller/microprocessor and has an address space of 64 Kbytes. This microprocessor includes serial and parallel I/O, interrupt logic, an oscillator, and clock logic. Microprocessor 4040 is also provided access to an 8 Kbyte static random access memory (SRAM) 4042 and a 32 Kbyte read only program memory (PEROM) 4045. The capabilities of microprocessor 4040 are enhanced by a multifunctional application specific integrated circuit (ASIC) 4035 which may be of the type sold under the product designation 21203276-01 by Welch Allyn, Inc. As shown in FIG. 34 ASIC 4035 has four principal functional subunits or blocks. A clock control subunit 4043 facilitates switching the scan rate of image sensor 4017 between 50, 100, and 200 scans/second, although only the latter is used. A memory management subunit 4046 (MMU) provides memory management capability. The timer/DMA subunit 4048, coupled to signal processing circuit 4020, automates the capture of image data for subsequent processing. Finally interface subunit 4044 serves as a RS-232 communications interface for bar code reader 4010, via line 4037. ASIC 4035 and its subunits allow microprocessor 4040 to concentrate its resources on decoding data read from the bar code symbol. ASIC 4035 as a whole is controlled by microprocessor 4040 through a suitable bus 4039.

The timing of the circuitry of FIG. 34 is controlled by ASIC 4035 based on a timing signal received from a crystal 4049. To increase the performance of the reader, and to handle the high image sampling rates necessary to read two dimensional bar code symbols, a crystal having a frequency of 14.7456 MHz, has been substituted for the 7.3728 MHz crystal which is included in the unmodified Model ST3000-22 bar code reader. Other modifications to the basic Model ST3000-22 include the use of the following:

SRAM 4042—a 70 ns, 8Kx8 CMOS RAM sold by Sony Corp. under the product designation CXKS5864BM-70L.

PEROM 4045—a 90 ns ROM sold by ATMEL under the product designation AT29C256-9.

Regarding the above mentioned modifications, the use of a higher timing signal frequency is the most important and the remaining modifications are made to assure reliable operation of the circuitry at this higher frequency.

Figure 35:
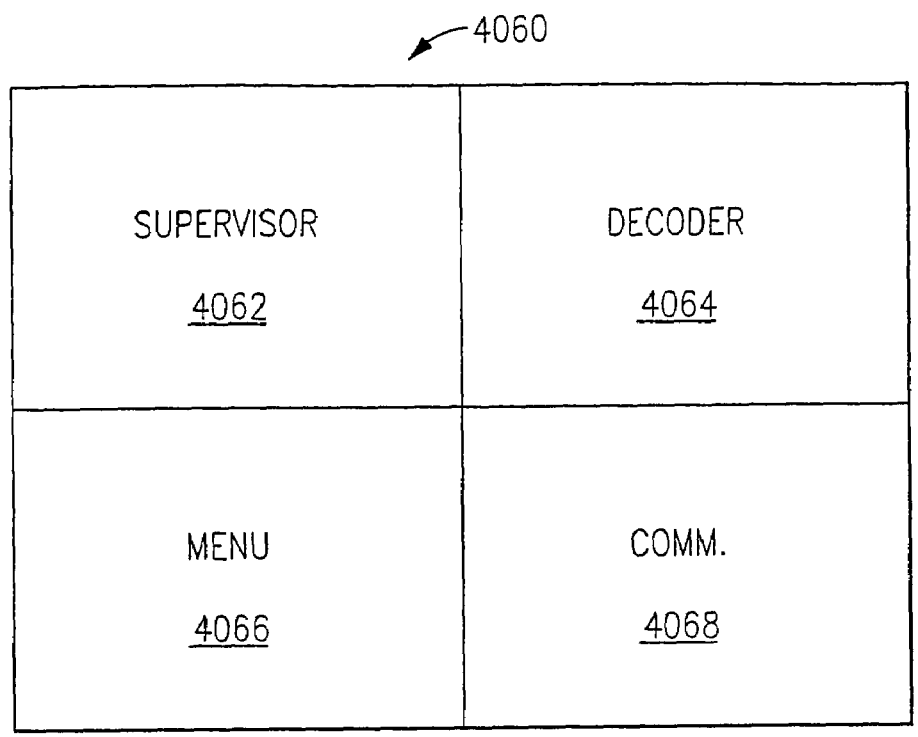
FIG. 35 shows an exemplary architecture for the PEROM program block shown in FIG. 34.

Firmware resident in the PEROM 4045 contains the stored program for microprocessor 4040. Portions of the program realized in the PEROM 4045 are conventional, and allow the bar code reader 4010 to function as a conventional autodiscriminating reader for linear bar code symbologies. Broadly speaking, firmware 4060 includes 4 main program segments as shown in FIG. 35. A variety of system supervisory functions, indicated by reference numeral 4062 include the initialization of volatile hardware and memory regions, controlling and sequencing the scanning and decoding operations, and monitoring and maintaining I/O between the bar code reader, the operator, and external equipment.

Decoding functions, indicated by reference numeral 4064, are accomplished in several stages. First a preliminary examination for the presence of a 1D bar code symbol is performed. If a 1D linear symbol is found, an attempt is made to decode the symbol with reference to the timercount representations of the slices until decoding is successful, one timercount representation of the symbol often being sufficient for this purpose. If further representations indicate that a stacked 1D stacked symbol is found, this procedure is repeated until all rows of the symbol have been successfully decoded. If it is determined that the symbol is a 2D symbol, the symbol is examined with reference to successive bit representations of the imaged slices, which are stored in SRAM 4042 substantially in real time. As this is occurring the representations are examined to identify the type and location of the finder pattern therefor. The identification is facilitated by the fact that the simultaneous availability of a number of bit representations allows the recognition of data structures such as finders which cannot be recognized and identified from a single bit representation. Once the latter have been determined, additional bit representations are stored until there have been stored a number of such representations which is sufficient to make possible the decoding of the symbol. The stored 2D image may then be decoded using a decoding algorithm of a type appropriate to the symbology used to encode the symbol.

In operation, a user will normally depress a trigger (or set the unit to automatic scan mode) and sweep the scanner over the image one or more times until the audio alert (e.g., a "beep") is heard and the decoded information is output. Alternatively, the user might manually specify whether 1D and 2D codes are to be read, or this could be determined automatically by the reader.

The menu functions, indicated by reference numeral 4066, are routines called in response to decoding special bar code symbols, so-called bar code "menus" that set non-volatile bits or values within a designated configuration region of the PEROM 4045, thus governing various operating characteristics of the bar code reader 4010, such as scan rate, beeper volume, mode of operation (manual or auto-trigger), enablement of decoding of particular bar code symbologies, etc.

Communications functions 4068 service the hardware and include protocols needed to deliver scanned data to an attached device. The bar code reader 4010 can support a number of communications protocols and interfaces, including laser output, OCIA, OCR, RS-232, various commercial terminals and keyboard wedges.

Except for the above-discussed modifications to the circuitry and programming of the reader, reader 4010 is of a type that is commercially available to and understood by those skilled in the art. Accordingly, the circuitry shown in FIGS. 34 and 35 will not be further described herein.

Figure 36:
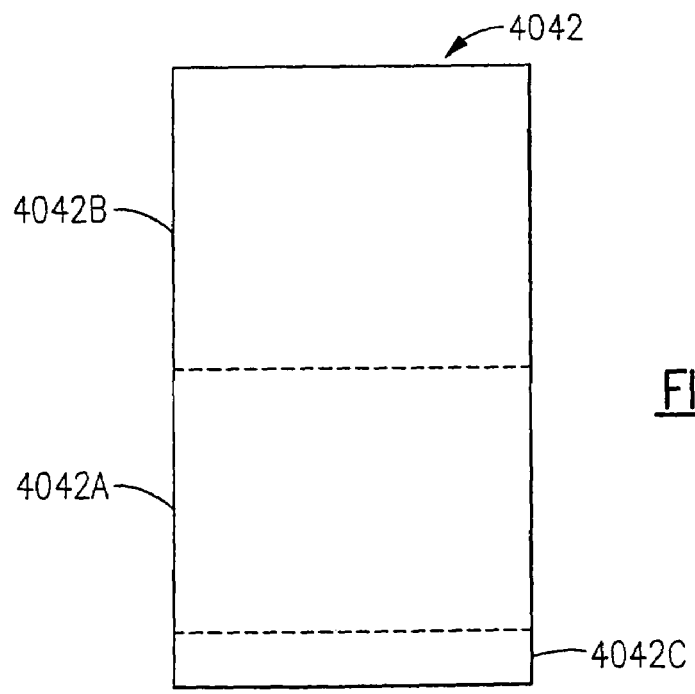
FIG. 36 shows an exemplary architecture for the SRAM block of FIG. 34.

Referring to FIG. 36 there is shown an enlarged view of SRAM 4042 which illustrates how the latter is organized for use. In the embodiment of FIG. 36 the 8 kilobytes of memory which are included within SRAM 4042 are grouped into a first or image memory space 4042A which includes approximately 3.7 kilobytes, a second or timercount memory space 4042B which includes 4 kilobytes, and a third or accessory memory space 4042C which includes approximately 0.3 kilobytes, and which may be used as a "connectivity" register in the course of identifying the finder pattern of the symbol, and as a set of general purpose registers for conventional microprocessor housekeeping functions. It will be understood that these numbers are exemplary only and that these memory spaces may be located either on the same chip or on separate chips.

Figure 39:
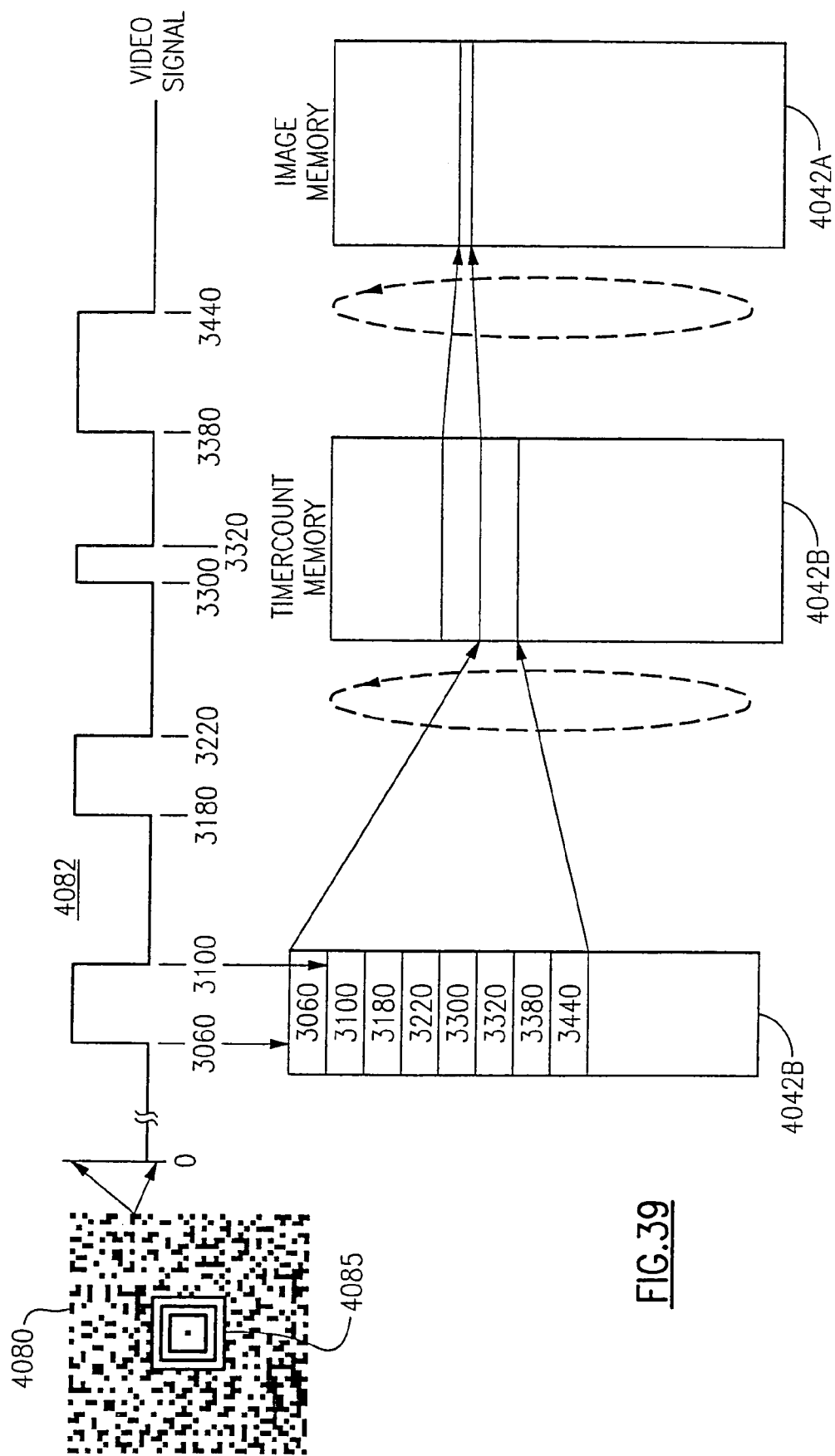
FIG. 39 shows the relationship between the various representations of data read from a slice of a bar code symbol.

In the preferred embodiment, second memory space 4042B is used on a first in-first out basis to receive and store successive timercount representations of the slices of the bar code symbol which are imaged as reader 4010 is manually moved across a bar code symbol. In the case of 2D symbols, this movement may be asynchronous and may be in any direction, provided that enough of the symbol can be imaged along that direction to make decoding possible. In the case of 1D symbols, this movement may also be asynchronous, but must be within a range of directions that allows each code bar of the symbol to be included within the timercount representation. The numbers which are included in each timercount representation comprise the number of timing pulses which have occurred at the times when the video signal from signal processing circuit 4020 undergoes transitions from 1's to 0's or vice-versa. An illustration of how the data from a video signal for an imaged slice is converted to a timercount representation thereof, and then stored in timercount memory 4042B is shown in FIG. 39.

Similarly, first or image memory space 4042A is used on a first in-first out basis to receive and store successive bit representations of the slices of the bar code symbol which are imaged as reader 10 is manually moved across a bar code symbol. These bit representations contain substantially the same information as the timercount representations thereof, although in a different format, the conversion of one format to the other being possible with the use of known conversion algorithms. In the preferred embodiment, the bit representation of each slice is derived from the corresponding timercount representation thereof by the use of such an algorithm, as suggested by FIG. 39. This conversion is performed because it makes possible the use of the timercount generating circuitry and programming of existing 1D readers with a minimum of modification. More generally, however, the bit representation of each imaged slice of the bar code symbol may be derived directly from the video signal, if desired. A series of examples of how the bit representations of successive slices are "shifted" through image memory 4042A during the movement of the reader across a bar code symbol is shown in FIGS. 38-1 through 38-3.

Figure 37:
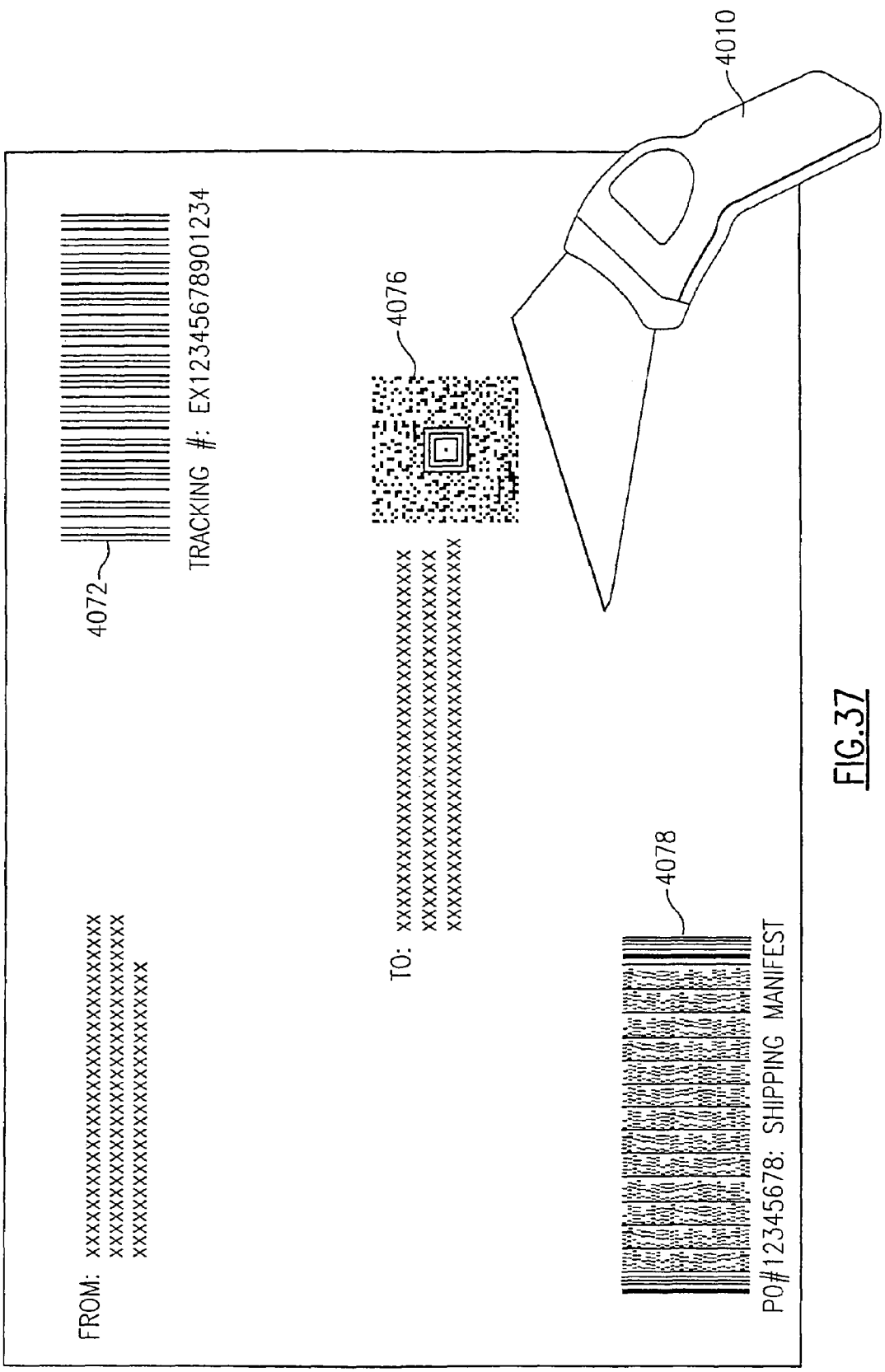
FIG. 37 shows a bar code reader with a shipping carton which bears both 1D and 2D bar code symbols.

FIG. 37 shows the bar code reader together with a package marked with examples of the types of bar code symbols which it is able to read. Included among these examples are a 1D linear bar code symbol 4072, a 1D stacked symbol 4078, and a 2D bar code symbol 4076. All of the illustrated symbols could, in principle, be read ommidirectionally, i.e., in any direction, by the scanner if there were no resolution, memory or processing limitations in the bar code scanner. In the case of 2D bar code symbols, this omnidirectional reading can be easily achieved because readers designed for use with such symbols require a relatively low resolution along its two mutually perpendicular axes. In the case of 1D bar code symbols, high resolution along only the horizontal axis of the symbol is important because information is encoded in the edge positions of the code bars of the symbol. This, together with the need to image all code bars in each imaged slice, place practical limits on the range of directions along which 1D symbols can be read. Thus, while the reader can read both 1D and 2D symbols, it is, for practical reasons, fully omnidirectional only for 2D symbols.

FIGS. 38, 38-1, 38-2, 38-3 and 38-6 illustrate how a 2D bar code symbol which uses the above mentioned Aztec symbology is read in accordance with the method and apparatus. Line segments (A), (B), (C) of FIG. 38 represent various 1D slices imaged by the reader as it is swept across 2D bar code symbol 4080. As shown in FIG. 39 each imaged slice produces a video signal 4082. Timercounts representing the occurrence times of transitions between black to white and white to black image elements are measured and stored sequentially in respective locations within memory 4042B, which serves as a timercount memory. As the timercount representation of each slice is stored in timercount memory 4042B, the timercount data for the preceding slice is converted into the bit representation of that slice and stored in a respective location in memory 4042A, which serves as an image memory.

In the preferred embodiment which is based on a modified 1D reader, the above-described conversion of the timercount representation to the corresponding bit representation is performed by microprocessor 4040, while the storing of the timercount and bit representations is handled by the timer and DMA subunit of ASIC 4035. With a total of only 8 Kilobytes of storage space in SRAM 4042, the amount of memory space that is available for storing the bit image is limited to about 3.7 K. As a result, the bit image produced by the embodiment of FIG. 34 has a relatively low resolution, namely: 170 lines of 176 bits each. This resolution may, however, be increased as necessary by increasing the storage capacity of SRAM 4042, and/or the number of light responsive elements in 1D sensor 4017, and/or the frequency with which the video signal is examined for the occurrence of transitions.

Bit representations 4081, 4082, and 4083 of FIGS. 38-1, 38-2 and 38-3 represent the contents of image memory 4042A after the reader has imaged symbol slices A, B, and C, respectively of symbol 4080. As can be seen, when image memory 4042A is filled through the end thereof an input pointer P jumps back to the beginning of the memory space, so that slices of the bit image are effectively shifted or circulated through the image memory. A similar circulation occurs for the timercount representations stored in timercount memory 4042B. The circulation of these representations is shown in FIG. 39 as closed loops shown in dotted lines.

As the bit representations of symbol 4080 are imaged and stored, they are analyzed (as will be described below) to see if the finder pattern has been located. If the 2D symbol uses the Aztec symbology, this finder pattern will include the set of nested or concentric black and white squares labelled 4085 in FIGS. 38 and 39. FIGS. 38-2 and 38-3 show symbol images 4082 and 4083 which include this finder pattern. Once this finder pattern is found, data from a predetermined number of additional slices of the symbol are processed and input into timercount memory 4042B and image memory 4042A in order to assure that enough of the image of the symbol is stored to allow the latter to be decoded. Since the position of the resulting image with respect to the boundaries of the memory space (or address pointer P) cannot be predicted in advance, the image may be stored in two parts as shown for bit image 4083 in FIGS. 38-3. If desired, in order to facilitate decoding, these two parts may be joined together into a single image by reorganizing (as by reordering) the bit representations stored in the image memory. The purpose of this reorganization is to assure the formation of a substantially complete, decodable image of the bar code symbol as a whole, i.e., an image in which the bits of the bit image representations are located (in memory space) in their true relative positions with respect to the finder. Thus, bits which are adjacent to one another in the physical space containing the printed symbol will be adjacent to one another in the memory space containing the stored image thereof.

If image memory space 4042A is too small for the above-described reorganization, a similar result may be achieved by transferring the image to the timercount memory as a complete unit with all parts of the image including the finder located on the same side of the pointer of the timercount memory. While such a transfer involves the overwriting of data previously stored in the timercount memory, such overwriting is not a problem since the data stored in the timercount memory is then no longer needed.

It will be understood that the above-described reorganization of the captured image of a bar code symbol is a desirable but not essential. This is because a reorganization of this type is necessary or desirable with some decoding algorithms, but unimportant with others. Whether or not such a reorganization is necessary or even beneficial is also dependent upon the type of finder pattern that is used in the bar code symbol. There is contemplated a reorganization of the captured image of the symbol in those cases where such a reorganization is necessary or beneficial to decoding, but no reorganization in those cases where it is not necessary or beneficial.

As will be explained more fully presently, the above-described image capture process takes place within the framework of an image analysis or typing process that involves a series of attempts to decode the unknown symbol as a 1D linear or 1D stacked symbol and, if it cannot do so, a series of attempts to identify a 2D finder and then decode the symbol using the identified finder. The image analysis process as a whole is best visualized with reference to the flow chart of FIG. 40. The 1D part of this analysis is best visualized with reference to the flow chart of FIG. 41. The 2D part of the analysis is best visualized with reference to the flow chart of FIG. 42. For the sake of clarity and "connectedness", the flow charts of both FIGS. 41 and 42 include (above their respective dotted lines) the part of the flow chart of FIG. 40 that leads into them.

The above-summarized image analysis framework will now be described with reference to FIGS. 40–42. Turning first to the flow chart of FIG. 40, the image analysis begins with block 4102 which calls for the reader to wait for a trigger press. When this trigger press does occur, the reader enables its scanning and timing mechanisms as called for by block 4104 to initiate the imaging of stored slices. The reader then tests to see if the trigger is still depressed (block 4106). If the trigger is not still depressed, the reader knows that the read is being terminated and directs the disabling of the scanning and timing mechanisms (block 4120) before returning to its wait condition (block 4102). If the trigger is still depressed, the reader waits for the completion of the next scan slice (block 4108) and then begins the image analysis proper by proceeding to block 4200.

Figure 41:
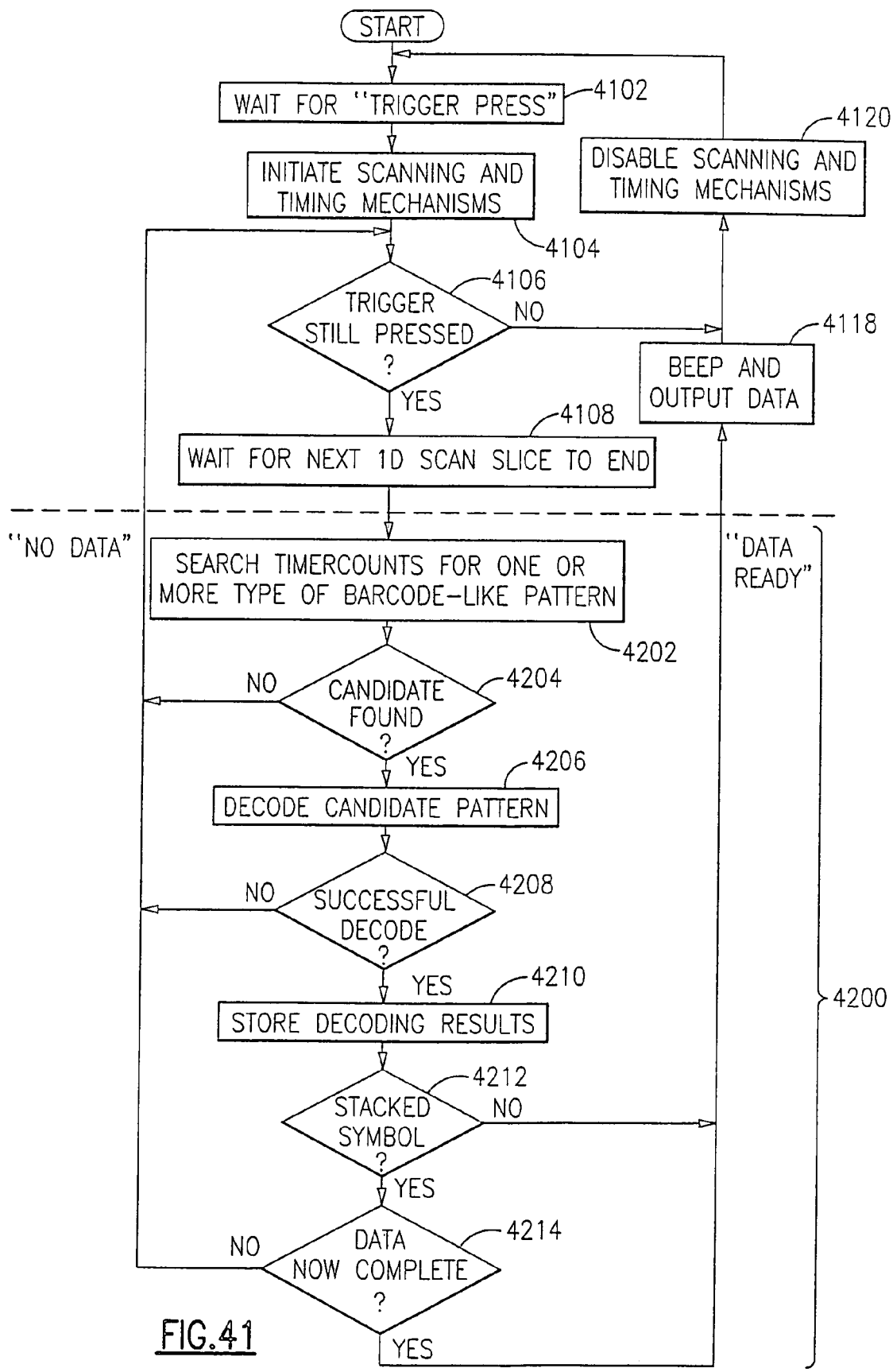

Block 4200, which will be described more fully in connection with FIG. 41, represents the steps necessary to decode a 1D symbol of either type, if one is present, and the reader attempts to perform this decoding on encountering this block. The reader continues this attempt until the attempt is successful and a complete message is ready, or until the attempt fails. If the reader determines that the former has occurred (block 4112), i.e., "Data Ready", the reader produces a beep and outputs its data, as called for by block 4118, before disabling the scanning and timing mechanisms (block 4120) and returning to its wait state (block 4102).

If the reader cannot decode the symbol or otherwise produce a complete message, block 4112 directs the reader to block 4300, which represents the steps necessary to decode a 2D symbol of any of a variety of types. This is done because one reason why no data was ready (block 4112) may be that the symbol is not a 1D symbol, i.e., is a 2D symbol. Whether or not that is actually the case at that time remains to be determined. This is because the reason why there was no "Data Ready" may be that the symbol was damaged or was a 1D symbol read from an unpermitted direction. Thus, block 4300 gives the reader a chance to decode the symbol as a 2D symbol before allowing it to give up and return to its wait state.

Upon completing the steps called for by block 4300, the reader determines if a decodable message is ready (block 4116) and, if so, outputs its data and returns to its wait state. If a decodable message is not ready, it may be because more of the 2D symbol needs to be imaged before decoding can occur. As a result, the reader is directed back to block 4106 to repeat the above-described analysis process for additional scan slices until a complete decoded message is ready and then outputs the message and returns to its wait state.

Figure 40:
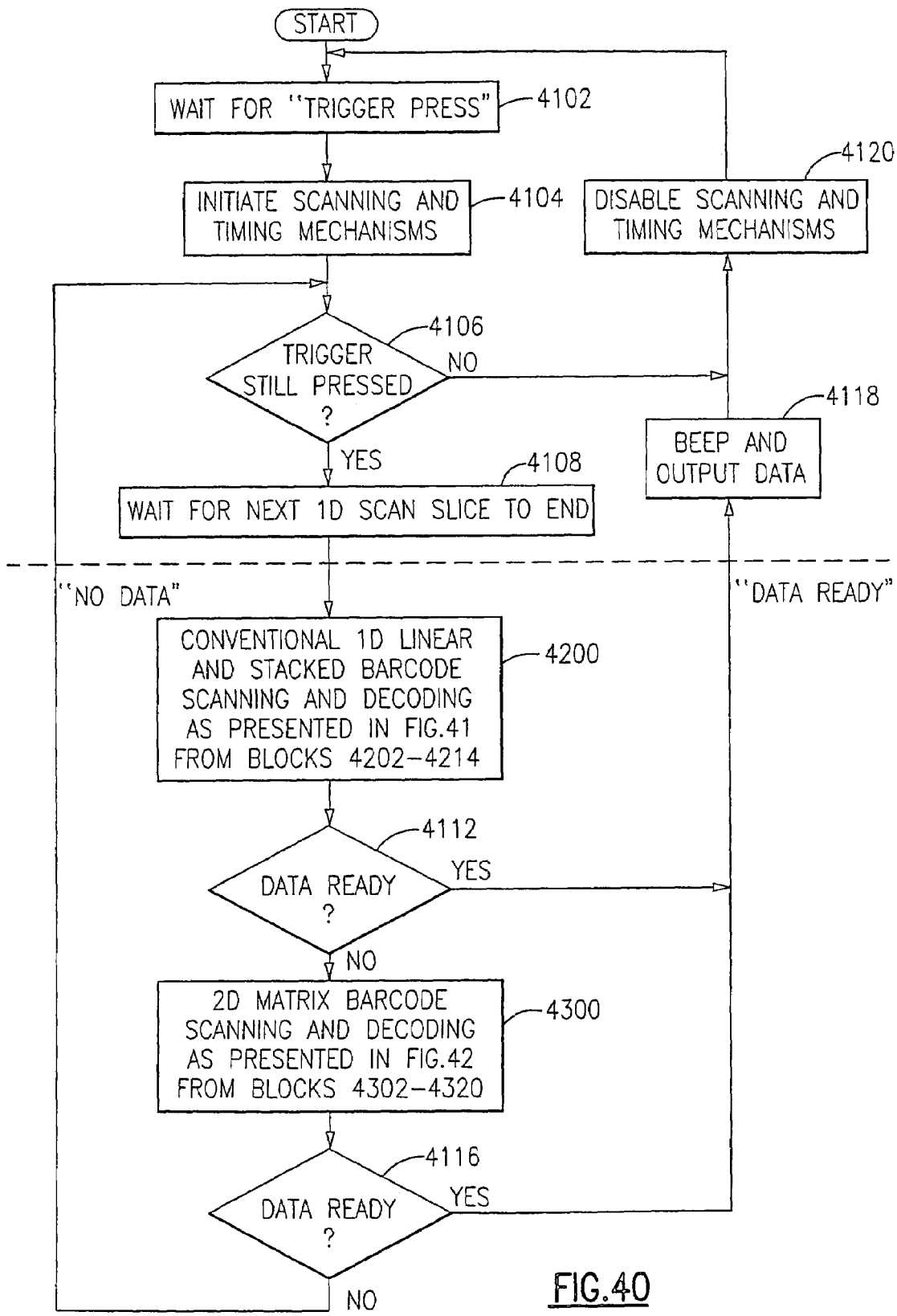
FIGS. 40–42 are flow charts which illustrate the operation of the described reader.

In view of the foregoing, it will be seen that the analysis process shown in the flow chart of FIG. 40 will ultimately output a decodable message from both 1D and 2D symbols provided only that the symbol is readable and is read from a permitted direction. In doing so, the reader, in effect, finally determines which type and subtype of symbol is present by determining which symbol type and subtype resulted in a decodable message.

Referring to FIG. 41, there is shown (below the dotted line) the steps necessary to decode and assemble into a message the data encoded in a 1D linear or 1D stacked symbol, if one is present. These steps employ a process of elimination similar to that discussed in connection with FIG. 40. More particularly, the flow chart determines if a 1D linear or 1D stacked symbol is present by attempting to decode first one and then the other, and deciding if one or the other is present by whether or not the attempted decoding was successful.

Because 1D autodiscriminating algorithms (i.e., algorithms which are capable of differentiating between and then decoding any of a variety of different subtypes of 1D linear symbols) are well known in the art, the steps involved in carrying out the actions called for by blocks 4202 through 4210 of FIG. 41 will not be discussed in detail herein. Similarly, because an algorithm suitable for use in decoding 1D stacked symbols is taught by the above-cited Allais patent, the steps involved in carrying out the actions called for by blocks 4212 and 4214 of FIG. 41 will not be described in detail herein.

Figure 42:
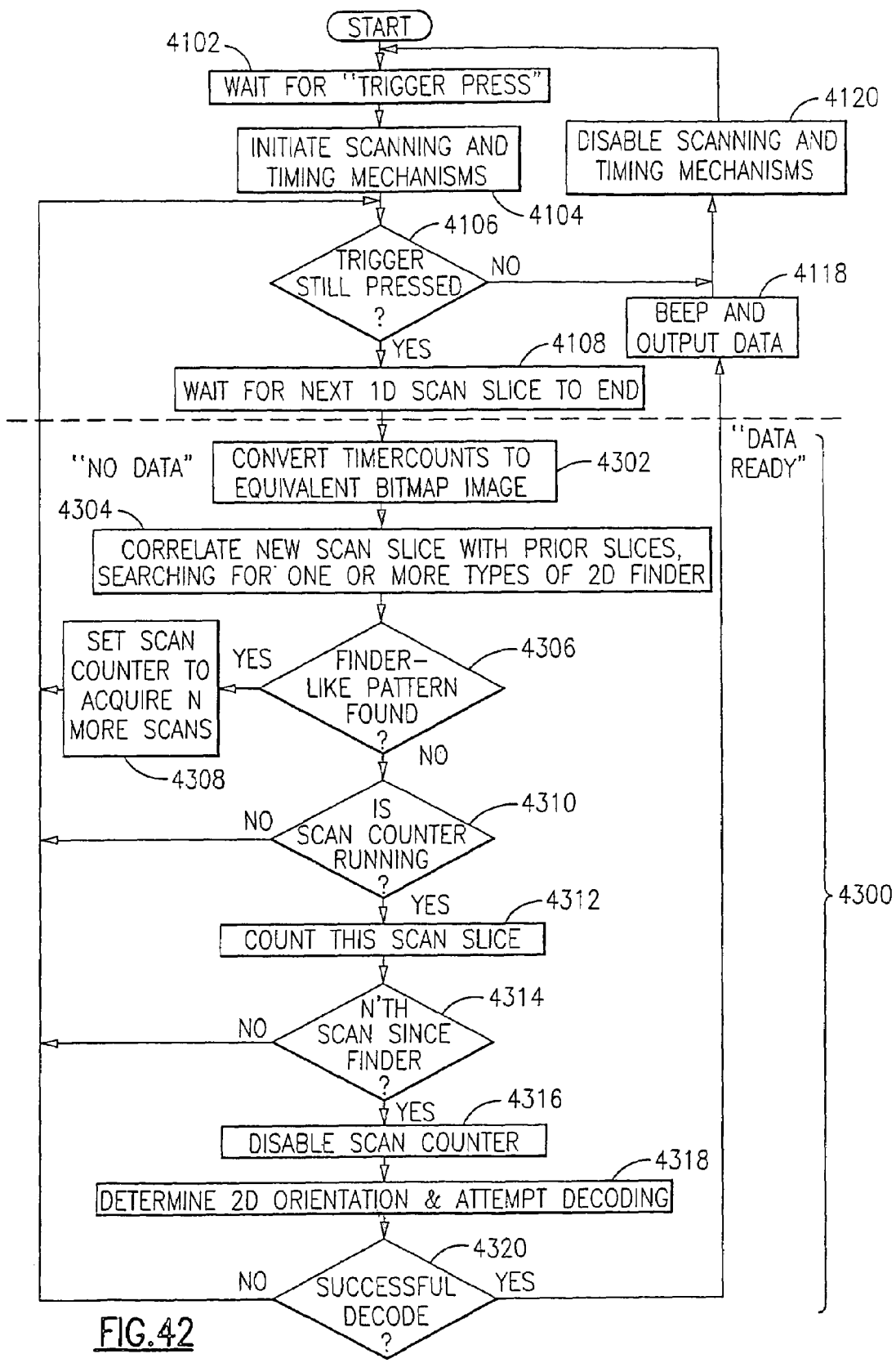

Referring to FIG. 42, there is shown (below the dotted line) the steps involved in decoding and assembling into a message the data encoded in a 2D symbol (if any) having any of a variety of different types of finder patterns, such as central finders, waistband finders and peripheral finders, among others. In doing so, FIG. 42 employs a process of elimination similar to that discussed in connection with FIG. 40. More particularly, after converting the current timer-count representation to its corresponding bit representation (block 4302), the reader correlates the current bit representation with the bit representations of a number of preceding scan slices to determine if a finderlike pattern is present, as called for by blocks 4304 and 4306. This may be accomplished by applying a number of candidate finder identifying algorithms, image processing algorithms, or known fuzzy logic pattern recognition techniques, such as those described in U.S. Pat. No. 5,401,949 (Ziemacki). If a finder-like pattern is found, the reader acquires enough additional representations to permit the symbol to be decoded. This is accomplished with the use of a scan counter and associated control blocks 4308 through 4316. Once this has been done, the reader determines the orientation of the 2D image and attempts to decode it as called for by block 4318. If the attempted decode is successful, the reader outputs its data and returns to its wait state (block 4320). If it is not successful, the reader is directed back to block 4106 to make another try at decoding.

The examination of the sets of bit representations for the type of finder (if any) that is present preferably involves the application of a process of elimination which uses the same algorithms which are used by conventional readers to located their finders. The waistband type finder used with the Code One symbology may, for example, be found using the algorithm described in "Uniform Symbology Specification Code One", published by AIM USA Technology Group, under publication no. TSC 059. Similarly, the peripheral type finder used with the Data Matrix symbology may be found using the algorithm recommended by its originator, and the circular central type finder used by the Maxi Code symbology may be found using the algorithm recommended by its originator. In the case of the Aztec symbology, a particularly advantageous algorithm for finding the finder has been developed which also works well with symbols using other types of central finders such as Maxicode.

Because a description of the latter algorithm is not as yet publicly available, a description thereof will now be provided.

With finder patterns of the central type the bits of successive slices are examined to find a small "island" (black region) within a larger "lake" (white region), within an island, within a lake, etc. This is done by determining how isolated each pixel is from the top and sides of an image, by which measure the center of any bull's-eye stands out plainly. An explanation of a quick scanning algorithm for finding such a bull's-eye structure will now be given.

The following algorithm, presented descriptively and in C code to be more easily understood by a computer programmer, locates a point of high "isolation"—e.g., the center of a bull's-eye—in a stored image. First assume that a fully contrasted image of "n" pixels wide of the 2D bar code is stored in the array l[x][y] where 0≦x<n and each element l[x][y] is valued either 0 (for white) or 1 (for black). This can be either a single image frame (0≦y<m) from a 2D sensor or a continuously acquired image (0<=y<??) rolling off a 1D sensor that moves in relation to the target.

A "level" array L[x] "n" values wide is first established, where L is an unsigned integer. L is initialized to the values of the top row in 1 as follows:

```
for (x=0; x<n; x++)L[x]=I[x][0];
Subsequent rows of the image are processed in sequence
by bi-directional scans through L as follows:
for (y=1; y<m; y++)
{
```

Working first left-to-right, the left-most L is set equal to the left-most I value in that row, then each subsequent L[x] is set to: (a) the lesser of its current value (from the row above) or its left-hand neighbor, and then (b) plus one if needed to make the new L and its corresponding I both even or odd. This can be represented mathematically in C code as follows.

```
L[0] = I[0][y];
for (x = 1; x < n-1; x++)
{    if (L[x-1] <L[x]) L [x] = L[x-1];
     if ((L[x]  I[x][y])%2 = = 1) L[x] = L[x] + 1;
}
```

Working then back right-to-left, the right-most L is set equal to the right-most I, then subsequent L's are reduced by 2 (1 or more times) if they exceed their right-hand neighbor by 2 (1 or more times):

```
L[n-1] = I[n-1][y];
for (x = n-2; x >= 0; x--)
{     while (L[x] >= L[x+1] + 2) L[x] = L[x] - 2;
}
```

As the process is repeated with data from each subsequent scan, from row to row the L values will start to reflect how isolated any image region is from its top and sides. After processing a row through part of a bull's-eye, the sequence of L values in its vicinity will look something like:

. . . 22233334445555666555444443333222 . . . .

The "finder (or bull's-eye) located" criterion may be characterized as 4 or more consecutive increases in isolation value followed by 4 or more consecutive decreases. The highest values mark the center of the "bull's eye." Scanning through L with a simple state machine (probably as part of the right-to-left scan above but shown here as a separate operation) detects this condition:

```
state = peakx = 0;
for (x = n-1; x ≧ 0; x--)
{     switch(state) {
      case 0:
      case 1:
      case 2:
      case 3:    if (L[x] < L[x+1]) state = 0;
                 if (L[x] > L[x+1]) { peakx = x; state++; } break;
      case 4:    if (L[x] > L[x+1]) peakx = x;
                 if(L[x] < L[x +1]) state ++; break;
      case 5:
      case 6:
      case 7:    if (L[x] > L[x+1]) state = 0;
                 if (L[x] < L[x+1]) state++; break;
      default:
      }
}
```

If this scan through L ends with "state"=8, then the point I [peakx][y] is a candidate bullseye center. The true center of the bull's-eye will have the highest level of isolation, so the search will continue for the possibility of a candidate having a higher level of L. If a variable peakI is initialized to zero at the top of the scan, then the candidate bull's-eye center location can be logged by:

```
if ((state = = 8) && (L[peakx] > peakI))
{     peakI = L[peakx]; eyex = peakx; eyey = y;
}
```

When an entire image has been scanned, then a non-zero "peakI" indicates a bull's-eye was found adjoining pixel I[eyex][eyey]. Alternately, in the case of a continuously flowing image, acquisition should be terminated a suitable number of rows (e.g., half the size of the image buffer) past the most recent updating of "peakI". This is the number "N" referred to in connection with block 308 above. The current reader utilizes the second acquisition method, by choosing to terminate acquisition N scans after the most recent updating of "peakI". Analysis continues, allowing for a higher peakI, and therefore a more likely candidate for the bull's-eye center to be found subsequently. When all imaged slices have been stored and the finder has been located, the symbol is then ready for decoding with reference to the finder.

While the present invention has been particularly shown and described with reference to the embodiments illustrated in the drawing, one skilled in the art will understand that various changes in detail may be effected therein without departing from the spirit and scope as recited by the claims.

[End Of Excerpt of U.S. patent application Ser. No. 08/504,643, filed Jul. 20, 1995].

There is provided an optical scanning and decoding apparatus and method, suitable for use with bar code readers, bar code scanning engines, and portable data terminals (PDTs), which combines improved scanning-decoding and autodiscrimination features in the context of an apparatus and method which also provides improved menuing and reprogramming features.

In accordance with the menuing feature, there is provided an improved apparatus and method which enables a user to determine the current operating mode of an optical reading apparatus, and to rapidly and conveniently change that operating mode to optimize it for operation under then current conditions. The menuing feature, for example, enables the user, via a machine readable table of prerecorded menu symbols, to command the reader to communicate with a host processor using one of a number of protocols, to command the reader to format the decoded output according to host processor requirements, or to command the reader to report to the host processor any of a plurality of types of information about the current operating state of the reader, such as the version of software then being used, the code options that are then being used, and even a complete listing of the reader's parameter table. If a suitable printer is available, the complete status of a first reader may be output as a machine readable menu symbol that other, similarly equipped readers may read and use to reconfigure themselves for operation in the same manner as the first reader.

In accordance with the reprogramming feature, there is provided an improved apparatus and method by which an optical reader may be reprogrammed from a source external to the reading apparatus, with or without the participation of a user. This external source may be either on-site, i.e., located at the same local facility as the reader, or off-site, i.e., located at a remote facility that is coupled to the local facility only via a transmission line or computer network. When actuated, the reprogramming feature enables a reader to reprogram itself, either in whole or in part, and thereby become able to operate with operating software of the latest type. Depending on the application, the reprogramming of the reader may be initiated either by a host processor external to the reader, as by a command issued via the reader's communication port, or by a user initiated command issued as a part of the above-mentioned menuing process.

In accordance with another aspect of the reprogramming feature, a local host processor may be configured to carry out reprogramming of an optical reader or another type of portable data terminal. In a reprogramming subroutine a local host processor can be made, at the selection of a user, to replace an entire main program and parameter table of a reader, or else one of either a main program or a parameter table of an operating program individually.

In accordance with another subprogram of a local host processor, the local host processor can be made to edit a parameter table. When this subprogram is selected the user may either edit the parameter table that is stored in a memory device of the reader or else edit a parameter table stored in a memory device in communication with the local host processor. After editing, the user may write the edited parameter table to the reader's memory device, write the edited parameter to a bulk storage device for later use, or print or display the edited parameter table.

In accordance with another aspect, an optical reader may be made to receive a component control instruction from an external source host processor which is transmitted in response to a user input command received at the external source host processor to control an optical reader. In accordance with this aspect, the optical reader is made to execute a component control instruction substantially on-receipt thereof. In one embodiment, execution by an optical reader of a component control instruction has the same effect as a reader trigger being manually pulled.

There is also provided an optical scanning and decoding apparatus and method which includes improved scanning-decoding and autodiscrimination features, either or both of which may be used in conjunction with, and/or under the control of, the above-described menuing and reprogramming features. In other words, the autodiscrimination feature is made available to the user on a menu selectable or reprogammable basis to speed up and/or update the decoding phase of the scanning and decoding process. Together, these features enable the reading apparatus to read and decode a wide range of optically encoded data symbols at an improved data throughput rate.

When a reader is one in which the scan engine cannot be readily started and stopped, or in which such starts and stops impose unacceptable delays or produce user perceptible flicker, the present invention preferably operates in one of the tracking relationships described in previously mentioned Co-pending application Ser. No. 08/914,883. One of these tracking relationships is a Skip Scan tracking relationship in which the results of one or more scans may be skipped over entirely in favor of more recently produced scan results. Another is a Decode On Demand tracking relationship in which decoding is suspended briefly as necessary to allow a scan then in progress to be completed. The latter relationship is ordinarily not preferred, but is still useful when the reader is such that its scan memory is able to store only two complete blocks of scan data.

When the reader is one in which the scan engine can readily be stopped, the present invention may operate in the tracking relationship described in previously mentioned U.S. Pat. No. 5,463,214. With this, "Scan On Demand" tracking relationship, scanning is suspended briefly as necessary to prevent scanning and decoding from becoming uncorrelated with one another.

In the preferred embodiment, the reader includes an algorithm that is able to accommodate any of the above-described scanning-decoding relationships, among others. Which of them is actually used will vary from reader to reader depending upon the size and type of memory and the type of scan engine used thereby, and may be changed from time to time.

The present reader also contemplates and provides for at least one scanning-decoding relationship which does not fall within the meaning of the above-defined tracking relationships. One of these non-tracking relationships is a "One Shot" relationship or mode in which a single scan is followed by a single decoding attempt and then a stoppage. Such scanning-decoding events may be initiated by respective single actuations of a manual trigger. Because of its inherently discontinuous nature, the use of the One Shot mode implies the non-use of any of the above-mentioned tracking modes.

Two other such scanning-decoding relationships are referred to herein as the "Repeat Until Done" relationship or mode and the "Repeat Until Stopped" relationship or mode. With the Repeat Until Done relationship, scanning and decoding operations follow one after another until a successful decode occurs, and are then discontinued. With the Repeat Until Stopped relationship, scanning and decoding operations follow one after another and continue, even after sets of decoded data are stored or output, until instructed to stop by the release of the trigger or by the readers' program. Because of their repetitive nature, the use of Repeat Until Done and Repeat Until Stopped modes are usable both in conjunction with the above-described tracking modes and independently of those tracking modes. As a result, the Repeat Until Done and Repeat Until Stopped modes may be implemented as user selectable non-tracking relationships or as tracking relationships.

In embodiments that use the autodiscrimination feature, there is provided a method and apparatus by which a plurality of different symbols of a multiplicity of different types may be scanned and decoded in a manner that is optimized for a particular application, on either a menu selectable or a reprogrammable basis. When all of the symbols to be autodiscriminated are known to be 1D symbols, for example, the data throughput rate may be increased by structuring the autodiscrimination feature so that no attempt is made to decode 2D symbols, or vice versa. When, on the other hand, the symbols to be autodiscriminated are known to all be of (or all not to be of) a few types, whether 1D or 2D, the data throughput rate may be increased by structuring the autodiscrimination feature so that all but a few (or only a few) 1D and/or 2D symbologies are disabled, i.e., so that no attempt is made to decode them. Other possible autodiscrimination options include not decoding or not outputting data for symbols that encode messages that are too long or too short to be of interest in a particular application. In accordance, any of these options may be chosen and changed as necessary to achieve the highest possible data throughput rate.

Because of the large number of different combinations of distinct operational states that are made possible thereby, the apparatus and method will be seen to have a protean quality that not only makes it usable in a large number of different applications, but also enables it to continue to remain so usable as new functions, new bar code symbologies and new and updated decoding programs are developed in the future.

While the present invention has necessarily been described with reference to a number of specific embodiments, it will be understood that the time spirit and scope of the present invention should be determined only with reference to the following claims.

The invention claimed is:

1. A method for operating a bar code reader system having at least a first hand held bar code reader and a host processor spaced apart from said first hand held bar code reader, wherein said first hand held bar code reader includes a memory, said method comprising the steps of:
   (a) providing programming data for programming said first hand held bar code reader at said host processor;
   (b) encoding with use of said host processor at least one bar code symbol, said at least one bar code symbol being encoded such that when said at least one bar code symbol is read by said second hand held bar code reader, said programming data provided at said host processor is loaded into said memory of said second hand held bar code reader;
   (c) outputting said at least one bar code symbol encoded at step (b), wherein said outputting includes the step of displaying a bar code symbol on a computer display; and
   (d) reading using said first hand held bar code reader said at least one bar code symbol output at step (c) so that said first hand held bar code reader is reprogrammed.

2. The method of claim 1, wherein said at least one bar code symbol is a single bar code symbol.

3. The method of claim 1, wherein said at least one bar code symbol is a series of bar code symbols.

4. The method of claim 1, wherein said at least one bar code symbol is a single two-dimensional bar code symbol.

5. The method of claim 1, wherein said programming data when received by said first hand held bar code reader changes a manner in which said first hand held reader is reprogrammed.

6. The method of claim 1, wherein said outputting step includes the step of outputting said at least one bar code symbol to a CRT display.

7. The method of claim 1, wherein said method further includes the step of reading using a second bar code reading device said at least one bar code symbol output at step (c).

8. A system for cloning a bar code reading device operating in a system that includes a plurality of bar code reading devices, said system comprising:
   a first bar code reading device having an imaging assembly and a housing adapted to be grasped by a human hand, said imaging assembly being supported within said housing;
   a second bar code reading device also having an imaging assembly and a housing adapted to be grasped by a human hand;
   a host processor spaced apart from said first bar code reading device and said second bar code reading device and having a printer adapted to print bar code symbols, said system being configured to encode data into a bar code symbol format that is decodable with use of said second bar code reading device; and
   wherein said first hand held bar code reading device is configured so that in response to a user-input command input using said first bar code reading device and initiated by depressing an actuator of said first bar code reading device, said first bar code reading device causes said printer to print a reprogramming bar code symbol that contains all information necessary to cause said second bar code reading device to operate in the same manner as said first bar code reading device.

9. The system of claim 1, wherein said system is configured so that said actuator of said first bar code reading device that is depressed to initiate said user-initiated command is a trigger.

10. The system of claim 8, wherein said system is configured so that said user-input command is initiated by depressing said actuator, wherein said actuator is provided by a trigger and wherein said depressing of said trigger causes a cloning function encoded programming symbol to be read which is configured in a manner complementary with said bar code reading device so that when said bar code reading device reads said cloning function encoded programming symbol, said bar code reading device is caused to print a cloning bar code symbol.

11. The system of claim 8, wherein said imaging assembly of said first bar code reading device includes a two dimensional solid state image sensor.

12. The system of claim 8, wherein said imaging assembly of said first bar code reading device includes an image sensor.

13. The system of claim 8, wherein said first bar code reading device includes and on-reader display.

14. A method for cloning a bar code reading device operating in a system that includes a plurality of bar code reading devices and a spaced apart host processor including a printer, wherein said system is configured to encode data into a bar code symbol, said method comprising the steps of:
   providing a first bar code reading device including a first imaging assembly and a first housing adapted to be grasped by a human hand, said first imaging assembly being supported within said first housing;
   further providing a second bar code reading device including a second imaging assembly and a second housing adapted to be grasped by a human hand, said second imaging assembly being supporting within said second housing; and initiating by depressing an actuator of said first bar code reading device a command that causes said printer to print a reprogramming bar code symbol that contains all information necessary to cause said second bar code reading device to operate in the same manner as said first bar code reading device.

15. The method of claim 14, wherein said initiating step includes the step of depressing a trigger to read a programming bar code symbol.

16. The method of claim 14, wherein said initiating step includes the step of depressing a trigger.

17. The method of claim 14, wherein said providing step includes the step of providing an image sensor.

18. A reprogrammable bar code reading device for operation in a bar code reading system including a host processor in wireless communication with said bar code reading device over a radiofrequency communication link between said bar code reading device and host processor device said reprogrammable bar code reading device comprising:

an imaging assembly comprising a two dimensional solid state image sensor and an imaging lens focusing an image of a target onto said two dimensional image sensor;

a housing adapted to be grasped by a human hand, said imaging assembly being supported within said housing;

a memory for storing image data;

a trigger, wherein said reprogrammable bar code reading device is configured so that actuation of said trigger causes image data to be stored into said memory; and reprogramming circuitry incorporated into said bar code reading device enabling said bar code reading device to be reprogrammed either by receipt of programming data over said radiofrequency communication link or by processing of memory stored image data stored in said memory, wherein said memory stored image data is representative of a programming symbol encoded to cause reprogramming of said bar code reading device when decoded by said bar code reading device.

19. The reprogrammable bar code reading device of claim 18, wherein said reprogrammable bar code reading device is configured to read two dimensional programming symbols.

20. The reprogrammable bar code symbol of claim 18, wherein said reprogrammable bar code reading device is configured to read one dimensional programming symbols.

21. The reprogrammable bar code symbol of claim 18, wherein said two dimensional image sensor comprises a plurality of rows and plurality of columns of pixels.

* * * * *